US006589643B2

(12) United States Patent
Okada et al.

(10) Patent No.: US 6,589,643 B2
(45) Date of Patent: Jul. 8, 2003

(54) ENERGY CONVERSION FIBER AND SOUND REDUCING MATERIAL

(75) Inventors: Jun Okada, Tokyo (JP); Kyoichi Watanabe, Kanagawa (JP); Katsumi Morohoshi, Kanagawa (JP); Hiroaki Miura, Kanagawa (JP); Takeshi Yamauchi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 106 days.

(21) Appl. No.: 09/819,711

(22) Filed: Mar. 29, 2001

(65) Prior Publication Data

US 2001/0050196 A1 Dec. 13, 2001

(30) Foreign Application Priority Data

Apr. 21, 2000 (JP) ....................................... 2000-121475
Nov. 27, 2000 (JP) ....................................... 2000-358679

(51) Int. Cl.[7] ........................... B32B 27/12; F16F 15/00
(52) U.S. Cl. ................................ 428/297.4; 428/300.7; 181/201; 181/207; 181/212
(58) Field of Search ................................ 181/175, 207, 181/212; 280/124.108; 310/322; 381/190; 367/908; 428/297.4, 300.7

(56) References Cited

U.S. PATENT DOCUMENTS

| | | | | | |
|---|---|---|---|---|---|
| 5,554,831 | A | * | 9/1996 | Matsukawa et al. | 181/294 |
| 5,783,780 | A | * | 7/1998 | Watanabe et al. | 181/229 |
| 5,817,408 | A | * | 10/1998 | Orimo et al. | 428/218 |
| 6,051,913 | A | * | 4/2000 | King | 310/327 |
| 6,102,465 | A | * | 8/2000 | Nemoto et al. | 296/39.3 |
| 6,165,921 | A | * | 12/2000 | Nagata et al. | 442/415 |
| 6,386,317 | B1 | * | 5/2002 | Morohoshi et al. | 181/252 |

FOREIGN PATENT DOCUMENTS

| | | | |
|---|---|---|---|
| JP | 55-167562 | | 5/1954 |
| JP | 55-60444 | | 5/1980 |
| JP | 62-110722 | | 5/1987 |
| JP | 64-53055 | | 3/1989 |
| JP | 2-19644 | | 1/1990 |
| JP | 5-18329 | | 1/1993 |
| JP | 5-18330 | | 1/1993 |
| JP | 7-223478 | | 8/1995 |
| JP | 08-246573 | * | 9/1996 |
| JP | 8-246573 | | 9/1996 |
| JP | 2000-071844 | * | 3/2000 |

OTHER PUBLICATIONS

"Connectivity and Piezoelectric–Pyroelectric Composites", by Newnham et al., Mat. Res. Bull., vol. 13, No. 5 (1978), pp. 525–536.

"Evaluation of New Piezoelectric Composite Materials for Hydrophone Applications", by Robert Ting, Ferroelectrics, vol. 67 (1986), pp. 143–157.

"Piezoelectric Ceramics: Polymer Composite Materials", by Hisao Banno, vol. 23, No. 8 (1988), pp. 133–143.

* cited by examiner

*Primary Examiner*—Cynthia H. Kelly
*Assistant Examiner*—Camie Thompson
(74) *Attorney, Agent, or Firm*—McDermott, Will & Emery

(57) ABSTRACT

A fiber body includes a collection of fibers containing thermoplastic resin as the main component and an energy consuming component, such as a piezoelectric material for converting and consuming external mechanical energy of sound and vibration. The energy is converted into electrical energy, which in turn, is converted and consumed into and as heat by means of the electrical resistance of the resin.

79 Claims, 25 Drawing Sheets

ENERGY CONVERSION FIBER AND SOUND REDUCING MATERIAL

BACKGROUND OF THE INVENTION

This invention concerns energy conversion fibers and other objects, containing a component, such as a piezoelectric material, that can convert and consume external mechanical energy of vibration and sound pressure into another form of energy, such as electrical energy, sound reducing materials that use such fibers or other objects, and a sound reducing structure that can be used in vehicles, housing, building and other facilities.

As a material in a sound insulating structure for motor vehicle or buildings, a document D1(Published Japanese Patent Application Kokai Publication No. H07(1995)-223478) proposes a laminate of a sound absorbing material layered between plate materials such as metal and resin materials. As a developed form of such a sound insulating material, a document D2 (Published Japanese Patent Application Kokai Publication No. H08(1996)-246573 discloses a ferroelectric polymer film.

The sound-absorbing material disclosed in document D2 (H08(1996)-246573) was developed in view of the increase in the weight and/or the occupied volume in the abovementioned sound insulating laminate structure of plate materials and sound absorbing material. However, when a ferroelectric material is used as a film, the capacitance (C) is proportional to the area of the film, and because of a need to reduce the external resistance (R) in applications requiring a large area, a combination with a realistic R is practically impossible in some cases depending on the area. Also, a sound insulating structure is normally not comprised solely of a film but a film is used in combination with a suitable sound absorbing material. In such cases, there is a need to prepare a sound absorbing material apart from the film, causing the sound absorbing structure as the final product, to be expensive and requiring troublesome working processes for combining the sound absorbing material and the film. It is therefore difficult to realize a realistic sound insulating material with such a design.

Also, sound absorbing materials are used in various locations, such as houses, railway cars, airplanes, vehicles, etc., and the most suited material is used in accordance with the various restrictions of the location of use. In particular, the types of materials that are used in vehicles are subject to numerous restrictions in terms of weight, space, etc. and there is a need to obtain a sound absorbing structure that is more lightweight and occupying less space.

In sound absorbing structures of earlier technology structures using natural fibers, such as felt, or synthetic fibers, such as PET, are provided at locations requiring the absorption of sound and the usage amounts of such structures are increased to improve the performance. However, such a method is inefficient in that the sound absorbing performance is not improved as compared to the problems of increased cost and weight due to increased usage amount. In particular, the abovementioned method is unable to efficiently improve the sound absorbing performance at low frequencies of 500 Hz or less, and liable to become factors leading to excessive increases in cost, weight, and space.

Among acoustic noises in engine compartment, the noises in the intake system is especially problematical. To reduce the intake noises, various noise reducing systems are proposed by documents D3 (Japanese Utility Model Publication No S55-167562), D4 (Published Japanese Patent Application Kokai Publication No. S64-53055), D5 (Published Japanese Patent Application Kokai Publication No. S62-110722), D6 (Published Japanese Patent Application Kokai Publication No. S55-60444), D7 (Published Japanese Patent Application Kokai Publication No. H2-19644), D8 (Published Japanese Patent Application Kokai Publication No. H5-18329), and D9 (Published Japanese Patent Application Kokai Publication No. H5-18330).

SUMMARY OF THE INVENTION

It is therefore an objective of the present invention to provide energy conversion objects or product made from fiber which are advantageous in weight reduction and size reduction, and in sound reducing performance.

It is another objective of the present invention to provide a fiber or fibrous object or product capable of reducing sound by consuming energy of sound or vibration, and especially suitable for vehicles and other applications.

According to the present invention, a product or object, such as fiber, fiber material, a fiber body, a mass of fibers, fabric, sound reducing material, or sound reducing panel, sheet, mat, lining or laminate, comprises: at least a fiber comprising an energy consuming component to consume energy of at least one of vibration and sound by energy conversion. Preferably, the product comprises a fiber body which comprises fibers each of which comprises a thermoplastic component comprising a thermoplastic resin, and the energy consuming component. Preferably, the energy consuming component comprises a piezoelectric component having piezoelectric property; and the fiber body is a collection of fibers containing a thermoplastic resin as a Main component.

The other objects and features of this invention will become understood from the following description with reference to the accompanying drawings brief description of the drawings.

BRIEF DESCRIPTION OF THE DRAWINGS

FIG. 6A is a perspective view, FIG. 6B is a sectional view taken across a line B—B, and FIG. 6C is an enlarged sectional view.

DETAILED DESCRIPTION OF THE INVENTION

Figure 1A:
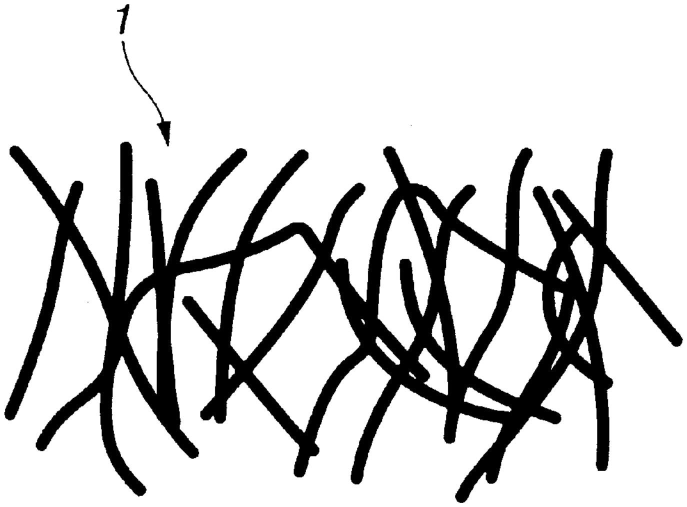
FIGS. 1A and 1B are views showing a fiber body and a constituent plain fiber thereof according to a first embodiment of the present invention.

The energy conversion fiber bodies according to preferred embodiments of this invention includes fibers having thermoplastic resin as main component and an energy consuming or converting component that consumes external mechanical energy, comprised of vibration or sound pressure, via conversion of the external energy. The energy consuming component is contained in part or all of the fibers.

In an ordinary sound absorbing material, sound is absorbed by the consumption of sound energy by the friction that arises between the sound absorbing material such as a non-woven fabric comprised of a natural fiber or PET or other synthetic fiber, and the compression waves of air due to the sound. Therefore, in order to improve the sound absorbing performance, the surface area of the material that comprises the sound absorbing material is increased from the standpoint of increasing the friction with air. Thus, especially with sound absorbing materials that are comprised of fiber materials of high sound absorbing efficiency, attempts are made to make the diameter of the fibers thin in order to increase the surface area. However, there are limits to how small the diameter can be made, and extremely small diameters are also difficult to realize for practical purposes from the point of economy.

The material of the present invention is designed to consume sound energy by conversion once into another form of energy, and thereby to decrease the sound energy in combination with friction with air to improve the sound absorbing and insulating performance. Specifically, with a piezoelectric component, the sound energy can be converted once into electrical energy and the generated electrical energy can be converted into heat by the internal resistance of the material to consume the energy of the sound and perform sound absorption efficiently.

Instead of the abovementioned piezoelectric component, it is optional to employ, as energy consuming component, a component capable of converting the mechanical energy into phase change energy or a component capable of absorbing and accumulating the mechanical energy as internal strain stress, etc.

Since a fibrous form capable of ensuring friction with air efficiently is an effective form for sound absorbing and insulating materials, a fiber body is a basic form in the disclosed embodiments of this invention. Also, from the standpoint of formability or moldability, etc., a thermoplastic resin is chosen as the main component (matrix resin). Moreover, a material, which gives rise to an electromotive force from the mechanical energy comprised of external vibration or sound pressure, is mixed in this resin of the main component. Such a material is generally called a piezoelectric material.

In this invention, composite oxides are found to be effective as piezoelectric materials. By mixing a general composite oxide as the piezoelectric material providing the piezoelectric effect, in the matrix resin, the energy of sound pressure, etc. is converted efficiently into electrical energy, and then converted into heat energy by the resistance of the material, to thereby consume the energy of sound, etc. Also, since the basic form is a fiber body, an advantage is provided in that normal sound energy consumption by friction can also be secured. Furthermore, it is possible to form fiber according to the present invention, into a film, a plate, a block or some other form by using binder material or binder fiber or by some other method. In this case, too, the mechanism of the energy consumption is the same, and sound absorbing and insulating performance is maintained.

The thermoplastic resin of the main component functions to convert charges produced in the composite oxide of the piezoelectric body by the sound pressure or vibration inputted into the fiber body, into heat by the electrical resistance of the thermoplastic resin surrounding the piezoelectric body. By so doing, the thermoplastic resin of the main component contributes to the efficient absorption or reduction of, sound pressure and vibration.

The piezoelectric effect is the generation of electricity or electric polarity in a material as a result of the application of mechanical stress. The material having piezoelectric properties is capable of converting energy of sound into electrical energy. To achieve high sound absorbing performance, it is desirable to enhance the piezoelectric effect of the fiber forming the sound absorbing material.

The charge is produced approximately in proportion to the strain. Therefore, in order to achieve higher piezoelectric effect, it is desirable to produce the strain efficiently in the piezoelectric materials in response to sound pressure.

For efficient production of strain in the piezoelectric material, the reduction of the geometric moment of inertia of fiber is effective, and the reduction of the geometric moment of inertia can be achieved by the reduction of fiber diameter. However, the addition of the piezoelectric material decreases the amount of the matrix thermoplastic resin and hence increases the difficulty in fiber spinning. The addition of one or more highly polar organic components makes it possible to improve the spinnability without deteriorating the piezoelectric effect. The highly or strongly polar organic component is a component which, when mixed with a thermoplastic resin, can change the polarity from the polarity of the thermoplastic resin alone, to the polarity of a mixed resin. In general, a resin is basically polar and none is non-polar. With the polarity changing strongly polar organic component blended to the thermoplastic resin, it is possible to enhance the polarity of the mixed resin to the polarity of the matrix thermoplastic resin, or conversely to change the polarity of the entirety by canceling the polarity of the matrix thermoplastic resin. Thus, it is possible to improve the spinnability by adjusting the polarity of the mixed resin. The spinnability can be increased by increasing the polarity. However, the spinnability decreases if the polarity is too high. The tendency of the spinnability remains unchanged when a piezoelectric material is added to the mixed resin. Thus, it is possible to produce a fiber body having high piezoelectric properties and sufficient productivity by checking the spinnability, determining the matrix resin, and adding the piezoelectric material.

The strongly polar organic component preferably has strong polarity by itself. Such a polar organic component facilitates the ease in changing the polarity of the entire resin. Moreover, it was confirmed that the high polarity of the strongly polar organic component could act on the piezoelectric material and serve as a substitute for the piezoelectric material. Therefore, it is possible to ensure a sufficient piezoelectric effect by decreasing the amount of the piezoelectric material and increasing the amount of the strongly polar organic component. In general, the piezoelectric material has a relatively high specific gravity because of ceramic as main component whereas the strongly polar organic material is an ordinary organic material light in specific gravity. The addition of the strongly polar organic component helps reduce the weight of the fiber body.

Mixture of two or more strongly polar organic materials is possible. When a highly polar organic material is unstable, it is optional to add another highly strong polar material as a stabilizer. Moreover, the addition of a strongly polar organic material having a function of preventing undesired aging of a fiber body such as hardening or softening of a fiber body, or decrease in elasticity is advantageous to maintain the piezoelectricity and other basic properties. Moreover, it is possible to improve the heat resistance of a fiber body by addition of an appropriate highly polar organic material.

The addition of piezoelectric material generally acts to increase the viscosity of the mixed resin in the molten state.

When the piezoelectric component contains inorganic compound, the inorganic compound acts to increase the resistance in extrusion and deteriorate the spinnability. Therefore, in order to reduce the resistance and the difficulty in the spinning, it is desirable to burry the piezoelectric resin containing the piezoelectric material under the matrix resin. The core-sheath design can enclose the piezoelectric resin completely. The side-by-side design makes it possible to reduce the exposed surface of the piezoelectric resin by half. In the case of the core-sheath type, it is desirable in some situation to employ, as a resin of the sheath component, a thermoplastic resin having a softening point different by 20° C. or more from the melting point of a matrix thermoplastic resin of the core component. Such a core-sheath fiber can combine the function of energy consumption and the function of binder.

The cross sectional shape of a fiber according to the present invention may be non-circular. For example, the fiber cross sectional shape may be flattened, elongated, hollow, triangular, Y-shaped, irregular, rugged, or serrated.

With respect to the weight of the matrix thermoplastic resin, a desirable proportion of the total weight of the piezoelectric component, the highly polar organic component and the additive component is 50~90 mass %. A lower amount below 50 mass % is too small to obtain sufficient piezoelectric effect. A higher amount above 90 mass % decreases the amount of a matrix resin too much to maintain the adequate spinnability.

The use of a thermoplastic resin having polarity as a thermoplastic resin containing a piezoelectric is effective in improving the sound and vibration reducing performance. The thermoplastic resin having polarity may be a resin containing a polar group, such as amide group, ester group, or carbonate group.

The piezoelectric material may include a compound selected from the group consisting of polyvinylidene fluorides (PVDF) and poly(vinylidene fluoride/trifluoroethylene) (P(VDF/TrFE) copolymers, and the thermoplastic resin may be non-piezoelectric portion of the compound of the piezoelectric material. In this case, the amount of inorganic material is reduced to the advantage of high speed spinning operation and stable low speed spinning operation.

Preferably, the SP parameter (δs) of the strongly polar organic component may be $2.0\times10^4$~$2.7\times10^4$ $(J/m^3)^{0.5}$. The SP parameter of the thermoplastic resin of the main component may be $1.6\times10^4$~$2.8\times10^4$ $(J/m^3)^{0.5}$. In terms of a widely used unit, the range of the strongly polar organic component is 10~13 $(0.4887\ J/m^3)^{0.5}$, and the range of the thermoplastic resin is 7.8~13.6 $(0.4887\ J/m^3)^{0.5}$.

The SP parameter is solubility constant generally used as an index indicating the intermolecular force of a substance. In general, the polarity of molecule is higher when the SP parameter is higher. Therefore, in order to improve the piezoelectric effect, it is desirable to increase the SP parameter. In view of interaction between two substances, the affinity between two is higher to the advantage of the ease of mixing as the difference in the SP parameter therebetween becomes smaller. To improve the fiber spinnability, it is desirable to decrease the difference between the SP parameter values of the matrix thermoplastic resin and the strongly polar organic component.

In order to obtain piezoelectric effect, it is desirable to employ a matrix thermoplastic resin having a polarity. A thermoplastic resin having an SP parameter value smaller than $1.6\times10^4(J/m^3)^{0.5}$ is not sufficiently adequate for the piezoelectric effect. A thermoplastic resin having an SP parameter value greater than $2.8\times10^4(J/m^3)^{0.5}$ is liable to decrease the stability of the resin and to incur decomposition. A strongly polar organic component having an SP value lower than $2.0\times10^4(J/m^3)^{0.5}$ increases the difference of the SP parameter from the matrix thermoplastic resin (such as the difference between the minimum SP value of the matrix thermoplastic resin and the maximum SP value of the strongly polar organic component), and hence decreases the spinnability. A strongly polar organic component having an SP value higher than $2.7\times10^4(J/m^3)^{0.5}$ decreases the stability of the strongly polar organic component, and eliminates the adequacy for spinning.

Examples of the strongly polar organic component are benzothiazoles, benzothiazyl sulfenamides and thiurams. These are organic high polymer widely used as compounding agent or extender of rubbers. It was confirmed that these could improve the spinnability without decreasing the piezoelectric effect. These are further advantageous in cost. The δs value of ordinary benzothiazoles is $2.3\times10^4$~$2.5\times10^4(J/m^3)^{0.5}$. The δs value of ordinary sulfenamides is $2.0\times10^4$~$2.3\times10^4$ $(J/m^3)^{0.5}$. The δs value of ordinary thiurams is $2.3\times10^4$~$2.7\times10^4(J/m^3)^{0.5}$. Each has a high polarity and is effective in improving the spinnability without decreasing the piezoelectric effect. Some of thiurams are thermally unstable. Therefore, it is advantageous to blend thiurams with benzothiazole and/or sulfenamide.

Effective examples of the benzothiazoles are: mercaptobenzothiazole (MBT), dibenzothiazyl disulfide (MBTS), and the zinc salt of 2-mercaptobenzothiazole (ZnMBT).

Examples of sulfenamides are: N-cyclohexane-2-benzothiazole sulfenamide (CBS), N,N-dicyclohexyl-2-benzothiazyl sulfenamide (DCHBSA), N-t-butyl-2-benzothiazole sulfenamide (BBS), N-oxydiethylene-2-benzothiazole sulfenamide (OBS), and N,N-diisopropyl-2-benzothiazole sulfenamide (DPBS).

Effective examples of thiurams are: tetramethylthiuram monosulfide (TMTM), tetramethylthiuram disulfide (TMTD), tetrabutylthiuram disulfide (TBTD), dipentamethylenethiuram tetrasulfide (DPTT). Other effective examples are: sulfur, 1,3-bis(2-benzothiazole mercaptomethyl) urea, diorthotolylguanidine. Specifically, sulfur has a very high δs value.

As the matrix thermoplastic resin, adequate are resins which are effective in piezoelectricity, easy to spin, high in polarity, and high in δs. A resin having a polar group such as amide group, ester group, and carbonate group is high in polarity. Specifically, polyamide such as nylon 6, or nylon 66 is effective because of its δs value of $2.5\times10^4$~$2.7\times10^4$ $(J/m^3)^{0.5}$. Phenol resin, polyester and epoxy are other candidate since the δs value is about $2.2\times10^4(J/m^3)^{0.5}$. Moreover, it is possible to use polybutylene terephtalate, polyacrylonitrile, polyethylene, polypropylene, polystyrene, polycarbonate, polyurethane, and polyvinyl chloride alone or in combination.

With the thermoplastic resin, piezoelectric, it is possible to consume sound energy in the entire frequency range from low frequencies to a high frequencies. By the aid of friction and piezoelectric effect, the fiber body according to the present invention can improve the sound reducing performance over all frequencies with smaller volume and smaller surface area as compared to a sound absorbing material of other types.

The fiber body according to this invention can have an energy absorption characteristic at a resonance frequency of $f1=1/(2\pi\sqrt{(LC)})$ (EQ1), due to the LC resonance by the capacitance C of the piezoelectric material and the pseudo inductance component L of the remainder. It is difficult to accurately measure the capacitance of the piezoelectric material dispersed in the matrix resin and the pseudo inductance formed among the matrix resin, strongly polar organic component and third component, and hence it is practically impossible to set a resonance frequency accurately with f1. However, by using the equation of f1 as approximation, it is possible to design a sound absorbing material having a characteristic specifically effective at a preset frequency. Moreover, it is possible to adjust this frequency f1 by using the third component. The amount of the third component may be preferably 3~10 mass % of the entire fiber body.

The fiber body can have an energy absorption characteristic at a resonance frequency of $f2=1/(2\pi\sqrt{(RC)})$ (EQ2) with the capacitance C of the piezoelectric material and the pseudo resistance component R of the remainder. With a sea-island type composite fiber body, only the island component has this characteristic. This is effective in cases where the measurement of the inductance component is difficult since the pseudo resistance R is relatively easy to measure. As in the case of f1, the frequency can be adjusted by means of the blending amount of the third component.

The amount of energy converting and consuming fibers is preferably in the range of 10 to 100 mass % of a fiber body. A fiber body that is a collection of fibers including energy consuming fibers amounting to 10 to 100 mass % of the fiber body is effective in achieving superior sound reducing performance over the entire frequency range, or at a selected frequency region. The amount lower than 10 mass % is too small to obtain the intended sound reducing effect. In addition to energy consuming fiber, a fiber body can contain natural fiber and/or synthetic fiber such as polyester fiber.

A fiber body can be made into a non-woven fabric by a card type non-woven fabric process or by an air blowing method. In general, the air blowing method is more efficient in the case of island components that are less than 10 $\mu$m in diameter, and the card method is good for larger diameter fibers.

Any of the earlier methods may be employed to prepare a woven type or knit type sound absorbing material. Woven type materials of all types of weave, such as plain weave, twill weave, satin weave, and double weaves and modified structures of these types of weave, etc. are possible. Knit type materials of all types of knitting, such as weft knitting, warp knitting, etc. are also possible. If a cloth is to be formed, a woven or knit material of as high a density as possible is preferably formed in advance.

It is also preferable for the diameter of the fiber to be 10 to 30 $\mu$m. This is because the piezoelectric fiber can then be produced in a more stable manner.

A fiber body may contain binder fibers to enable thermoforming process to produce sound reducing members of various shapes such as interior trim member and various insulating members of a vehicle. When a binder type energy consuming core-sheath fiber according to this invention is used in such cases, thermal adhesion with other fibers can be accomplished by the softening of the sheath component to enable the making of a sound absorbing material of even higher vibration damping performance.

A sound reducing material containing energy consuming fiber of the present invention can be bonded, attached or fastened to a plate or a sheet for sound insulation to improve sound reducing performance and adjust frequency characteristic.

A sound reducing material containing energy consuming fiber of the present invention is effective for motor vehicles imposing stringent requirement on space, weight and cost, and specifically adequate for reduction low frequency noises.

For example, the noise produced by intake air in the air intake duct of an engine is one of troublesome sources of vehicle noise. Since the absorption of sound of a low frequency of 500 Hz or less is difficult with earlier sound absorbing materials, use is made of resonators and resonating ducts having capacities set to a target frequency to reduce the noise in this noise range and especially that in the low frequency range.

It is thus especially effective in terms of reducing low frequency noise to apply a sound absorbing material of this invention inside an air cleaner partitioned by an air filter element in a vehicle, for example in the space on the internal combustion engine's side, in the space on the air intake side, or in both of these spaces inside the air cleaner interior. With the application of the sound reducing material according to the present invention, it is possible to eliminate part or all of the resonator and resonating duct that are mounted to the air cleaner, to the advantage of space within the engine and manufacturing cost.

It is also desirable to use a sound absorbing material of this invention for a dashboard insulator of a vehicle from the standpoint of absorbing and preventing the entry of the low-frequency noise from the engine into the passenger compartment. In this case, the sound absorbing material may be set on the entire surface or part of the insulator part of the dashboard insulator. If sound of a specific frequency is emitted from a specific part of the dashboard part, it will be economical to set the sound absorbing material only at the sound generating part and efficient sound absorbing effects can be obtained thereby.

It is also desirable to use a sound absorbing material of this invention in a vehicle floor carpet from the standpoint of absorbing and preventing the entry of the low-frequency noise from the engine into the compartment. The sound absorbing material may be set on the entire surface or part of the insulator part of the floor carpet, and if sound of a specific frequency is emitted from a specific part of the floor panel part, the sound absorbing material may be set only at the sound generating part to enable economical and efficient insulation of sound. It is also effective to set the sound absorbing material at or around the tunnel of the floor panel since sounds are emitted specifically from the devices in the interior of the tunnel.

The sound absorbing material of this invention may be used on the entire surface or part of any of the tunnel part, rear parcel part, internal parts of the instrument panel, internal parts of the respective pillars, roof panel part, and lower dashboard part of the floor panel of a vehicle.

Figure 1B:
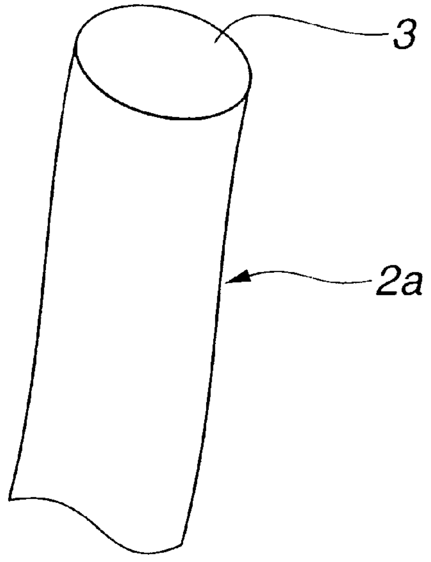

FIG. 1A shows a fibrous body 1 which is a collection or mass of fibers 2*a* according to a first embodiment of the present invention. In this embodiment, fiber 2*a* is a single-component plain fiber made of resin-piezoelectric complex in which piezoelectric material is dispersed in a thermoplastic resin. As shown in an enlarged view of FIG. 1B, plain fiber 2*a* has only a resin portion 3 of resin-piezoelectric complex containing dispersed piezoelectric material.

Sound pressure and vibrations inputted to fibrous body 1 produce charges in the piezoelectric material in fibers 2*a*, and the electric resistance of the thermoplastic resin surrounding the piezoelectric material functions to convert the charges into heat. By such energy conversion process, the fibrous body 1 can effectively reduce or absorb sound and/or vibration.

Figure 2A:
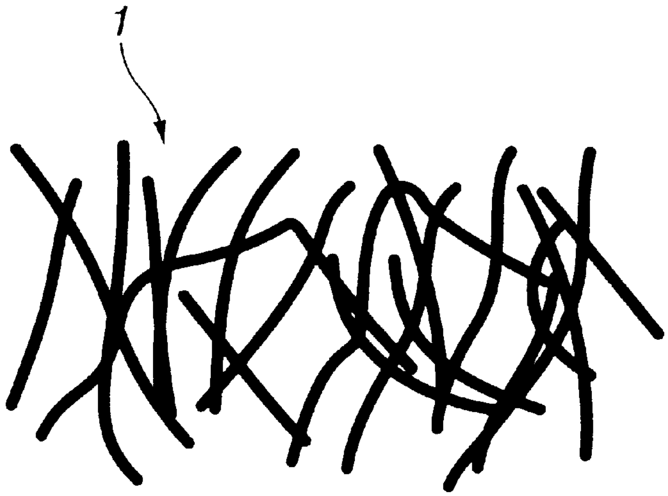
FIGS. 2A and 2B are views showing a fiber body and a constituent side-by-side fiber thereof according to a second embodiment of the present invention.
Figure 2B:
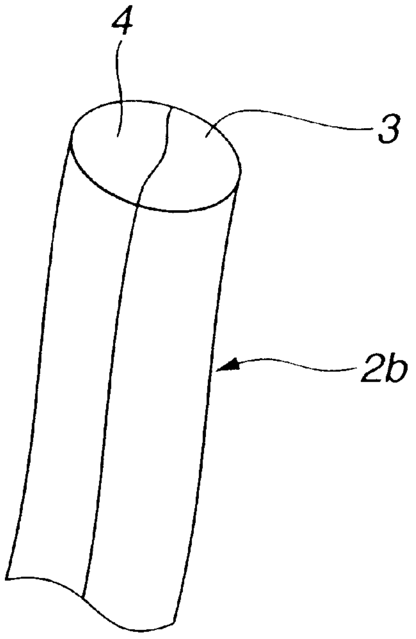

FIGS. 2A and 2B show a fibrous body 1 which is a collection or mass of fibers 2*b* according to a second embodiment of the present invention. In the second embodiment, fiber 2*b* is a side-by-side type fiber made of resin-piezoelectric complex in which piezoelectric material is dispersed in a thermoplastic resin. Side-by-side type fiber 2*b* includes a piezoelectric resin portion 3 of piezoelectric-resin complex containing piezoelectric material, and a non-piezoelectric resin portion 4 of thermoplastic resin containing no piezoelectric material. The piezoelectric portion 3 and non-piezoelectric resin portion 4 extend side by side in a longitudinal direction of the fiber, from end to end.

Fibrous body 1 of FIG. 2A can effectively reduce or absorb sound and/or vibration by energy conversion by the piezoelectric material in fibers 2*b* into electric energy, and conversion into heat by the electric resistance of the thermoplastic resin surrounding the piezoelectric material. In a fiber production process such as melt spinning, the non-piezoelectric resin portion 4 having no piezoelectric material, formed in a part of the fiber cross section, functions to cause the winding tension during spinning to act selectively on the non-piezoelectric resin portion 4 and thereby to enable high speed winding and stable operation even in low-speed winding.

Figure 3A:
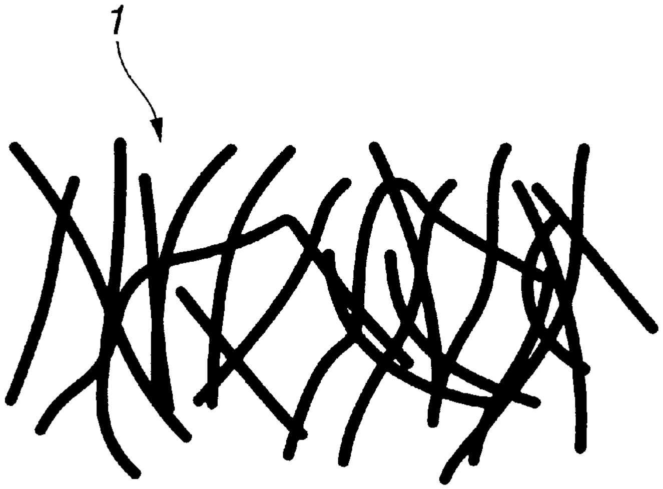
FIGS. 3A and 3B are views showing a fiber body and a constituent core-sheath fiber according to a third embodiment of the present invention.
Figure 3B:
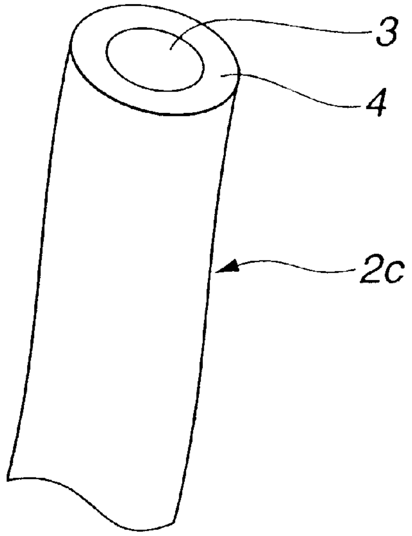

FIGS. 3A and 3B show a fibrous body 1 which is a collection or mass of fibers 2*c* according to a third embodiment of the present invention. In the third embodiment, fiber 2*c* is a core-sheath type fiber made of resin-piezoelectric complex containing piezoelectric material dispersed in a thermoplastic resin. Core-sheath type fiber 2*c* includes a central piezoelectric resin portion 3 of piezoelectric-resin complex containing piezoelectric material, and an outer non-piezoelectric resin portion 4 of thermoplastic resin containing no piezoelectric material. Central piezoelectric portion 3 is surrounded by outer non-piezoelectric resin portion 4. Central piezoelectric portion 3 extends longitudinally within the surrounding outer non-piezoelectric resin portion 4, from end to end. The fiber cross section has the central resin portion 3 and the outer ring-like resin zone 4 enclosing the central portion 3 in a pattern identical to or resembling a concentric pattern.

In fiber production process, the core-sheath fiber design can enable high speed winding and stable operation even in low-speed winding, like the side-by-side design.

Figures 4A, 4B:
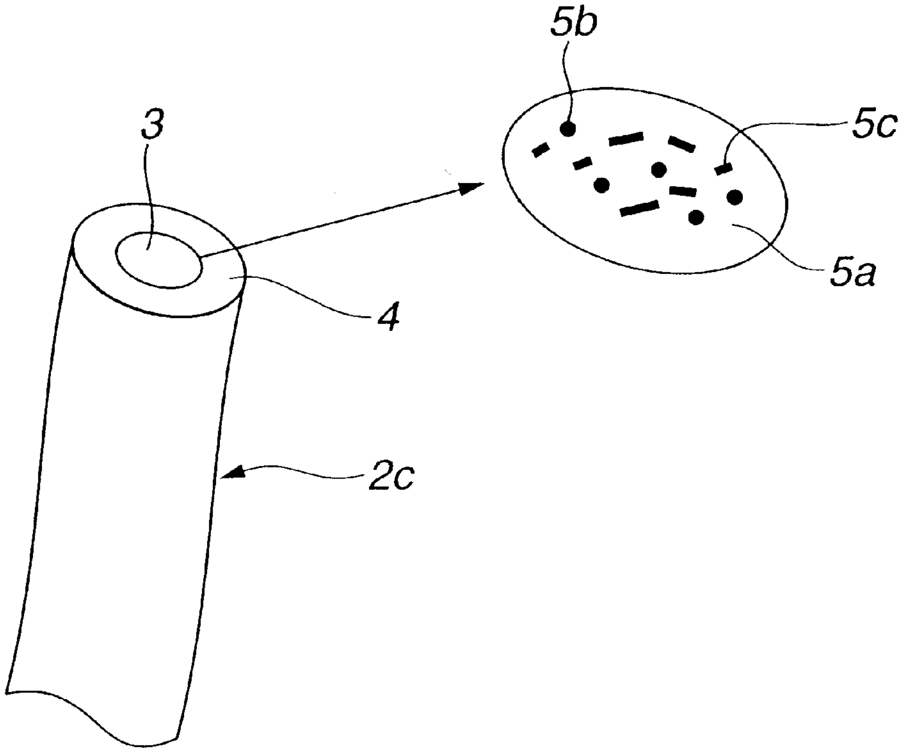
FIGS. 4A and 4B are views showing a core-sheath fiber and its end surface according to a modification of the third embodiment.

FIGS. 4A and 4B show a fiber 2*c* of core-sheath type having a central piezoelectric resin portion 3 and an outer non-piezoelectric resin portion 4. In addition to thermoplastic resin 5*a* and piezoelectric material 5*b*, central piezoelectric resin portion 3 of FIGS. 4A and 4B contains additional third material 5*c*. In this example, third material 5*c* is carbon fiber. Carbon fiber material 5*c* provides an electric resistance for converting energy of sound and vibration inputted to the fibrous body into heat, and thereby contributes to effective absorption of sound and vibration.

Figure 5:
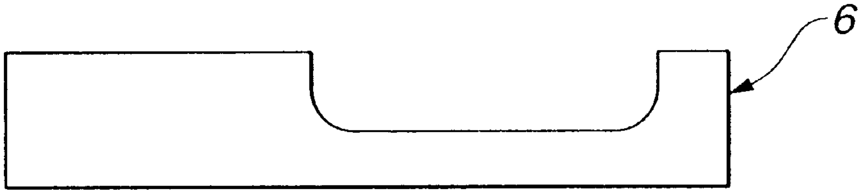
FIG. 5 is a view illustrating a sound insulating member produced from a fiber body according to the present invention.

FIG. 5 shows an object or product 6 produced by blending at least one of fibrous bodies 1 shown in FIGS. 1A~4B, with one or more fibers or fibrous bodies having a softening point lower than that of the fibrous body 1, and forming the mixture into a desired shape by hot pressing. The object 6 shown in the example of FIG. 5 is a sound insulating member.

Figure 6A:
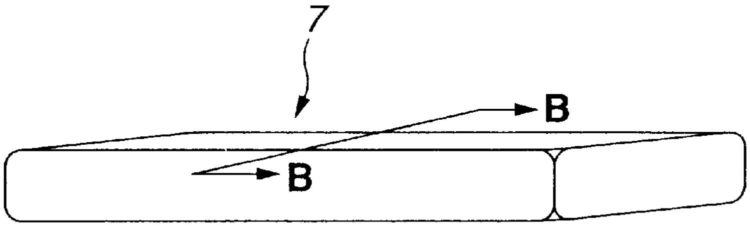
FIGS. 6A, 6B and 6C show another sound insulating member according to the present invention.
Figure 6B:
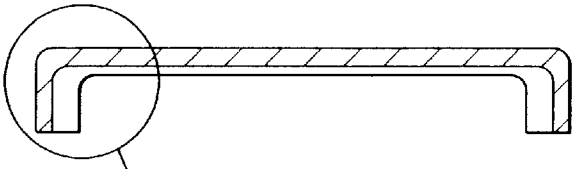
Figure 6C:
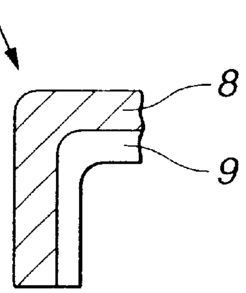

FIGS. 6A and 6B show a sound insulating member 7 including a plate or panel member (or structural member) 8 and an sound insulating member 9 made from at least one of fibrous bodies 1 shown in FIGS. 1A~4B. In this example, the plate member 8 is in the form of a cover or lid, and the sound insulating member 9 is attached to the inside surface of the plate member 8.

PRACTICAL EXAMPLES I

Practical Examples 1~32 (IPE1~32) are practical examples according to a first aspect of the present invention.

The following examples are illustrative, and the present invention is not limited to the following examples.

Figure 7:
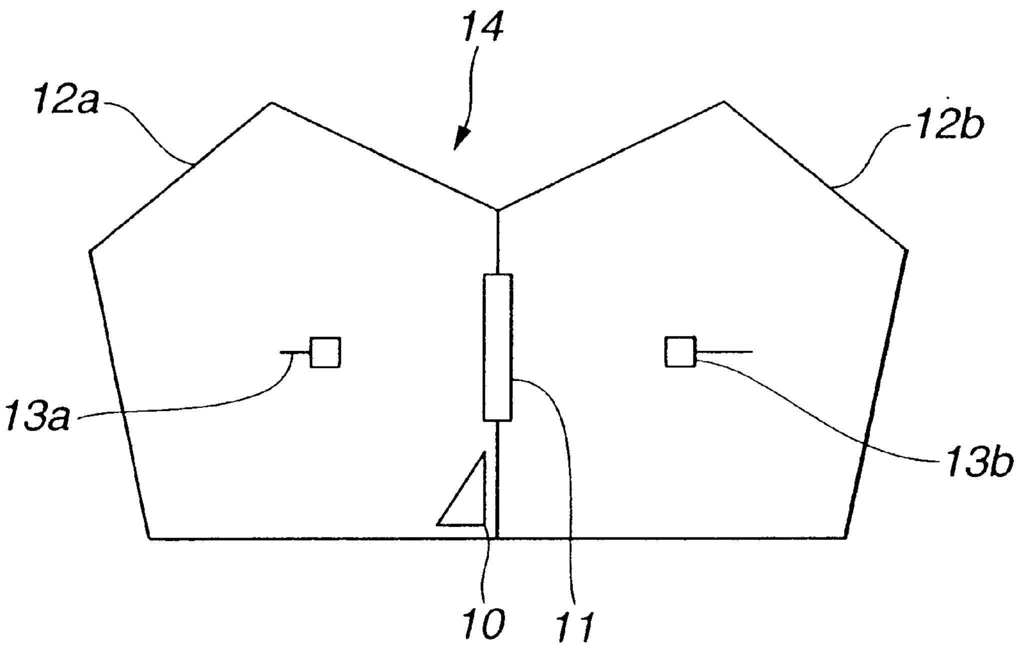
FIG. 7 is a plan view showing a transmission loss measuring apparatus used in evaluation test of the present invention.

FIG. 7 shows apparatus for measuring acoustic transmission loss, used to evaluate the sound insulating performance of the practical examples. This measuring apparatus is a reduced-size form of the transmission loss measurement apparatus defined in JIS A1416. This measuring apparatus is equipped with two reverberation boxes 12*a* and 12*b* (on input and output sides, respectively). A speaker 10 as a sound source is installed in one reverberation box 12*a*, a sample that is to be measured is fitted onto a partition wall 11 that partitions the reverberation boxes 12*a* and 12*b*, and measurement devices 13*a* and 13*b* (on the input and output sides, respectively) for measurement of the sound pressure are built respectively in the reverberation boxes 12*a* and 12*b*.

The transmission loss TL (dB) is given by the following equation as the difference between the sound pressure values measured by the measurement devices 12*a* and 12*b*, that is, the difference between the sound pressure value I (dB) on the sound source (speaker) side (12*a*) and the sound pressure O (dB) on the other side with no sound source.

$$TL(dB)=I(dB)-O(dB)$$

COMPARATIVE EXAMPLE 1 (ICE1)

Figure 8:
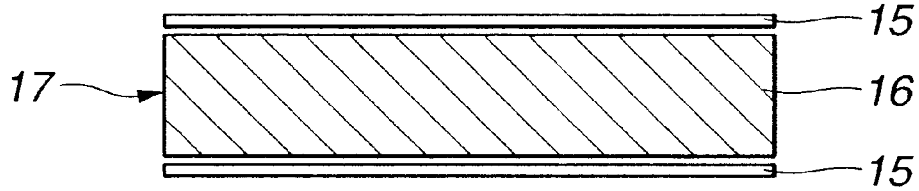
FIG. 8 is a sound insulating laminate structure which can be employed in the present invention.
Figure 9:
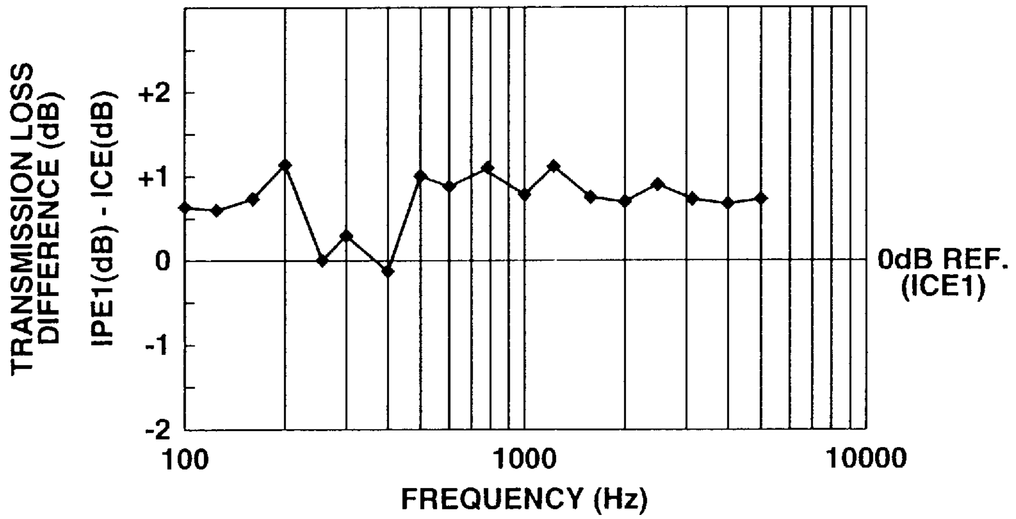
FIG. 9 is a graph showing a transmission loss difference between practical example I1(IPE1) and comparative example I1(ICE1).

Polyester fiber (fiber diameter=36 μm; fiber cut length=51 mm; product of Unitika Ltd.; brand H38F) and binder fiber (fiber diameter=14 μm; fiber cut length=51 mm; product of Unitika, Ltd.; brand 4080) were mixed at a mass ratio of 80:20 to form a fiber body 16 as shown in FIG. 8. The fibrous body 18 of this example is a fibrous plate having a thickness of 20 mm and an average apparent density of 0.025 $g/cm^3$. This fibrous plate 16 was then sandwiched between steel plates (plate materials) 15 having a plate thickness of 0.8 mm to form a sound insulating structure 17 as shown in FIG. 8. The acoustic transmission loss (TL) of this structure 17 was measured with the transmission loss measuring apparatus 14 of FIG. 7. FIG. 9 shows the results of the measurement, as reference value.

PRACTICAL EXAMPLE 1 (IPE1)

Plain type fiber (fiber-diameter is 36 μm and fiber cut length is 51 mm) was produced from a resin prepared by mixing BaTiO3 piezoelectric material in PP resin (MFR25) at a volume ratio of 1:1. Then, this fiber was mixed with binder fiber (fiber diameter=14 μm; fiber cut length=51 mm; product of Unitika Ltd.; brand 4080) at a mass ratio of 80:20 to form a fiber body 16, as shown in FIG. 8, having a thickness of 20 mm and an average apparent density of 0.025 $g/cm^3$. Thereafter, as in the comparative example, this fiber plate body 16 was then sandwiched between steel plates 15 having a plate thickness of 0.8 mm to form a sound insulating structure 17 as shown in FIG. 8. The acoustic transmission loss (TL) of this structure 17 was measured with the transmission loss measuring apparatus 14 of FIG. 7. FIG. 9 shows the results of the measurement, in terms of a transmission loss difference resulting from subtraction of a measured value (dB) of the comparative example 1 from a measured value (dB) of the practical example 1. As evident from FIG. 9, the practical example 1 can provide superior sound insulating effects as compared to the comparative example.

PRACTICAL EXAMPLE 2 (IPE2)

Figure 10:
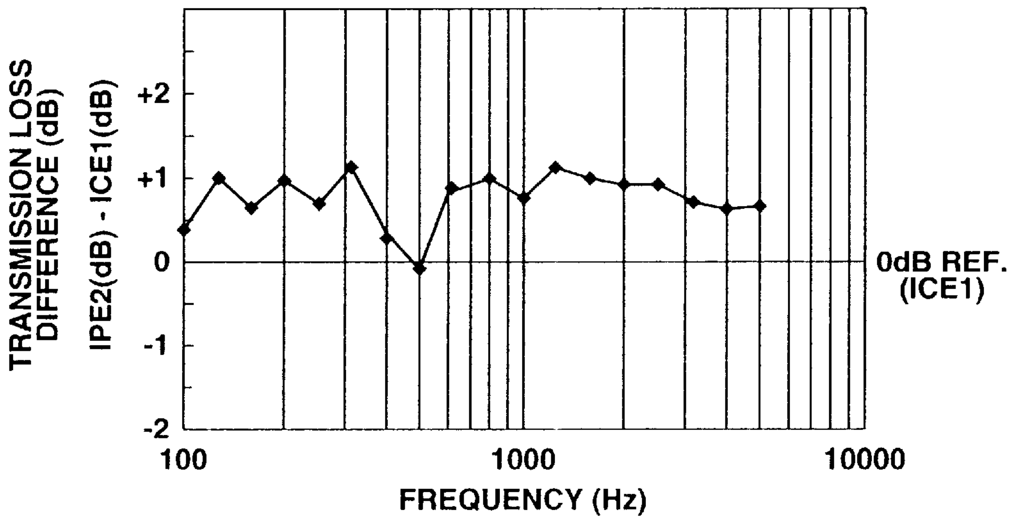
FIG. 10 is a graph showing a transmission loss difference between practical example I2(IPE2) and comparative example I1(ICE1).

Side-by-side type fiber (fiber diameter is 36 μm and fiber cut length is 51 mm) was produced from a resin of mixture of BaTiO3 piezoelectric material and PP resin (MFR25) at a volume ratio of 1:1, and a nylon 6 resin. Then, this side-by-side type fiber was mixed with binder fibers to form a fiber body 16 in the same manner as in the first practical example, and the transmission loss (TL) was measured in the form of a sound insulating structure including steel plates on both side of the fiber body in the same manner as in the first practical example. FIG. 10 shows the results of the measurement in comparison with the results of the first comparative example as in FIG. 9. The results verify superior sound insulating effects of the second practical example over the comparative example 1.

PRACTICAL EXAMPLE 3 (IPE3)

Figure 11:
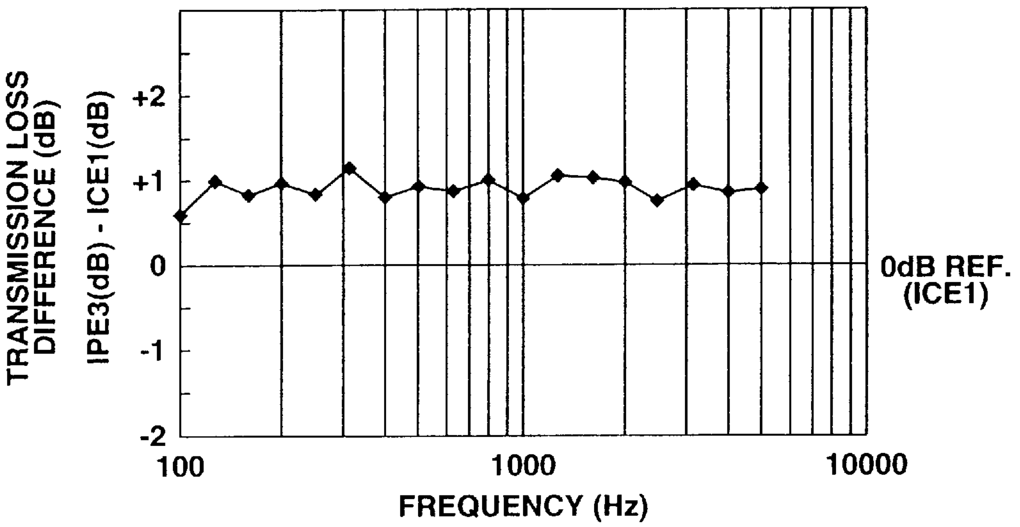
FIG. 11 is a graph showing a transmission loss difference between practical example I3(IPE3) and comparative example I1(ICE1).

Core-sheath type fiber (fiber diameter is 36 μm and fiber cut length is 51 mm) produced in this example has a central core portion of a resin formed by mixture of BaTiO3 piezoelectric material and PP resin (MFR25) at a volume ratio of 1:1, and an outer sheath portion of a nylon 6 resin. Then, this core-sheath type fiber was mixed with binder fibers to form a fiber body 16 in the same manner as in the first practical example, and the transmission loss (TL) was measured in the form of a sound insulating structure including steel plates on both side of the fiber body in the same manner as in the first practical example. FIG. 11 shows the results of the measurement in comparison with the results of the first comparative example as in FIG. 9. The results verify superior sound insulating effects of the third practical example over the comparative example 1.

PRACTICAL EXAMPLE 4 (IPE4)

Figure 12:
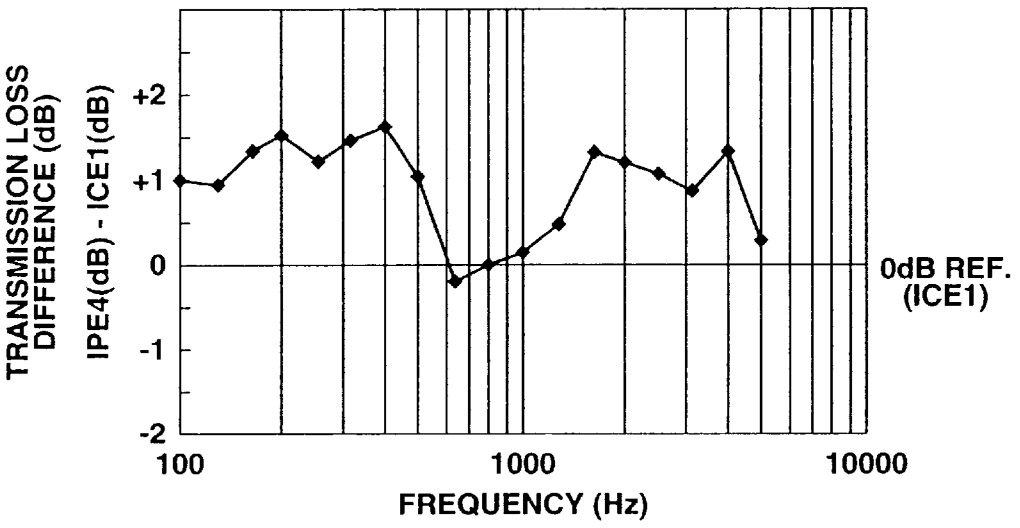
FIG. 12 is a graph showing a transmission loss difference between practical example I4(IPE4) and comparative example I1(ICE1).

Carbon fiber containing core-sheath type fiber (fiber diameter is 36 μm and fiber cut length is 51 mm) was produced by using a resin prepared by adding carbon fiber (vapor grown carbon fiber, produced by Showa Denko K.K., brand: VGCF) to a core resin of mixture of BaTiO3 piezoelectric material and PP resin (MFR25) so that a volume ratio of PP resin:BaTiO3:carbon fiber is 1:1:0.5, in the same manner as in the third practical example. By using this carbon fiber containing core-sheath fiber, a fiber body 16 was formed in the same manner as in the third practical example, and the transmission loss (TL) was measured in the form of a sound insulating structure in the same manner as in the first practical example. FIG. 12 shows the results of the measurement in comparison with the results of the first comparative example as in FIG. 9. The results verify superior sound insulating effects of the fourth practical example over the comparative example 1.

PRACTICAL EXAMPLE 5 (IPE5)

Figure 13:
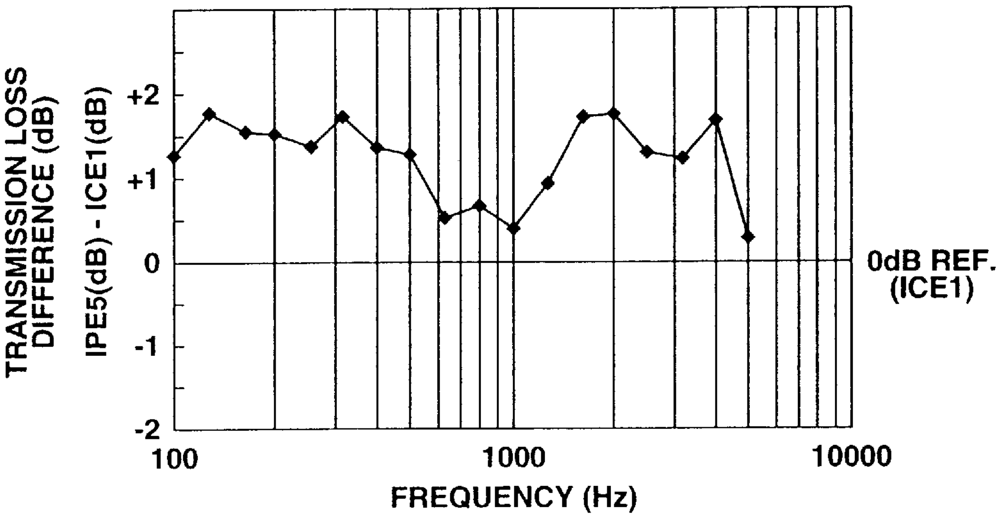
FIG. 13 is a graph showing a transmission loss difference between practical example I5(IPE5) and comparative example I1(ICE1).

The conditions of a fifth practical example were identical to those of the fourth practical example except that the resins forming the core portion and the sheath portion are nylon 6 (Toray Industries, Inc., brand:1007), and the transmission loss (TL) was measured. The measurement results plotted in FIG. 13 shows superior sound insulating effects of the fifth practical example over the first comparative example and superior performance over the fourth practical example.

PRACTICAL EXAMPLE 6 (IPE6)

Figure 14:
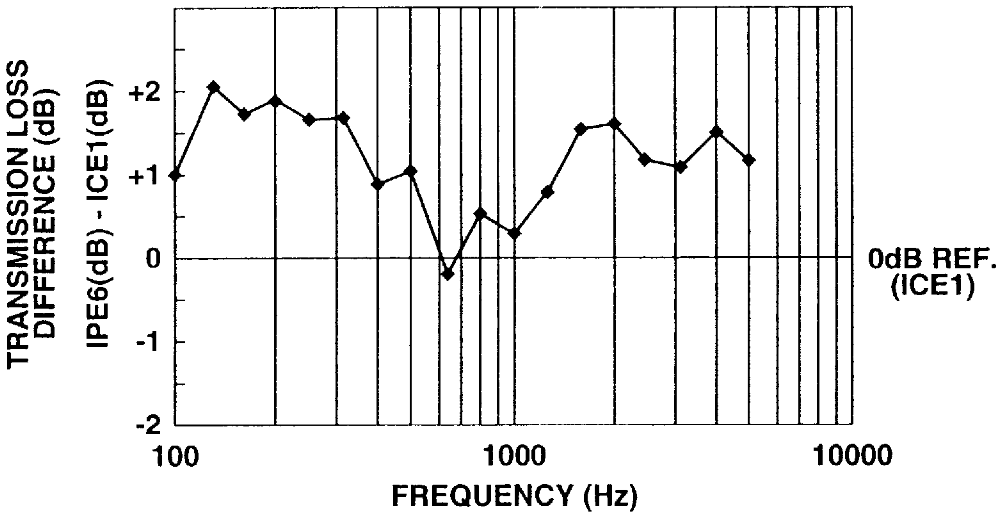
FIG. 14 is a graph showing a transmission loss difference between practical example I6(IPE6) and comparative example I1(ICE1).

The conditions of a sixth practical example were identical to those of the fourth practical example except that the BatiO3 piezoelectric material for forming the core portion is replaced by PZT piezoelectric material, and the transmission loss (TL) was measured. The measurement results plotted in FIG. 14 shows superior sound insulating effects of the sixth practical example over the first comparative example and superior performance like the third practical example.

PRACTICAL EXAMPLE 7 (IPE7)

Figure 15:
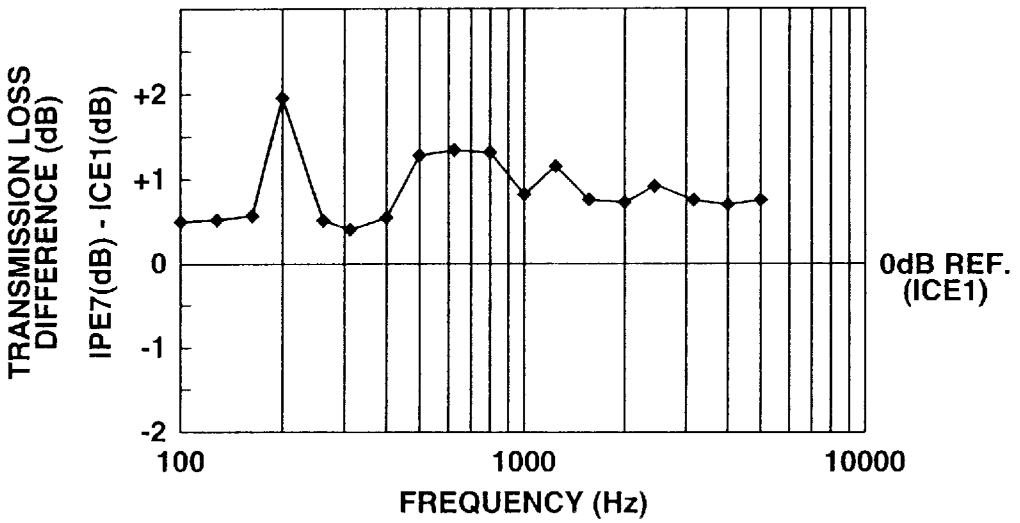
FIG. 15 is a graph showing a transmission loss difference between practical example I7(IPE7) and comparative example I1(ICE1).

Polyvinylidene Fluoride (PVDF) resin (Kureha Chemical Industry Co. Ltd., brand #850) was used for melt spinning to produce fiber containing 20% of β crystal in PVDF crystal. This fiber was used to form a fiber body in the same manner as in the first practical example etc., and the transmission loss (TL) was measured in the form of a sound insulating structure in the same manner as in the first practical example. FIG. 15 shows the results of the measurement which verify superior sound insulating effects of the seventh practical example over the comparative example 1. A proportion of the β phase was calculated according to the following equation, from diffraction intensities of the α and β phases in wide angle X-ray diffraction.

Proportion of β crystal=diffraction intensity of β crystal/(diffraction intensity of α crystal+diffraction intensity of β crystal)

PRACTICAL EXAMPLE 8 (IPE8)

Figure 16:
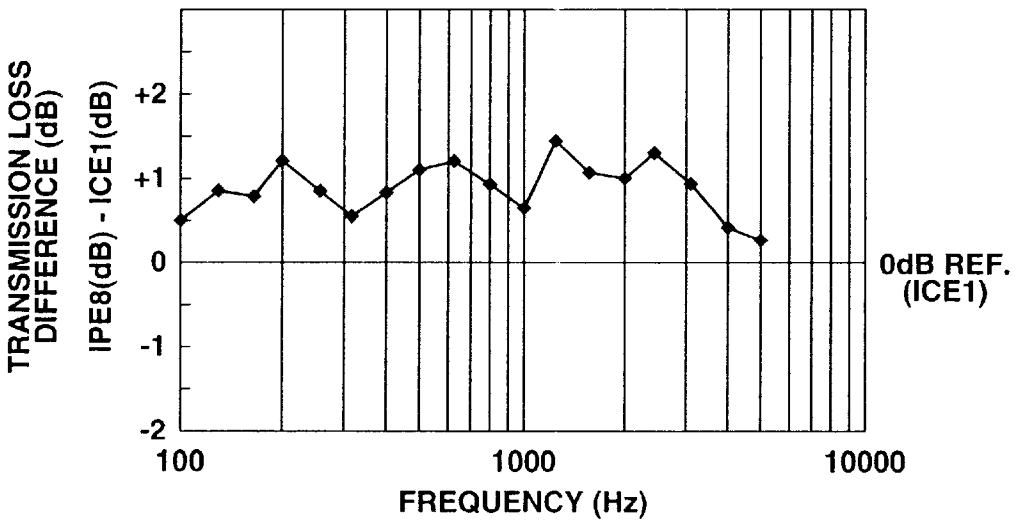
FIG. 16 is a graph showing a transmission loss difference between practical example I8(IPE8) and comparative example I1(ICE1).

By adding, to PVDF resin of the seventh practical example (IPE7), carbon fiber (vapor grown carbon fiber, produced by Showa Denko K.K., brand: VGCF) at a volume ratio of 1:0.25, carbon fiber containing resin was prepared and used for melt spinning to produce fiber containing 20% of β crystal in PVDF crystal as in the seventh practical example. This fiber was used to form a fiber body in the same manner as in the first practical example etc., and the transmission loss (TL) was measured in the form of a sound insulating structure in the same manner as in the first practical example. FIG. 16 shows the results of the measurement which verify superior sound insulating effects of the eighth practical example over the comparative example 1.

Similar results were confirmed by replacing the carbon fiber by carbon powder.

PRACTICAL EXAMPLE 9 (IPE9)

Figure 17:
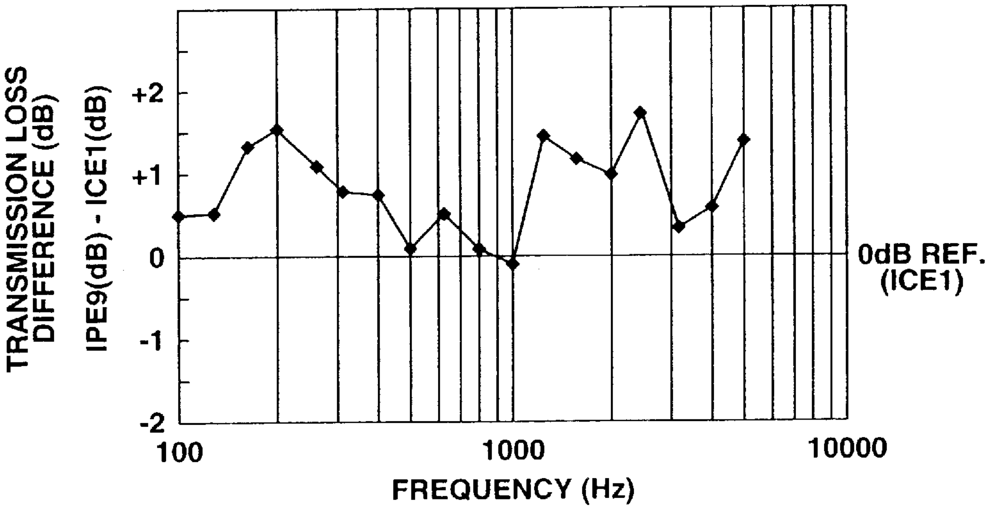
FIG. 17 is a graph showing a transmission loss difference between practical example I9(IPE9) and comparative example I1(ICE1).

A fire body in the form of a collection or aggregate of constituent fibers was prepared in the same manner as in the eighth practical example (IPE8) except that PVDF resin is replaced by poly(vinylidene fluoride/trifluoroethylene) (P(VDF/TrFE) copolymer, and the transmission loss (TL) was measured in the same manner as in the first practical example. FIG. 17 shows the results of the measurement, confirming superior sound insulating effects of the ninth practical example over the comparative example 1.

PRACTICAL EXAMPLE 10 (IPE10)

Figure 18:
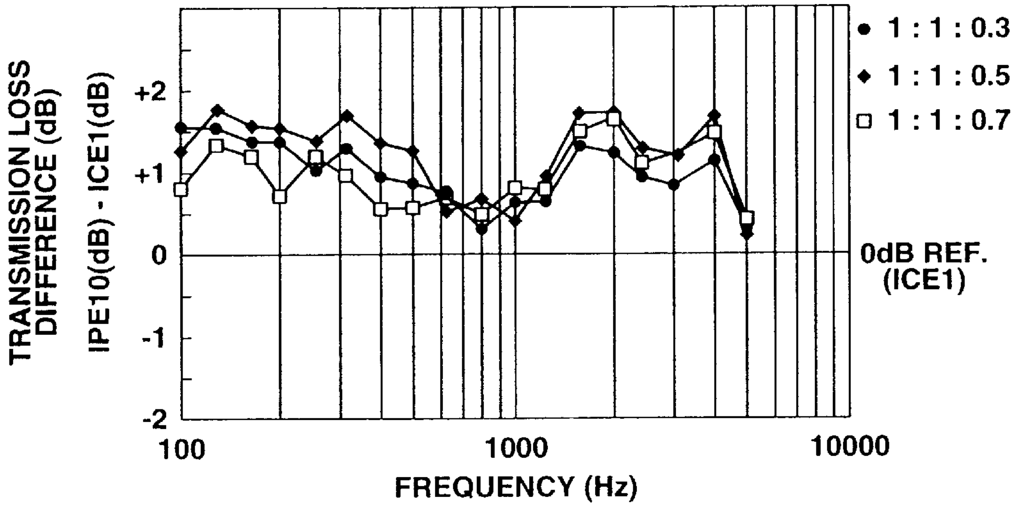
FIG. 18 is a graph showing a transmission loss difference between practical example I10(IPE10) and comparative example I1(ICE1).

A fire body in the form of a collection or aggregate of constituent fibers was prepared in the same manner as in the fourth practical example (IPE4) except that a volume ratio of PP resin:BaTiO3:carbon fiber is changed from 1:1:0.5 to 1:1:0.3 and 1:1:0.7, and, and the transmission loss (TL) was measured in the same manner. FIG. 18 shows the results of the measurement. As evident from FIG. 18, the fourth practical example (IPE4) having the ratio of 1:1:0.5 is best. It is considered that the capacitance of the piezoelectric material and the electric resistance R of the surrounding satisfy the equation EQ1 {f1=½π√(LC)} at the condition of the fourth practical example, and this condition is the most efficient condition.

PRACTICAL EXAMPLE 11 (IPE11)

Figure 19:
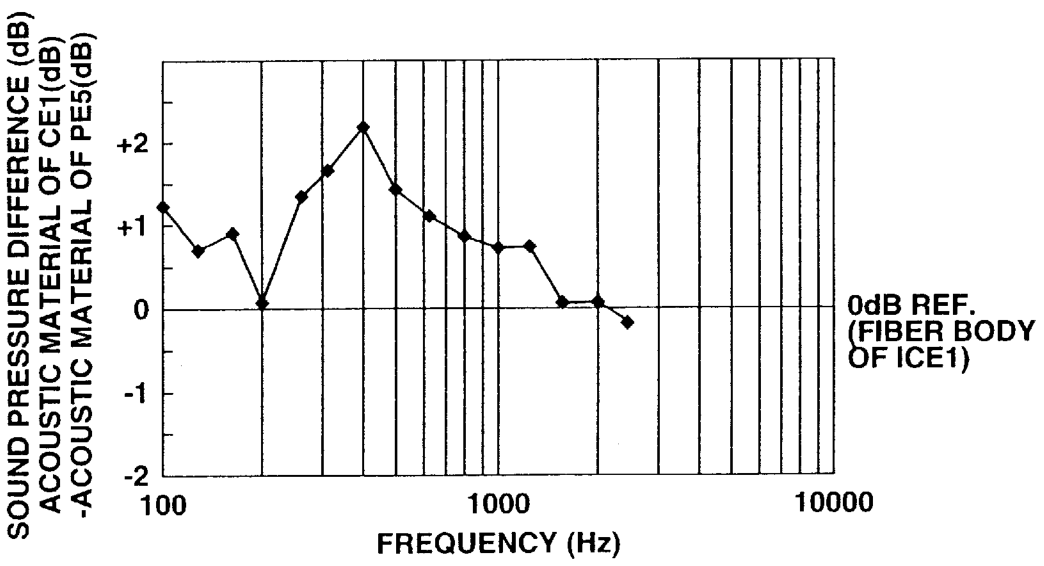
FIG. 19 is a graph showing a nearby sound pressure difference between comparative example I1(ICE1) and practical example I5(IPE5).
Figure 20:
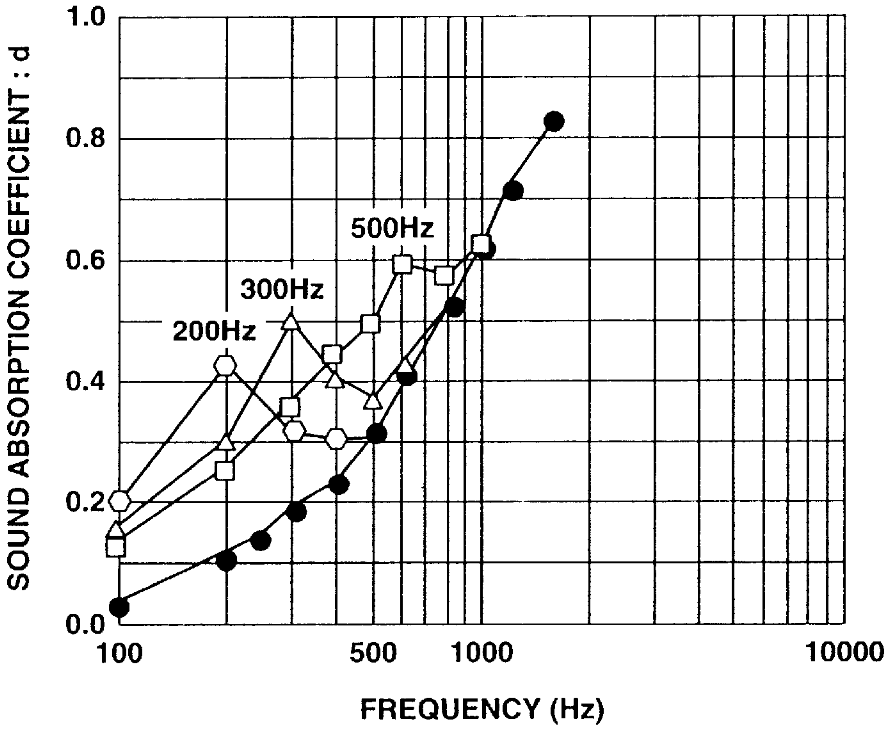
FIG. 20 is a graph showing normal incident sound absorption coefficient.

Fiber body of each of the practical example 5 (IPE5) and the comparative example 1(ICE1) was prepared and affixed to an engine cover for motor vehicles, and sound pressure was measured in the vicinity for comparison. FIG. 19 shows the results of the measurement. The measurement was made by using a vehicle with an engine having a displacement of 3 liters, at an engine speed of 3000 rpm. The results show that the engine cover having the fiber body according to the present invention can provide more desirable effects.

The following is explanations on Practical Examples 12~32 (IPE12~IPE32), Comparative Examples 2~9 (ICE2~ICE9) and Informative Examples 1~9 (IIE1~IIE9).

PRACTICAL EXAMPLES 12 (IPE12)

Core-sheath fiber was prepared by spinning and stretching. Core-sheath fiber prepared has a core portion of a resin prepared by mixing 20 mass % of PA6 resin (δs=$2.9\times10^4$ $(J/m^3)^{0.5}$) as a thermoplastic resin, 40 mass % of TiBaO3 as a piezoelectric component, 40 mass % of N,N-dicyclohexyl-2-benzothiazyl sulfenamide (hereinafter referred to as DCHBSA) (δs=$2.3\times10^4$ $(J/m^3)^{0.5}$) as strongly polar organic component, and a sheath portion containing only PA6 resin. The diameter of a single core-sheath fiber is 36 μm (micrometer). Thereafter, the thus-prepared core-sheath fiber was cut to short fiber having a length of about 50 mm.

In this short fiber, the piezoelectric resonance frequency was adjusted at 300 Hz according to Equation EQ1 by the piezoelectric component and a pseudo inductance of the matrix resin and the strongly polar organic component.

80 mass % of this fiber was mixed with 20 mass % of polyester type binder fiber having a softening point of approximately 110° C. and a diameter of 15 μm (micrometer), and formed by a card layering method, into a piezoelectric non-woven fabric sound absorbing material (1) having a thickness area density of 1.0 kg/$m^2$ and a thickness of 30 mm.

PRACTICAL EXAMPLES 13 (IPE13)

Short fiber was prepared in the same manner as in the twelfth practical example (IPE12) except that the core portion is made of a resin containing 70 mass % of TiBaO3 as piezoelectric component, and 10 mass % of DCHBSA as strongly polar organic component.

This short fiber was adjusted to have a piezoelectric resonance frequency at 300 Hz according to Equation EQ1.

From this short fiber, a piezoelectric non-woven fabric sound absorbing material (2) of the same specification was prepared in the same manner by the same method.

PRACTICAL EXAMPLES 14 (IPE14)

Short fiber was prepared in the same manner as in the twelfth practical example (IPE12) except that the core portion is made of a resin containing 10 mass % of TiBaO3 as piezoelectric component, and 70 mass % of DCHBSA as strongly polar organic component.

This short fiber was adjusted to have a piezoelectric resonance frequency at 300 Hz according to Equation EQ1.

From this short fiber, a piezoelectric non-woven fabric sound absorbing material (3) of the same specification was prepared under the same mixing conditions by air blow method.

PRACTICAL EXAMPLE 15 (IPE15)

Short fiber was prepared in the same manner as in the twelfth practical example (IPE12) except that the core portion is made of a resin containing 40 mass % of lead zirconate titanate (PZT) as piezoelectric component, and 40 mass % of DCHBSA as strongly polar organic component.

This short fiber was adjusted to have a piezoelectric resonance frequency at 300 Hz according to Equation EQ1.

From this short fiber, a piezoelectric non-woven fabric sound absorbing material (4) of the same specification was prepared by the same method as in twelfth practical example (IPE12).

PRACTICAL EXAMPLE 16 (IPE16)

Short fiber was prepared in the same manner as in twelfth practical example (IPE12) except that the core portion is made of a resin containing 40 mass % of TiBaO3 as piezoelectric component, and 40 mass % of mercaptobenzothiazole (MBT) (δs=$2.4\times10^4(J/m^3)^{0.5}$) as strongly polar organic component.

This short fiber was adjusted to have a piezoelectric resonance frequency at 200 Hz according to Equation EQ2 {f2=½π√(RC)} by the piezoelectric component, and the pseudo resistance of the matrix resin and the polar organic component.

From this short fiber, a piezoelectric non-woven fabric sound absorbing material (5) of the same specification was prepared by the same method as in twelfth practical example (IPE12).

PRACTICAL EXAMPLE 17 (IPE17)

Short fiber was prepared in the same manner as in twelfth practical example (IPE12) except that the core portion is made of a resin containing 40 mass % of dibenzothiazyl disulfide (MBTS) (δs=$2.3\times10^4(J/m^3)^{0.5}$) as strongly polar organic component.

This short fiber was adjusted to have a piezoelectric resonance frequency at 300 Hz according to Equation EQ1.

From this short fiber, a piezoelectric non-woven fabric sound absorbing material (6) of the same specification was prepared by the same method as in twelfth practical example (IPE12).

PRACTICAL EXAMPLE 18 (IPE18)

Short fiber was prepared in the same manner as in twelfth practical example (IPE12) except that the core portion is made of a resin containing 40 mass % of tetramethylthiuram disulfide (TMTM) (δs=$2.4\times10^4$ $(J/m^3)^{0.5}$) as strongly polar organic component.

This short fiber was adjusted to have a piezoelectric resonance frequency at 200 Hz according to Equation EQ2.

From this short fiber, a piezoelectric non-woven fabric sound absorbing material (7) of the same specification was prepared by the same method as in twelfth practical example (IPE12).

PRACTICAL EXAMPLE 19 (IPE19)

Short fiber was prepared in the same manner as in twelfth practical example (IPE12) except that the resin of the core portion contains 40 mass % of a mixture of thiurams (δs=approximately $2.7\times10^4 (J/m^3)^{0.5}$) as strongly polar organic component.

This short fiber was adjusted to have a piezoelectric resonance frequency at 200 Hz according to Equation EQ2.

From this short fiber, a piezoelectric non-woven fabric sound absorbing material (8) of the same specification was prepared by the same method as in twelfth practical example (IPE12).

PRACTICAL EXAMPLE 20 (IPE20)

Short fiber was, prepared in the same manner as in twelfth practical example (IPE12) except that the core portion is made of a resin containing 40 mass % of a mixture of guanidines (δs=approximately $2.0\times10^4$ $(J/m^3)^{0.5}$) as strongly polar organic component.

This short fiber was adjusted to have a piezoelectric resonance frequency at 500 Hz according to Equation EQ1.

From this short fiber, a piezoelectric non-woven fabric sound absorbing material (9) of the same specification was prepared by the same method as in twelfth practical example (IPE12).

PRACTICAL EXAMPLE 21 (IPE21)

Short fiber was prepared in the same manner as in twelfth practical example (IPE12) except that 20 mass % of PA66 resin (δs=approximately $2.8\times10^4 (J/m^3)^{0.5}$) as thermoplastic resin was used, and the resin of the sheath portion contains only PA66 resin.

This short fiber was adjusted to have a piezoelectric resonance frequency at 200 Hz according to Equation EQ2.

From this short fiber, a piezoelectric non-woven fabric sound absorbing material (10) of the same specification was prepared by the same method as in twelfth practical example (IPE12).

PRACTICAL EXAMPLE 22 (IPE22)

Short fiber was prepared in the same manner as in twelfth practical example (IPE12) except that 20 mass % of polybutylene terephthalate (PBT) resin (δs=approximately $2.2\times10^4 (J/m^3)^{0.5}$) as thermoplastic resin was used, and the resin of the sheath portion contains only the PBT resin.

This short fiber was adjusted to have a piezoelectric resonance frequency at 300 Hz according to Equation EQ1.

From this short fiber, a piezoelectric non-woven fabric sound absorbing material (11) of the same specification was prepared by the same method as in twelfth practical example (IPE12).

PRACTICAL EXAMPLE 23 (IPE23)

Short fiber was prepared in the same manner as in twelfth practical example (IPE12) except that 20 mass % of polypropylene (PP) resin (δs=approximately $1.6\times10^4$ $(J/m^3)^{0.5}$) as thermoplastic resin was used, and the resin of the sheath portion contains only the PP resin.

This short fiber was adjusted to have a piezoelectric resonance frequency at 500 Hz according to Equation EQ1.

From this short fiber, a piezoelectric non-woven fabric sound absorbing material (12) of the same specification was prepared by the same method as in twelfth practical example (IPE12).

PRACTICAL EXAMPLE 24 (IPE24)

Short fiber was prepared in the same manner as in twelfth practical example (IPE12) except that 20 mass % of polystyrene (PS) resin (δs=approximately $1.7\times10^4$ $(J/m^3)^{0.5}$) as thermoplastic resin was used, and the resin of the sheath portion contains only the PS resin.

This short fiber was adjusted to have a piezoelectric resonance frequency at 500 Hz according to Equation EQ1.

From this short fiber, a piezoelectric non-woven fabric sound absorbing material (13) of the same specification was prepared by the same method as in twelfth practical example (IPE12).

PRACTICAL EXAMPLE 25 (IPE25)

Short fiber was prepared in the same manner as in twelfth practical example (IPE12) except that 20 mass % of poly (trimethylene terephthalate) (PTT) resin (δs=approximately $2.2\times10^4 (J/m^3)^{0.5}$) as thermoplastic resin was used, and the resin of the sheath portion contains only the PTT resin.

This short fiber was adjusted to have a piezoelectric resonance frequency at 500 Hz according to Equation EQ1.

From this short fiber, a piezoelectric non-woven fabric sound absorbing material (14) of the same specification was prepared by the same method as in twelfth practical example (IPE12).

PRACTICAL EXAMPLE 26 (IPE26)

Short fiber was prepared in the same manner as in twelfth practical example (IPE12) except that the thermoplastic resin contains 15 mass % of PA6 resin, 40 mass % of TiBaO3 as piezoelectric component, 40 mass % of DCH-BSA as strongly polar organic component and 5 mass % of carbon fiber as additive component.

This short fiber was adjusted to have a piezoelectric resonance frequency at 300 Hz according to Equation EQ1.

From this short fiber, a piezoelectric non-woven fabric sound absorbing material (15) of the same specification was prepared by the same method as in twelfth practical example (IPE12).

PRACTICAL EXAMPLE 27 (IPE27)

Short fiber was prepared in the same manner as in practical example 26 (IPE26) except that the thermoplastic resin contains 5 mass % of carbon powder instead of carbon fiber as additive component.

This short fiber was adjusted to have a piezoelectric resonance frequency at 300 Hz according to Equation EQ1.

From this short fiber, a piezoelectric non-woven fabric sound absorbing material (16) of the same specification was prepared by the same method as in twelfth practical example (IPE12).

PRACTICAL EXAMPLE 28 (IPE28)

Short fiber was prepared in the same manner as in twelfth practical example (IPE12) except that the thermoplastic resin contains 35 mass % of PA6 resin, 30 mass % of TiBaO3 as piezoelectric component, 30 mass % of DCH-BSA as strongly polar organic component and 5 mass % of carbon fiber as additive component.

This short fiber was adjusted to have a piezoelectric resonance frequency at 500 Hz according to Equation EQ1.

From this short fiber, a piezoelectric non-woven fabric sound absorbing material (17) of the same specification was prepared by the same method as in practical example 12 (IPE12).

PRACTICAL EXAMPLE 29 (IPE29)

Short fiber was prepared in the same manner as in twelfth practical example (IPE12) except that the mixed resin of the same mixture as in practical example 12, and PA6 resin were used to form side-by-side fiber (fiber diameter is 36 μm, and fiber cut length is 51 mm).

This short fiber was adjusted to have a piezoelectric resonance frequency at 300 Hz according to Equation EQ1.

From this short fiber, a piezoelectric non-woven fabric sound absorbing material (18) of the same specification was prepared by the same method as in practical example 12 (IPE12).

PRACTICAL EXAMPLE 30 (IPE30)

Short fiber was prepared in the same manner as in practical example 12 (IPE12) except that core-sheath type fiber (diameter of single fiber is 40 μm) was prepared by spinning and drawing by using only the mixed resin of the same mixture as in practical example 12, and the core-sheath fiber was to a fiber length of about 50 mm.

This short fiber was adjusted to have a piezoelectric resonance frequency at 300 Hz according to Equation EQ1.

From this short fiber, a piezoelectric non-woven fabric sound absorbing material (19) of the same specification was prepared by the same method as in practical example 12 (IPE12).

PRACTICAL EXAMPLE 31 (IPE31)

By using 100 mass % of fiber obtained by the production method of practical example 12 (IPE12), a piezoelectric non-woven fabric sound absorbing material (20) was prepared by card layer method and needle punching method. This non-woven fabric sound absorbing material (20) has a thickness area density of 1.0 $kg/m^2$, 30 mm.

PRACTICAL EXAMPLE 32 (IPE32)

By using a mixture of 10 mass % of fiber obtained by practical example 12 (IPE12), 70 mass % of polyester fiber having a fiber diameter of 14 μm, and 20 mass % of polyester type binder fiber of 2 denier, having a softening point of about 110° C., a piezoelectric non-woven fabric sound absorbing material (21) was prepared by card layer method and needle punching method. This non-woven fabric sound absorbing material (21) has a thickness area density of 1.0 $kg/m^2$, and a thickness of 30 mm.

COMPARATIVE EXAMPLE 2 (ICE2)

By using a mixture of 80 mass % of polyester fiber having a fiber diameter of 14 μm, and 20 mass % of polyester type binder fiber having a diameter of 14 μm and a softening point of about 110° C., a piezoelectric non-woven fabric sound absorbing material was prepared by card layer method. This non-woven fabric sound absorbing material has a thickness area density of 1.0 $kg/m^2$, and a thickness of 30 mm.

COMPARATIVE EXAMPLE 3 (ICE3)

Trial was made to produce fiber in the same manner as in practical example 12 (IPE12) except that, as strongly polar organic component, diiso decyl terephtalate (δs= approximately $1.8\times10^4(J/m^3)^{0.5}$) or other compound having such a level of SP value-was used. However, the mixture for the mixed resin was difficult and the fiber productivity became poor.

COMPARATIVE EXAMPLE 4 (ICE4)

Trial was made to produce fiber in the same manner as in practical example 12 (IPE12) except that, as strongly polar organic component, a mixture of thiurams (δs= approximately $3.0\times10^4(J/m^3)^{0.5}$) or other compound having such a level of SP value was used. However, the thermal stability of the strongly polar organic component is low and a part decomposed during the mixing process.

COMPARATIVE EXAMPLE 5 (ICE5)

Fiber was produced in the same manner as in practical example 12 (IPE12) except that, as thermoplastic resin, polyethylene (PE) (δs=approximately $1.3\times10^4(J/m^3)^{0.5}$) was used, and a non-woven fabric sound absorbing material was produced from this fiber. However, no or little piezoelectric effects appeared and the fiber was very hard to produce.

COMPARATIVE EXAMPLE 6 (ICE6)

Trial was made to produce fiber in the same manner as in practical example 12 (IPE12) except that, as thermoplastic resin, cellulose (δs=approximately $3.2\times10^4$ $(J/m^3)^{0.5}$) was used. However, the mixture for the mixed resin was difficult, the spinnability was poor and the fiber was very hard to produce.

COMPARATIVE EXAMPLE 7 (ICE7)

Fiber was produced in the same manner as in practical example 12 (IPE12) except that the mixing percentage of the piezoelectric fiber was 8 mass %, and the mixing percentage of the 14 μm-diameter polyester fiber was 72 mass %, and a non-woven fabric sound absorbing material was produced from this fiber in the same manner. However, no or little piezoelectric effects appeared.

COMPARATIVE EXAMPLE 8 (ICE8)

Fiber was produced in the same manner as in practical example 12 (IPE12) except that the percentage of the thermoplastic resin was 48 mass %, the percentage of the piezoelectric component is 26 mass % and the percentage of the strongly polar organic component is 26 mass %, and a non-woven fabric sound absorbing material was produced from this fiber in the same manner. However, no or little piezoelectric effects appeared.

COMPARATIVE EXAMPLE 9 (ICE9)

Trial was made to produce fiber in the same manner as in practical example 12 (IPE12) except that the percentage of the thermoplastic resin was 8 mass %, the percentage of the piezoelectric component is 46 mass % and the percentage of the strongly polar organic component is 46 mass %., and a non-woven fabric sound absorbing material was produced from this fiber in the same manner. However, the amount of the matrix resin was too small to produce the mixed fiber.

INFORMATIVE EXAMPLE 1 (IIE1)

The piezoelectric non-woven fabric sound absorbing material (1) of practical example 12 was applied to the wall surfaces and ceiling of a room. Uncomfortable noise in a low frequency region was reduced as compared to conventional felt sound absorbing material. The effect of the sound absorption was not affected by the use of skin or covering for protecting the sound absorbing material, and adhesive.

INFORMATIVE EXAMPLE 2 (IIE2)

Piezoelectric non-woven fabric sound absorbing material (1) of practical example 12 was applied to the back side of head lining of a vehicle roof panel so that the low frequency side was on the passenger compartment's side. In this case, the level of the sound pressure at 500 Hz or less in the compartment was reduced by 1~2 dB on the average for all frequencies and a reduction effect of approximately 4 dB was seen for 300 Hz.

INFORMATIVE EXAMPLE 3 (IIE3)

Piezoelectric non-woven fabric sound absorbing material (1) obtained by practical example 12, was installed on the back surface of each pillar of a vehicle with the low frequency side being set to the compartment. In this case, the level of the sound pressure at 500 Hz or less in the compartment was reduced by 0.5~1 dB on the average for all frequencies and a reduction effect of approximately 2 dB was seen for 300 Hz.

INFORMATIVE EXAMPLE 4 (IIE4)

Piezoelectric non-woven fabric sound absorbing material (1) obtained by practical example 12 was installed on a rear parcel panel of a vehicle, the level of the sound pressure at 500 Hz or less in the compartment was reduced by 0.5~1 dB on the average for all frequencies and a reduction effect of approximately 2 dB was seen for 300 Hz.

INFORMATIVE EXAMPLE 5 (IIE5)

Piezoelectric non-woven fabric sound absorbing material (1) obtained by practical example 12 was installed on an engine room hood insulator of a vehicle. The level of the sound pressure at 500 Hz or less in the compartment was reduced by 1~2 dB on the average for all frequencies and the reduction effect of approximately 3 dB was seen for 300 Hz.

INFORMATIVE EXAMPLE 6 (IIE6)

Figure 22:
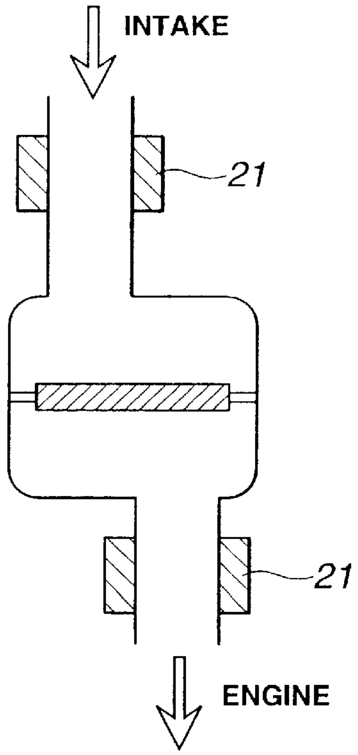
FIG. 22 is a schematic view showing a piezoelectric non-woven fabric sound absorbing member according to the present invention attached to a duct.

Piezoelectric non-woven fabric sound absorbing material (1) obtained by practical example 12 was installed on the inside of an intake duct of a vehicle (as shown in FIG. 22). The intake noise at 500 Hz or less was reduced by 1~2 dB on the average for all frequencies and the reduction effect of approximately 3 dB was seen for 300 Hz.

INFORMATIVE EXAMPLE 7 (IIE7)

Piezoelectric non-woven fabric sound absorbing material (1) obtained by practical example 12 was installed on the inside of an engine cover of a vehicle. The level of sound pressure at 500 Hz or less in the compartment was reduced by 1~2 dB on the average for all frequencies and the reduction effect of approximately 3 dB was seen for 300 Hz.

INFORMATIVE EXAMPLE 8 (IIE8)

Figure 23:
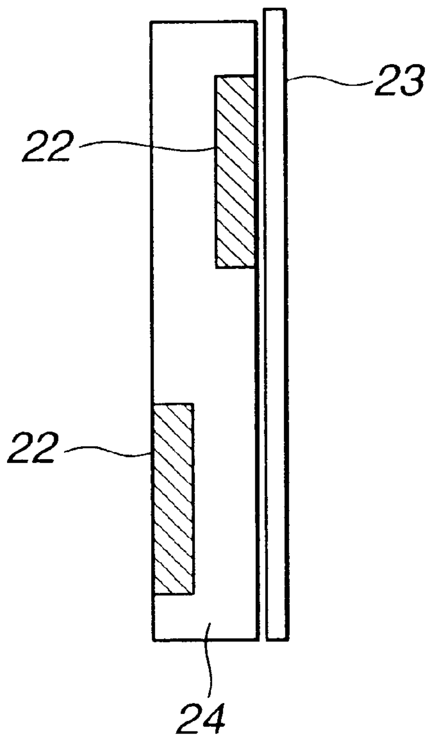
FIG. 23 is a schematic view showing a dash insulator according to the present invention.

Piezoelectric non-woven fabric sound absorbing material (1) obtained by practical example 12 was installed on a part of a sound absorbing material of a dash insulator of a vehicle (as shown in FIG. 23). The level of sound pressure at 500 Hz or less in the compartment was reduced by 0.5~1.0 dB on the average for all frequencies and the reduction effect of approximately 2 dB was seen for 300 Hz.

INFORMATIVE EXAMPLE 9 (IIE9)

Figure 24:
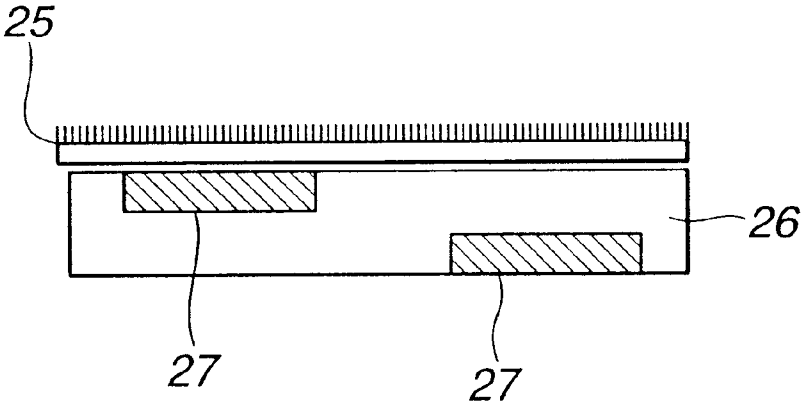
FIG. 24 is a schematic view showing a floor carpet according to the present invention.

Piezoelectric non-woven fabric sound absorbing material (1) obtained by practical example 12 was installed on a part of a sound absorbing material of a floor carpet of a vehicle (as shown in FIG. 24). The level of sound pressure at 500 Hz or less in the compartment was reduced by 0.5~1.0 dB on the average for all frequencies and the reduction effect of approximately 2 dB was seen for 300 Hz.

TEST EXAMPLE

The following test was conducted on the sound absorbing materials obtained by the above-mentioned practical examples 12~32 and comparative examples 29.

For the sound absorbing material samples obtained in these practical examples and comparative examples measurements of the normal incidence absorption coefficients for building materials by the pipe method as defined in JIS A1405 were carried out. The sample size is 100 mmϕ, and the measurement region is 100~1.6 kHz. The measurement results of the normal incidence absorption coefficients are shown in Table IT1, and FIG. 12 is a graph showing the sound absorption coefficient.

TABLE IT1

| Practical Example | Thermoplastic Resin (weight %) | Thermoplastic Resin SP × 10000 | Piezoelectric Component (weight %) | Strongly Polar Organic Component (weight %) | Strongly Polar Organic Component SP × 10000 | Other (weight %) | Type of Fiber |
|---|---|---|---|---|---|---|---|
| IPE12 | PA6, 20% | 2.9 | TiBaO3, 40% | DCHBSA, 40% | 2.3 | 0 | Core-Sheath |
| IPE13 | ↑ | ↑ | TiBaO3, 70% | DCHBSA, 10% | ↑ | ↑ | ↑ |
| IPE14 | ↑ | ↑ | TiBaO3, 10% | DCHBSA, 70% | ↑ | ↑ | ↑ |
| IPE15 | ↑ | ↑ | PZT, 40% | DCHBSA, 40% | ↑ | ↑ | ↑ |
| IPE16 | ↑ | ↑ | TiBaO3, 40% | MBT, 40% | 2.4 | ↑ | ↑ |
| IPE17 | ↑ | ↑ | ↑ | MBTS, 40% | 2.3 | ↑ | ↑ |
| IPE18 | ↑ | ↑ | ↑ | TMTM, 40% | 2.4 | ↑ | ↑ |
| IPE19 | ↑ | ↑ | ↑ | Thiuram, 40% | 2.7 | ↑ | ↑ |
| IPE20 | ↑ | ↑ | ↑ | Guanidine, 40% | 2.0 | ↑ | ↑ |
| IPE21 | PA66, 20% | 2.8 | ↑ | DCHBSA, 40% | 2.3 | ↑ | ↑ |
| IPE22 | PBT, 20% | 2.2 | ↑ | ↑ | ↑ | ↑ | ↑ |
| IPE23 | PP, 20% | 1.6 | ↑ | ↑ | ↑ | ↑ | ↑ |
| IPE24 | PS, 20% | 1.7 | ↑ | ↑ | ↑ | ↑ | ↑ |
| IPE25 | PTT, 20% | 2.2 | ↑ | ↑ | ↑ | ↑ | ↑ |
| IPE26 | PA6, 15% | 2.9 | ↑ | ↑ | ↑ | CF, 5% | ↑ |
| IPE27 | ↑ | ↑ | ↑ | ↑ | ↑ | CPowder, 5% | ↑ |
| IPE28 | PA6, 35% | ↑ | TiBaO3, 30% | DCHBSA, 30% | ↑ | CF, 5% | ↑ |
| IPE29 | PA6, 20% | ↑ | TiBaO3, 40% | DCHBSA, 40% | 2.3 | 0 | Side-by-Side |
| IPE30 | ↑ | ↑ | ↑ | ↑ | ↑ | ↑ | Normal |
| IPE31 | ↑ | ↑ | ↑ | ↑ | ↑ | ↑ | Core-Sheath |
| IPE32 | ↑ | ↑ | ↑ | ↑ | ↑ | ↑ | ↑ |
| ICE2 | — | — | — | — | — | — | — |

TABLE IT1-continued

| Practical Example | Amount of Piezoelectric Fiber (weight %) | Absorption Material Binder (weight %) | Set Frequency | Sound Absorption Coeff 200 Hz | 300 Hz | 500 Hz |
|---|---|---|---|---|---|---|
| IPE12 | 80 | 20 | 300(EQ1) | 0.30 | 0.50 | 0.42 |
| IPE13 | ↑ | ↑ | ↑ | 0.29 | 0.48 | 0.41 |
| IPE14 | ↑ | ↑ | ↑ | 0.30 | 0.52 | 0.43 |
| IPE15 | ↑ | ↑ | ↑ | 0.29 | 0.49 | 0.42 |
| IPE16 | ↑ | ↑ | 200(EQ2) | 0.45 | 0.35 | 0.40 |
| IPE17 | ↑ | ↑ | 300(EQ1) | 0.29 | 0.51 | 0.43 |
| IPE18 | ↑ | ↑ | 200(EQ2) | 0.46 | 0.34 | 0.39 |
| IPE19 | ↑ | ↑ | ↑ | 0.48 | 0.36 | 0.41 |
| IPE20 | ↑ | ↑ | 500(EQ1) | 0.25 | 0.35 | 0.60 |
| IPE21 | ↑ | ↑ | 200(EQ2) | 0.46 | 0.33 | 0.36 |
| IPE22 | ↑ | ↑ | 300(EQ1) | 0.28 | 0.46 | 0.40 |
| IPE23 | ↑ | ↑ | 500(EQ1) | 0.24 | 0.33 | 0.58 |
| IPE24 | ↑ | ↑ | ↑ | 0.24 | 0.34 | 0.58 |
| IPE25 | ↑ | ↑ | ↑ | 0.22 | 0.33 | 0.57 |
| IPE26 | ↑ | ↑ | 300(EQ1) | 0.29 | 0.50 | 0.41 |
| IPE27 | ↑ | ↑ | ↑ | 0.30 | 0.50 | 0.40 |
| IPE28 | ↑ | ↑ | 500(EQ1) | 0.26 | 0.36 | 0.59 |
| IPE29 | ↑ | ↑ | 300(EQ1) | 0.31 | 0.50 | 0.41 |
| IPE30 | ↑ | ↑ | ↑ | 0.32 | 0.52 | 0.42 |
| IPE31 | 100 | 0 | ↑ | 0.31 | 0.53 | 0.44 |
| IPE32 | 10 | 20 | ↑ | 0.20 | 0.30 | 0.22 |
| ICE2 | — | — | — | 0.10 | 0.19 | 0.35 |

As evident from Table IT1, the piezoelectric type non-woven fabric sound reducing materials of the practical examples are superior in the entire frequency range, especially at preset frequencies. The illustrative examples show the superior sound reducing performance of the piezoelectric non-woven fabric sound reducing material of the practical examples when used-in-various applications.

Thus, the sound reducing material of the fiber body according to the present invention is excellent and suitable to buildings, vehicles such as motor vehicles and electric railcars, airplanes, marine vessels, internal combustion engines, etc., and especially to applications where noise reduction is needed at a predetermined low frequency.

The benzothiazoles, benzothiazyl sulfenamides and thiurams which can be used in the present invention are represented by the following structural formulae.

[Chemical Formula I1]

Benzothiazoles: R1 is H or an alkyl group or an alkyl group derivative.

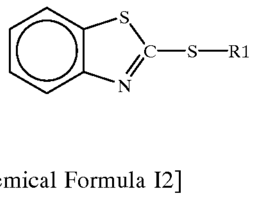

[Chemical Formula I2]

(Benzothiazyl) Sulfenamides: Each of R1 and R2 is H or an alkyl group or an alkyl group derivative.

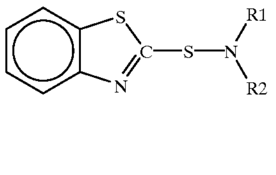

[Chemical Formula I3]

Thiurams: Each of R1 and R2 is H or an alkyl group or an alkyl group derivative; x:1, 2, 4.

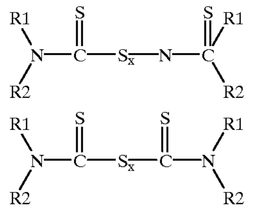

Figure 25A:
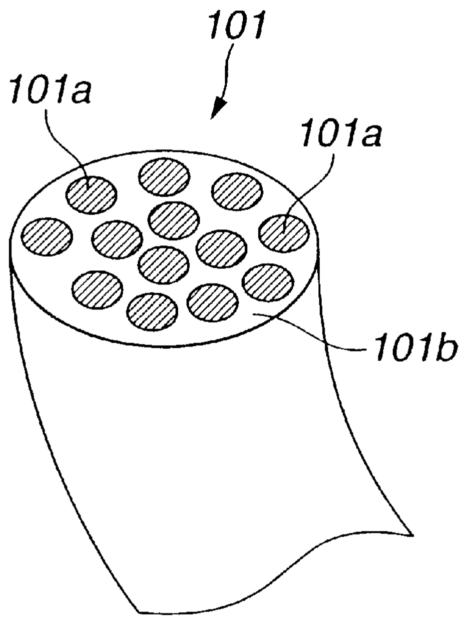
FIGS. 25A and 25B are schematic views, which show examples of forms of sea-island type composite fiber bodies that are energy conversion fiber bodies according to this invention.
Figure 25B:
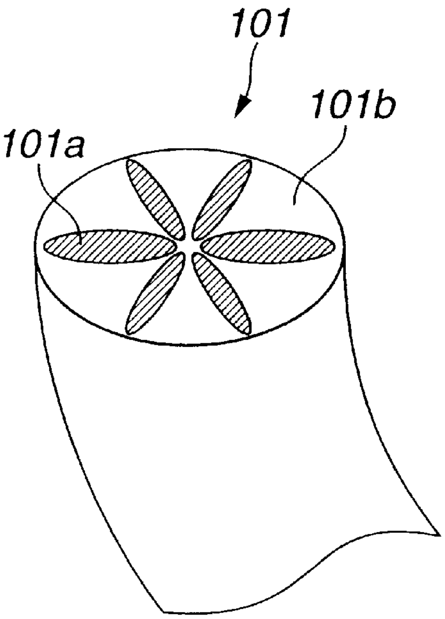

FIGS. 25A and 25B and the subsequent figures show a second aspect of the present invention.

Though an energy conversion fiber body according to this invention can provide the stated effects as long as it is a fiber body, sea-island type composite fiber body, binder-type composite fiber body, core-sheath type composite fiber body are advantageous in the following points.

FIGS. 25A and 25B show sea-island type composite fiber bodies according to one embodiment of the present invention. The sea-island composite fiber body of each of FIGS. 25A and 25B includes at least one sea-island composite fiber 101 which is 10 to 100 μm in average diameter. The sea-island composite fiber 101 includes an island component 101*a* and a sea component 101*b*. The island component 101*a* occupies 10 to 90% of the fiber cross-sectional area, and includes a plurality of island subcomponent each of which is in the form of a fine fiber of 1 to 50 μm average diameter. The a sea component 101*b* surrounds and integrates the island subcomponents 101*a*. The island components 101*a* and the sea component 101*b* differ in piezoelectric property and stretchability (or flexibility).

In order to obtain a sound absorbing material of high performance, a high piezoelectric effect is desired. The piezoelectric effect is the effect by which sound pressure energy is converted into electrical energy. For higher sound absorbing performance, the fibers of the sound absorbing material require higher piezoelectric effect. Since charges are generated substantially in proportion to the distortion or strain in a piezoelectric material, it is desirable to design the fiber body to effectively produce mechanical stress in the piezoelectric material by sound and vibration in order to obtain a high piezoelectric effect.

Thus from the standpoint of distorting the material more effectively, it is desirable to reduce the geometrical moment of inertia of the piezoelectric material as much as possible. For decreasing the geometrical moment of inertia of the fibers containing the piezoelectric material, it is effective to decrease the fiber diameter without changing the total amount of the fibers, or to change the fiber cross section from the normal circular shape to a non-circular shape by varying the ratio of the longitudinal and transverse diameters. By thus tuning the cross-sectional area and cross-sectional shape of the fibers to reduce the geometrical moment of inertia of the fibers, the fiber body can be distorted efficiently even under the same sound pressure and the piezoelectric effect can be enhanced.

The piezoelectric resin of the present invention includes the piezoelectric component, or the piezoelectric component and a third component for the tuning of the piezoelectric effect, blended to the matrix resin. This increases the viscosity of the melted resin. Furthermore, the piezoelectric component including an inorganic compound as basic component in many cases acts to increase the extrusion pressure with the interference of the inorganic component with the nozzle metal at the portion of the nozzle from which the resin is extruded. The same applies in the case of forming fibers. As compared to the normal case where just the matrix resin, such as polyester, etc., is spun, the difficulty in spinning is high since the fluidity is lowered and the resistance for extrusion of the fiber is increased by the piezoelectric component when the fiber is extruded forcibly. Also, the surface of the spun fiber tends to be fluffed due to the resistance between the nozzle and the inorganic component, and the fiber body tends to be brittle. The reduction of the fiber diameter and the non-circular fiber cross sectional shape increase the extrusion resistance rises, and hence make it difficult to obtain a fiber body having a high piezoelectric effect. Therefore, in order to improve on the lowering of the fluidity of such a resin, it is desirable to conceal the piezoelectric material containing resin under the fiber surface and to reduce or eliminate the exposed portion of the piezoelectric material containing resin in the process of spinning.

The sea-island type structure is effective for such a problem. To achieve the intended objective, the piezoelectric component may be a sea component or may be an island component. From the viewpoint of the ease in fiber forming process, however, the island component is suitable as the piezoelectric component. In this case, the island component contains the piezoelectric material, and the sea component is lower or null in the piezoelectric property. In preparing such a composite fiber by the melt spinning method, etc., the winding tension during spinning acts, in the fiber cross section, selectively on the resin portion containing no piezoelectric material, so that high speed winding, and stable low-speed winding operation are feasible.

The island component preferably includes a plurality of island subcomponent each capable of provide a fiber having an average fiber diameter of 1~50 μm (micrometer). It is desirable to reduce the average diameter of the island subcomponents in order to heighten the piezoelectric effect. However, it is difficult to reduce the diameter of a fiber of a piezoelectric resin component of low fluidity. Under the present circumstances, it is practically impossible to form island subcomponents with an average diameter of less than 1 μm. On the other hand, an island subcomponent with an average diameter of greater than 50 μm can be produced by a general spinning method without forming a sea-island composite, and therefore, it is meaningless to form a composite fiber body with such large island subcomponents. For producing a composite fiber, the average diameter is preferably 10~30 μm. The average diameter is the average of the major diameter and the minor diameter in the case of a fiber having a nearly circular cross sectional shape or an elliptical cross sectional shape. In the case of a fiber having a circular cross section, the average diameter is equal to the diameter of the circular cross section.

The total area of the island component is preferably 10 to 90% of the total cross sectional area of the entire sea-island composite fiber. If the proportion is less than 10%, the production of island components that exhibit the piezoelectric effect becomes inefficient to the disadvantage in the economic aspect. If the proportion exceeds 90%, the sea component becomes so small and thin that the difficulty of the production of the composite fiber is increased too much. For obtaining the piezoelectric effect efficiently, the proportion of the island component is preferably set to a high value, and specifically, a preferable range of the total area of the island subcomponents is 70~90% of the total area of the entire fiber.

The average diameter of the entire sea-island type composite fiber is preferably set in the range of 10~100 μm. It is difficult to reduce the diameter of a composite fiber having therein island components or subcomponents of poor fluidity. Under the present circumstances, it is practically impossible to produce the composite fiber that is less than 10 μm in average diameter. On the other hand, when the average diameter exceeds 100 μm, it becomes difficult to form a fiber by an ordinary spinning method to the disadvantage of the production cost.

If the piezoelectric properties of the island components and the sea component are equal to each other, it will be meaningless to form a composite fiber, the formation of a fiber becomes difficult due to the lowering of the fluidity of the entire composite fiber, and a high piezoelectric effect becomes difficult to obtain. Also if the island components and the sea component are equal in stretchability, it becomes difficult to divide the composite fiber into the island components and sea component in a subsequent process. The property that is relevant to this is called sea removability or sea component extractability. The sea removability refers to the ease of dissolving or decomposing the sea component. The sea removability is affected by the stretchability or flexibility, solubility in a basic solvent, etc.

The geometrical moment of inertia of each island subcomponent is preferably smaller than or equal to 10% of the geometrical moment of inertia of the entire composite fiber. The geometrical moment of inertia is generally regarded as an index of difficulty of bending, and for the same material, a decrease in the geometrical moment of inertia causes a decrease in the spring constant of a fiber body and improves the bendability of the fiber body. Therefore, the piezoelectric effect for sound pressure of the same conditions is increased, the amount of charge generated in the piezoelectric material is increased, and the electromotive force that is generated increases. The design of island subcomponents each having a geometrical moment of inertia no more than 10% of the geometrical moment of inertia of the entire composite fiber is effective in improving the piezoelectric effect. If the geometrical moment of inertia of one island subcomponent exceeds 10%, the piezoelectric effect would not differ so much from that in the case of the original thickness. Since the smaller the geometrical moment of inertia the better, a lower limit is not defined. The geometrical moment of inertia of a 50 $\mu$m diameter island subcomponent is approximately 6% with respect to that of a composite fiber of 100 $\mu$m diameter. Since differences in material are not reflected in the geometrical moment of inertia, the value of the geometrical moment of inertia is not directly associated with bendability. However, the value of the geometrical moment of inertia is effective as an index for judging an increase of the piezoelectric effect objectively.

As to the cross-sectional area of the island components, the cross-sectional area of each island subcomponent is preferably no more than 30% of the cross-sectional area of the entire composite fiber. This is because the reduction in the cross-sectional size can decrease the geometrical moment of inertia and improve the piezoelectric effect efficiently. If the proportion of the cross-sectional area of a single island subcomponent exceeds 30%, the amount of island subcomponents would be too great and this would increase the difficulty in producing a sea-island composite fiber. Though a lower limit is not defined for ratio of the cross-sectional area of one island subcomponent with respect to the entirety since the piezoelectric effect increases as an island subcomponent becomes thinner, in actuality, it is very difficult by general methods to form a composite fiber including thin island subcomponents each having a small cross-sectional area which is equal to or less than 0.02% of the entirety.

When one island subcomponent has a cross-sectional area S and a perimeter L, a circle-equivalent radius R is defined as $R=(S/\pi)^{0.5}$, a perimeter-based radius G is defined as $G=L/(2\pi)$, and a non-circularity ratio F–G/R. The thus-defined non-circularity ratio F is preferably in the range of 1.1~3.0. This is because it is possible to decrease the geometrical moment of inertia by employing a non-circular cross sectional shape. That is, the reduction of the geometrical moment of inertia of the island component by the non-circular cross sectional shape is advantageous in terms of technology and mass production as compared to the reduction of the diameter to a very small value.

The non-circularity ratio F is used here as a means of expressing the degree of deviation from a circle or eccentricity in a quantitative manner. This ratio is the ratio of the circle-equivalent radius R and the perimeter-based radius G ($F=G/R$), and the greater this value, the higher the non-circularity. The circle-equivalent radius R is the radius of a circle that is equal in area to the non-circular cross section, and the perimeter-based radius G is the radius of a circle that has a perimeter equal to the perimeter of the non-circular cross section. In the case of a perfect circle, R=G and F=1. As the degree of deformation away from the circular shape increases, the perimeter-based radius becomes greater than the circle-equivalent radius, and an increase in the non-circularity ratio F is preferable since the geometrical moment of inertia decreases and the piezoelectric effect improves. When the non-circularity ratio F is less than 1.1, the cross section becomes practically circular and the effect of non-circularity is insufficient or null. When the non-circularity ratio F exceeds 3.0, the cross section is flattened too much and becomes too flat and a composite fiber becomes difficult to form when such an island component is formed.

As the island component or the matrix resin that contains the piezoelectric material, it is possible to use a polyamide, such as nylon 6, nylon 6,6, polyethylene terephthalate, polyethylene terephthalate containing a copolymer component, polybutylene terephthalate, polyacrylonitrile, etc. alone or in the form of a mixture thereof. Examples of the non-circular cross-section fiber which can be employed are: fiber forms of flattened cross section, elongate cross section, oval or elliptical cross section, hollow cross section, triangular shape, Y-shape, etc., and a fiber form with fine unevenness or stripes on the fiber surface.

Preferably, the island component contains mixture of thermoplastic resin and piezoelectric material, and the amount of the mixture is 80 to 100 mass % of the island component. Basically, the greater the proportion of the mixture the better since the piezoelectric effect is provided by the interaction of the matrix resin and the piezoelectric material. A proportion of less than 80 mass % is unfavorable as an adequate piezoelectric effect cannot be obtained. A proportion of 95 mass % or more is even more desirable.

Desirable examples of the resin of the sea component are: polystyrenes, copolymerized polystyrenes, polyesters, polyamides, polyacetal resins, methacrylic resins, weak-base-soluble polyesters that are comprised of copolymerized polyester components comprised of sulfoisophthalic acid sodium salt and terephthalic acid, sulfoisophthalic acid sodium salt, and hot-water-soluble polyesters that are copolymerized with polyethylene glycol. With the copolymerized polyester, which is obtained using terephthalic acid and sulfoisophthalic acid sodium salt and by means of a condensation reaction with ethylene glycol, etc., the copolymerization molar ratio of sulfoisophthalic acid sodium salt with respect to terephthalic acid is preferably 2 to 15 mole %. It is particularly preferable to increase the amount of the sulfoisophthalic acid sodium salt within the range of 4.5 to 15 mole % since the sea component can then be extracted more readily as there will be a greater difference between the rate of dissolution or decomposition of the sea component by a basic or other aqueous solvent, etc. and that of the polyethylene terephthalate, etc. that are used in the island components.

Here, basic or other aqueous solvent refers to a solvent that has water as the main component, and for example, water, a basic aqueous solution, such as aqueous sodium hydroxide solution, aqueous ethyl amine solution, etc., an acidic aqueous solution, such as aqueous acetic acid solution, aqueous sulfuric acid solution, etc., an aqueous organic solution, such as an aqueous alcohol solution, aqueous DMF solution, etc.; or an aqueous surfactant solution, such as an aqueous sodium dodecyl sulfate solution, etc. may be used. These aqueous solvents may also be mixed with each other or used in heated form.

The polyester preferably has a melting point of 240° C. or less, and representative examples of such a polyester include polybutylene terephthalate, polypropylene terephthalate, and copolymerized polyesters, with a melting point of 240° C. or less and with which a dicarboxylic acid, such as isophthalic acid, adipic acid, sebacic acid, etc. or a long-chain alkylene glycol, etc. is copolymerized with polyethylene terephthalate. A generally-used additive, such as an anti-oxidant, coloring prevention agent, lubricant, fire retardant, etc., may also be contained in such polyester polymers. In addition to the above, copolymerized polyesters being additionally copolymerized with isophthalic acid are also favorable. Also, besides ethylene glycol, polyethylene glycol may be copolymerized as the glycol component.

Furthermore, polyolefins, such as polypropylene, polyethylene, etc., polyesters, such as polyethylene terephthalate, polybutylene terephthalate, etc., polyamides, such as nylon 6, nylon 66, etc., polyacrylonitrile, and copolymers with which a copolymerization component has been added to an abovementioned polymer may be used.

Examples of cellulose esters include cellulose (mono) acetate, cellulose diacetate, cellulose triacetate, cellulose acetate butyrate, benzenecellulose, and mixtures thereof. In particular, cellulose (mono)acetate, cellulose diacetate, and cellulose triacetate can be given as favorable examples. Among these, a cellulose diacetate with a degree of oxidation of 45 to 59.5% is preferable from the point of thermoplasticity and melt fluidity. The content of the cellulose ester plasticizer with respect to the cellulose ester used in this invention is preferably 21 to 35%. This plasticizer is not restricted in particular, and for example, diethyl phthalate, triacetylene, 1,3-butylene glycol diacetate, and other polyol ester compounds that are generally used for cellulose acetate may be used. Among these, diethyl phthalate is preferable.

With the composite fibers of this invention, the separation of the sea component and island components or the dissolution of the sea component can be carried out by various methods to obtain a fiber body having island components that exhibit a large piezoelectric effect.

By treating the sea component with a weakly basic aqueous solution, the sea component may be eliminated to obtain ultra fine fibers. Such a sea component extraction or removal treatment can be performed by a method in which sea component extraction is performed in the stage or state of thread or yarn after spinning and drawing of the mutually aligned polymer fiber or by a method in which sea component extraction is performed after forming a woven or knit product by mainly using the mutually aligned polymer fibers, and either method may be employed favorably. The concentration of the weakly basic aqueous solution is in the range of 0.5 to 5% and the treatment temperature is preferably in the range of 60 to 130° C.

With regard to the method of forming the composite fiber, the ordinary methods of spinning and drawing, super-drawing method, etc., a method in which two or more components are spun and then separated by peeling, a method in which two or more polymers that differ in solubility are spun and then at least one of the components is eliminated by dissolution, etc. may be used. In particular, by the method in which two or more polymers that differ in solubility are spun and then at least one of the components is eliminated by dissolution, spaces can be formed between fibers to obtain a sheet-like product that is excellent in flexibility. As the dissolution-eliminated component in such cases, polyethylene, polystyrene, copolymerized polystyrene, polyester, copolymerized polyester, etc. may be used.

As to binder type composite fiber bodies, it is preferable that the fibers be a core-sheath type binder fibers with which the sheath component has a lower softening point than the core component, with a strongly polar organic agent with a solubility parameter (SP) of $2.05\times10^4$ to $2.66\times10^4(J/m^3)^{0.5}$ being mixed as the piezoelectric material in the resin that comprises one of either the core component or the sheath component and the resin that comprises the other of the core component or the sheath component not containing practically any components besides the resin.

If the fibers are to be made into sound absorbing material of non-woven fabric form, a means that can be employed is to make the binder fibers, which receive the sound pressure and/or vibration strongly in the binder-fiber-containing non-woven fabric, have a vibration damping property, and in this case, the fibers are preferably made fine so that they will receive the sound pressure and/or vibration as strongly as possible.

The binder fiber, with which the sheath component has a lower softening point than the core component, is thus made a binder fiber having a strongly polar organic agent with a solubility parameter (SP) of $2.05\times10^4$ to $2.66\times10^4(J/m^3)^{0.5}$ being mixed therein. In this case, the sound pressure and vibration can be absorbed efficiently by the electrical loss due to the electrical interaction between the strongly polar organic agent and the resin that is expressed as a result of the sound pressure and/or vibration that is input into the abovementioned binder fiber. The preventive tension or the drawing tension during the melt spinning process and the drawing process that follows the spinning process will be borne by the resin of the sheath component or core component that is practically comprised only of resin, thus enabling the fiber to be made thin in diameter.

Figure 26A:
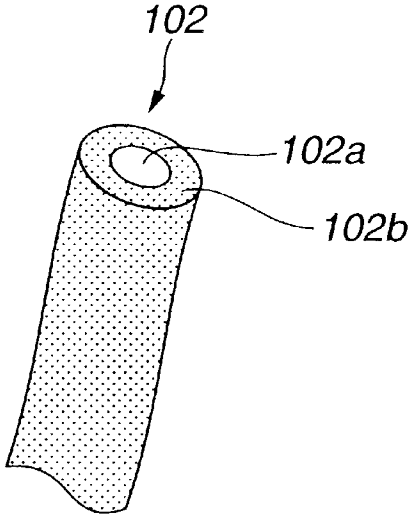
FIGS. 26A and 26B are schematic views, which show examples of forms of binder type composite fiber bodies that are energy conversion fiber bodies by this invention.
Figure 26B:
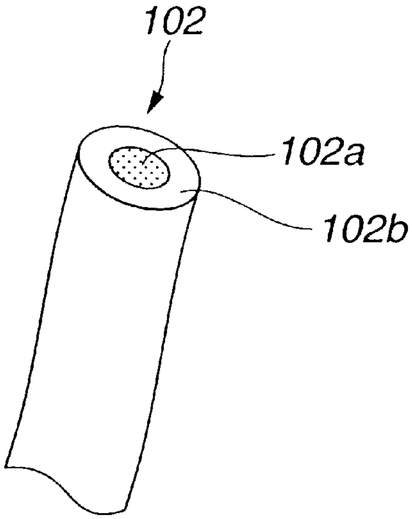

FIGS. 26A and 26B show examples of the forms of such a binder type fiber composite body 102, with FIG. 2A) showing the case where a strongly polar organic agent is contained in the sheath component 102*b* and the core component 102*a* is practically comprised only of resin, and FIG. 2B showing the case where a strongly polar organic agent is contained in the core component 102*a* and the sheath component 102*b* is practically comprised only of resin.

A core-sheath type cross section is formed because the core-sheath type cross-sectional structure is such that the two components are disposed symmetrically within the cross section and the tension during spinning or drawing is therefore applied uniformly on the fiber cross section, enabling the spinning properties to be improved when a large amount of components other than resin is contained and the diameter to be made thin.

Here, "not containing practically any components besides the resin" signifies that in comparison to the core component or sheath component that contains the strongly polar organic agent, etc., the substances, besides the resin, that comprise the other component are clearly less in proportion and refers to a condition that can be approximated as basically not containing anything other than the resin.

With regard to the strongly polar organic agent, it has been found that by making the SP (solubility parameter) thereof be within a specified range, the vibration damping properties can be improved significantly and a fiber body by this invention can be provided inexpensively. That is, in the case of a weakly polar organic agent having an SP value of less than $2.05\times10^4$ $(J/m^3)^{0.5}$, the vibration damping performance that can be obtained will be low, and in the case of a strongly polar organic agent having an SP value of greater than $2.66\times10^4(J/m^3)^{0.5}$, the vibration damping performance that will be obtained will only be substantially equal to that which can be obtained by an organic agent with an SP value of $2.66\times10^4(J/m^3)^{0.5}$, in other words, the effect becomes saturated, and a highly polar organic agent with an SP greater than this value is also unfavorable in terms of economy as it is difficult to obtain in the market. Though there is no upper limit to the mixing proportion of the polar organic agent as long as it is within a range that will not lower the forming properties after mixing, a satisfactory range is 30 to 200 volume parts per 100 volume parts of resin.

With the above-described fiber body, a piezoelectric material besides the strongly polar organic agent may be contained in addition to the strongly polar organic agent in the abovementioned resin that comprises either the core component or the sheath component to form a vibration damping binder fiber with which the charges, which arise in the strongly polar organic agent and piezoelectric material as a result of the sound pressure and/or vibration that is or are input into the binder fiber, are consumed efficiently as heat by the electrical interaction of the charges with the resin to thereby enable efficient absorption of the sound pressure or vibration. Also though depending on the mixing ratio of the polar organic agent, the forming properties may be affected greatly by the mixing-in of the piezoelectric material, the forming properties will not be lowered if the piezoelectric material is mixed in at a proportion in the range of 30 to 100 volume parts per 100 volume parts of resin in the case where the proportion of the polar organic agent is 30 to 100 volume parts. Though the piezoelectric material is not restricted in particular, barium titanate ($TiBaO_3$) and lead zirconate titanate (PZT) are for example desirable in terms of the ease of acquisition in the market and the highness of the piezoelectric characteristics.

Figure 27A:
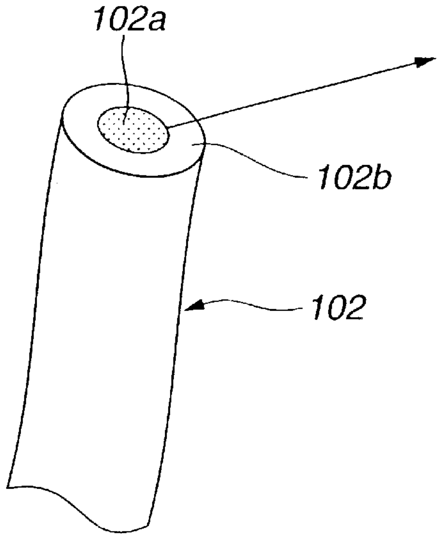
FIGS. 27A and 27B are schematic views, which shows an example of the form of a binder type composite fiber body with which a strongly polar organic agent, a piezoelectric material, and a conductive material are contained in the resin that comprises the core component.
Figure 27B:
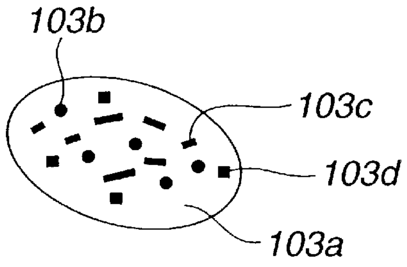
Figure 28A:
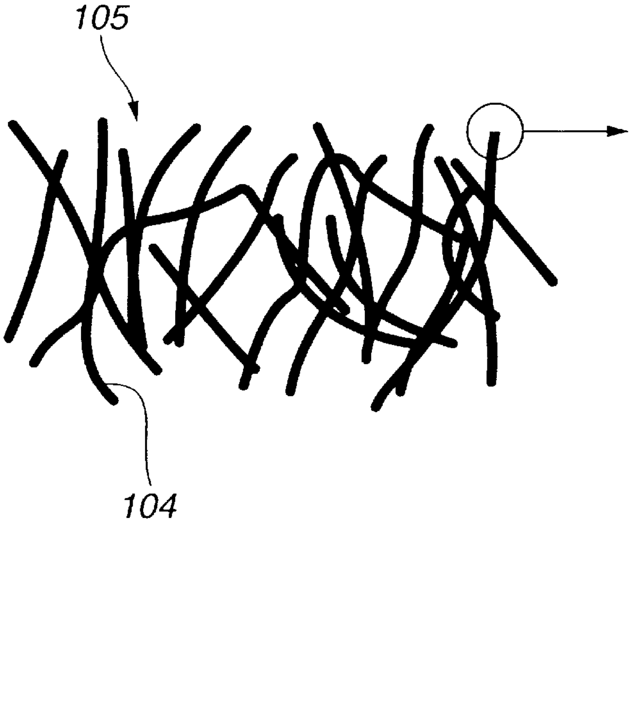
FIGS. 28A and 28B are schematic views, which shows an example of the form of a core-sheath type composite fiber body that is an energy conversion fiber body by this invention and a sound absorbing material that is comprised of a non-woven fabric of this core-sheath type composite fiber body.
Figure 28B:
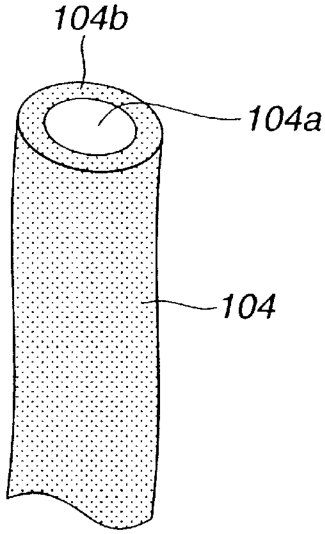
Figure 29A:
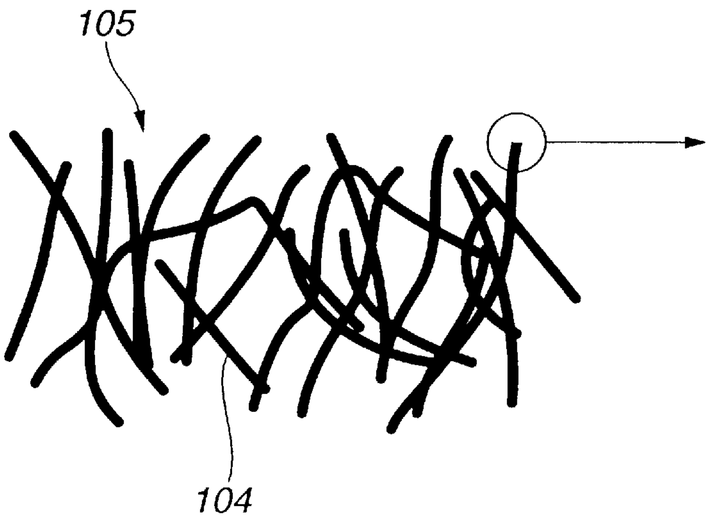
FIGS. 29A and 29B are schematic views, which shows another example of the form of a core-sheath type composite fiber body and a sound absorbing material that is comprised of a non-woven fabric of this core-sheath type composite fiber body.
Figure 29B:
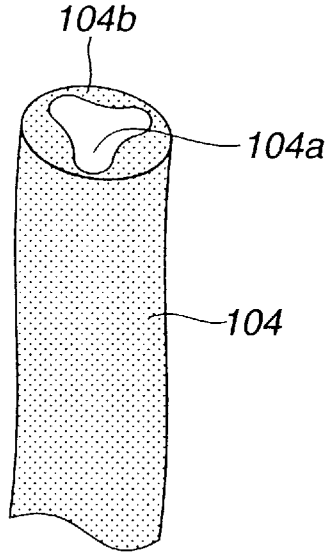

Furthermore as shown in FIGS. 27A and 27B, a conductive material 103*d* may be contained in addition to the strongly polar organic agent 103*b* and the piezoelectric material 103*c* besides the strongly polar organic agent in the abovementioned resin that comprises one of either the core component 102*a* or sheath component 102*b* (in FIG. 3, this resin is the resin 103*a* that comprises the core component 102*a*). The binder fiber is thus made a vibration damping binder fiber with which the charges that arise in strongly polar organic agent 103*b* and piezoelectric material 103*c* due to the sound pressure and/or vibration that are input into the binder fiber 102 are consumed efficiently by the electrical resistance (R) arranged by resin 103*a* and conductive material 103*d* to thereby enable sound pressure and vibration to be absorbed even more efficiently.

As the strongly polar organic agent, a strongly polar organic agent that belongs to any of the benzothiazoles, benzodiazoles, benzotriazoles, benzothiazyl sulfenamides, or mercaptobenzothiazyls may be used. That is, by the use of materials that can be obtained readily in the market, a polarity with which SP=$2.05\times10^4$ to $2.66\times10^4$ $(J/m^3)^{0.5}$ can be attained and economic advantages can be provided as well. The structural formulae of these materials are as follows.

Benzothiazoles

[Chemical Formula II1]

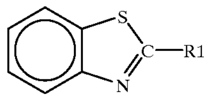

R1 is H or an alkyl group or an alkyl group derivative.

Benzodiazoles

[Chemical Formula II2]

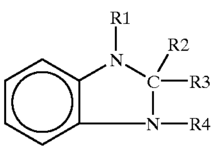

Each of R1 to R4 is H or an alkyl group or an alkyl group derivative.

Benzotriazoles

[Chemical Formula II3]

Each of R1 to R3 is H or an alkyl group or an alkyl group derivative.

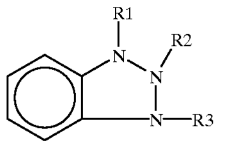

Benzothiazyl Sulfenamides

[Chemical Formula II4]

Each of R1 and R2 is H or an alkyl group or an alkyl group derivative.

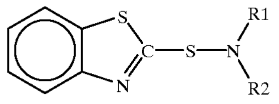

Mercaptobenzothiazyls

[Chemical Formula II5]

R1 is H or an alkyl group or an alkyl group derivative.

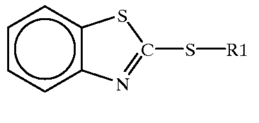

Examples of benzothiazoles include mercaptobenzothiazole (MBT), dibenzothiazyl disulfide (MBTS), and the zinc salt of 2-mercaptobenzothiazole (ZnMBT), and examples of benzothiazyl sulfenamides include N-cyclohexane-2-benzothiazole sulfenamide (CBS), N,N-dicyclohexyl-2-benzothiazyl sulfenamide (DCHBSA), N-t-butyl-2-benzothiazole sulfenamide (BBS), and N,N-diisopropyl-2-benzothiazole sulfenamide (DPBS). The above may be used singularly or may be mixed. All of these have a high polarity and can be obtained readily.

Furthermore as shown in FIG. 26B, it is preferable in a core-sheath type binder fiber that the core component 102*a* be comprised of a resin that contains the strongly polar organic agent and the sheath component 102*b* be comprised practically only of resin, and a vibration damping fiber with high heat adhesion properties can be formed by using a low softening point resin, which uses a copolymer of polyethylene terephthalate (PET) and polyethylene isophthalate (PEI), etc., in the sheath component 102*b*.

Though there are no problems in particular in using a homopolymer as the resin to be used in the sheath component, a copolymer is preferable in that the softening point, that is, the heat adhesion temperature can be controlled. Besides the abovementioned PET/PEI, this copolymer may be a copolymer of PET with a polymer with which the ethylene glycol component of PET has been substituted by a glycol component (for example, polyhexamethylene terephthalate (PHT)) and/or with which the terephthalic acid component has been substituted by another different dibasic acid component (for example, polybutylene isophthalate (PBI)) or a copolymer of such substituted polymers. The copolymer is not restricted in particular, and besides copolymers of PET with an abovementioned substituted polymer, the copolymer may be a copolymer of PET with an aliphatic lactone with 4 to 11 carbons, such as poly ε caprolactone (PCL) or a copolymer of an abovementioned substituted polymer or PET with a polydiol. With any of these resins, stable heat adhesion is enabled by not mixing practically any strongly polar organic agent in the sheath component.

The solubility parameter (SP) of the resin that contains the strongly polar organic agent is preferably in the range of $1.60\times10^4$ to $2.78\times10^4(J/m^3)^{0.5}$ so that the electrical interaction with the strongly polar organic agent will be large and a binder fiber with high vibration damping performance can be formed.

Here the SP value of the resin is set in the range $1.60\times10^4$ to $2.78\times10^4(J/m^3)^{0.5}$ since the electrical interaction with the strongly polar organic agent will be large when a resin with an SP value in this range is used and the vibration damping performance that is obtained will be improved in comparison to a resin with which the SP is less than $1.60\times10^4(J/m^3)^{0.5}$. It has also been confirmed that when the SP value of the resin and the SP value of the strongly polar organic agent is far apart, the dispersion property of the strongly polar organic agent in the resin tends to be poor and a practically dispersed state is difficult to realize. The SP value of the resin is therefore preferably $1.60\times10^4(J/m^3)^{0.5}$ or more from this aspect as well.

On the other hand, when the SP value of the resin exceeds $2.78\times10^4(J/m^3)^{0.5}$, the SP value of the strongly polar organic agent must be increased so as not to lower the dispersion property. However, since the range of the SP value of the strongly polar organic agent is in the range of $2.05\times10^4$ to $2.66\times10^4(J/m^3)^{0.5}$, $2.78\times10^4$ $(J/m^3)^{0.5}$ is preferable as the upper limit of the SP value of the resin in order to make the disparity of the SP values small.

With regard to a core-sheath type composite fiber body, it is preferable as indicated in the fifteenth claim that the fiber body be such that a fiber comprised of a thermoplastic resin is used as the core component and a layer, containing a piezoelectric material and having polyester as the main component, is provided as the sheath component at least across the entire side surface in the length direction of the fibers. By using a fiber comprised of thermoplastic resin, the forming properties will be improved for subsequent processes and the forming of non-woven fabrics will be facilitated. By a piezoelectric material being contained in the sheath component, charges will arise likewise in the piezoelectric material by the sound pressure and vibration that are input into the fiber and these charges will be converted into heat by the electrical resistance of the surrounding polyester component and the thermoplastic resin of the core component so that the sound pressure and vibration will be absorbed efficiently as in the cases of the respective fiber bodies described above.

FIGS. 28A, 28B, 29A, 29B, 30A and 30B show examples of the forms of core-sheath type fiber bodies. Core-sheath type composite fiber body 104 has a sheath component 104*b*, having polyester as the main component thereof and a piezoelectric material contained therein, provided as a layer around a core component 104*a*, which is comprised of a thermoplastic resin fiber and is high in drawing properties, and is formed into a sound absorbing material 105 upon being made for example into a non-woven fabric.

Since in a piezoelectric material, charges are generated substantially in proportion to distortion, a piezoelectric material is required to become distorted efficiently by the same sound pressure in order to obtain a high piezoelectric effect. By mixing a piezoelectric material in the sheath part of a core-sheath type fiber, displacements in the piezoelectric material will arise as result of the friction between air and the piezoelectric material that is exposed on the fiber surface, the changes in sound pressure, and the vibration that is input into the piezoelectric material that is mixed in the sheath part polyester so that the piezoelectric effect is exhibited efficiently.

Figures 31A, 31B:
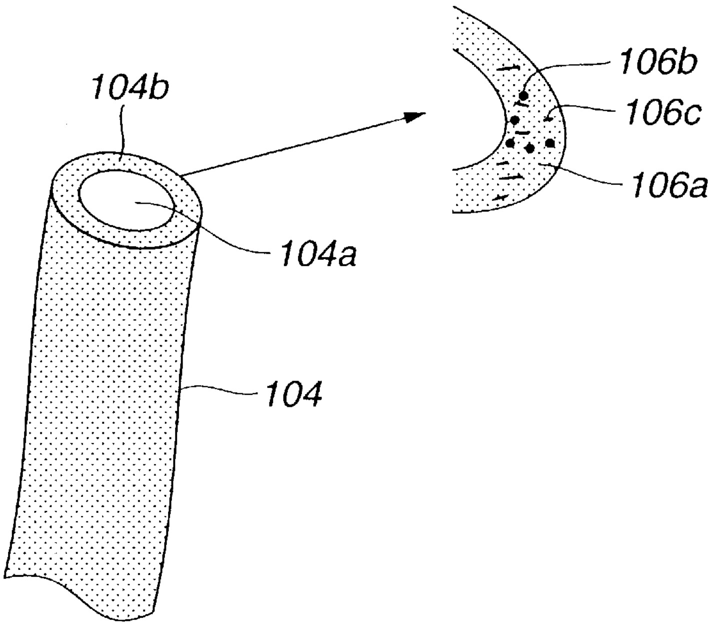
FIGS. 31A and 31B are schematic views, which shows an example of the form of a core-sheath type composite fiber, with which a piezoelectric material and a conductive material are contained in the resin that comprises the core component.

With a core-sheath type vibration damping fiber, it is preferable as shown in FIGS. 31A and 31B to use a fiber comprised of thermoplastic resin as the core component 104*a* and to provide a layer 106*a*, having a main component of polyester that contains both a piezoelectric material 106*b* and a conducting material 106*c*, as the sheath component 104*b* at least on all of the length direction side of the fiber. By mixing a conductive material 106*c* in the sheath part 104*b*, charges will arise in the piezoelectric material 106*b* as a result of the sound pressure and vibration that are input into the core-sheath type fiber 104 and these charges will be converted into heat by the electrical resistance of the conductive material 6*c* in the surroundings of piezoelectric material 6*b* so that the sound pressure and vibration will be absorbed efficiently. The electrical resistance can be manipulated and the sound absorbing characteristics and frequency characteristics can be varied by adjusting the content of the conductive material 6*c*.

With such a core-sheath type vibration damping fiber, the ratio of the weight of the piezoelectric material used in the sheath component or the weight of the mixture of the piezoelectric material and conductive material used in the sheath component to the dry weight of the layer containing polyester as the main component is preferably set in the range of 1:1 to 10:1. If this ratio exceeds 10:1, the amount of piezoelectric material and conductive material will become too great, causing the fluidity to become low and thus making it difficult to set the fibers uniformly. Even if the fibers can be set, the adhesion property will be inadequate and the piezoelectric material and conductive material will peel off from the fiber of the core part. Though it is preferable to make the mixing amount of piezoelectric material, etc. lower in order to make improvements in terms of the lowering of the fluidity during the setting of the sheath part, the amounts of piezoelectric material and conductive material will become too small and the vibration damping effect will tend to be inadequate at a ratio of less than 1:1.

With a core-sheath type vibration damping fiber, it is preferable for the core component to occupy 40 to 98% of the cross-sectional area that is perpendicular to the length direction of vibration-restricting fibers, the piezoelectric material and conductive material used in the sheath component to be powders, and the lengths of the largest parts of the piezoelectric material and conductive material to be 0.8 to 25% of the circle-equivalent diameter $2R(2(S/\pi)^{0.5})$, where S is the cross-sectional area of the core component. If the proportion of the cross-sectional area of the core component is below 40%, though the relative amount of the sheath component will become greater so that the amount of piezoelectric material will become greater and the vibration damping performance will be improved, the fiber, when used as a fiber body, will be poor in flexibility and tend to be difficult to form into a non-woven fabric or a sound absorbing and insulating material. Also, when the cross-sectional area of the core part is small, the fiber will be less likely to become deformed upon receiving sound pressure or vibration and the effect of adding the piezoelectric material may become small. If the proportion of the cross-sectional area becomes greater than 98%, the amount of piezoelectric material will become low and vibration damping effects may hardly be exhibited in some cases.

It is unfavorable for the lengths of largest parts of the piezoelectric material and conductive material to be less than 0.8% of the circle-equivalent diameter of the circle-equivalent diameter of the core part since the particle diameter will then be too small with respect to the core fiber diameter and therefore these materials will not be deformed adequately by the input of sound pressure and vibration, the charges that arise in the piezoelectric material will decrease, and efficient energy conversion and absorption will be difficult to realize. Also, when the above proportion exceeds 25%, the sheath part tends to be difficult to set uniformly.

Such a core-sheath type vibration damping fiber is favorable for use as part or the entirety of a non-woven fabric and enables a non-woven fabric with excellent vibration damping performance to be prepared.

A core-sheath type vibration damping fiber is produced for example by coating, as the sheath component, a water-soluble adhesive agent, having polyester, containing only a piezoelectric material or containing both a piezoelectric material and a conductive material, as the main component, onto a core part fiber in a continuous process following melt spinning. FIG. 8 illustrates an example of this process. By applying such a process, a core-sheath type vibration damping fiber can be produced readily.

Figure 32:
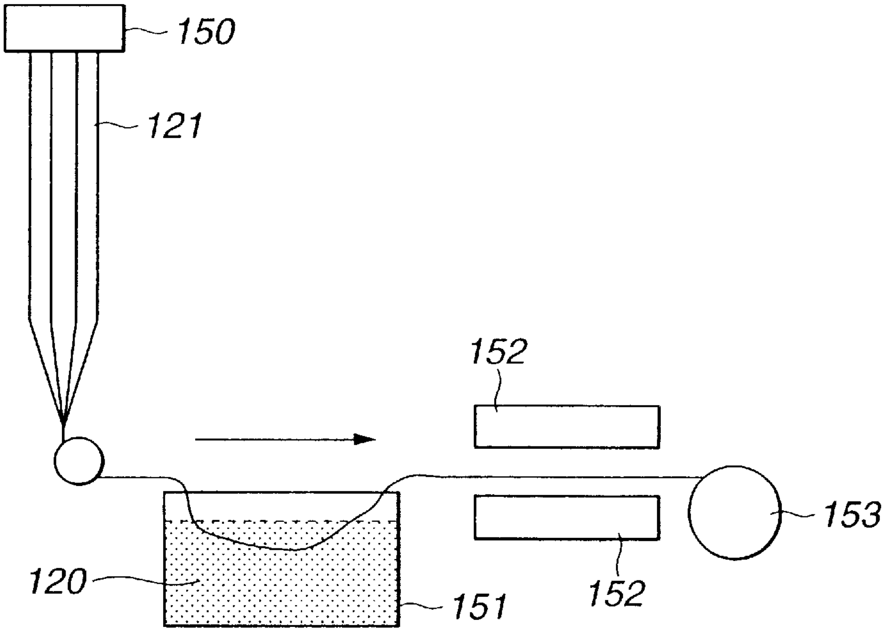
FIG. 32 is a process diagram, which shows an example of a method of producing core-sheath type composite fibers.

In FIG. 32, symbol 150 indicates the nozzle part of a spinning machine, 151 indicates a coating tank that stores a resin liquid (adhesive agent) 120, which contains a piezoelectric material or a piezoelectric material and a conductive material, 152 is a dryer, and 153 is a winder. Adhesive agent 120 is coated continuously onto the periphery of the core part fiber 121 that is discharged from nozzle part 50 and then dried.

Here, by using a water-soluble adhesive agent having polyester as the main component, drying can be performed readily by evaporation of water after coating and the piezoelectric material can be attached to the core component at an adequate adhesion strength. Also, by using polyester as the main component to form vibration damping fibers, subsequent forming and making of a non-woven fabric can be facilitated.

Figure 33:
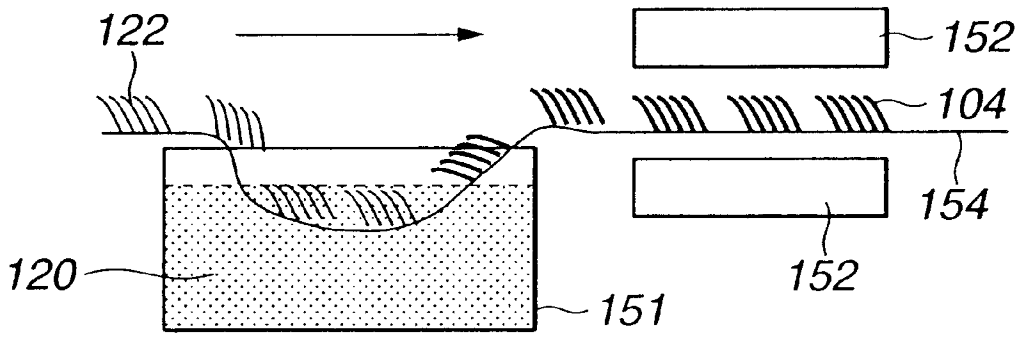
FIG. 33 is a process diagram, which shows another example of a method of producing core-sheath type composite fibers.

As shown in FIG. 33, a core-sheath type vibration damping fiber may also be produced by cutting core part fiber 121 to an arbitrary fiber length and then coating, as the sheath component, the water-soluble adhesive agent 120, having polyester, containing only a piezoelectric material or containing both a piezoelectric material and a conductive material, as the main component, onto core part fiber 122. With the method of coating a cut fiber, though the uniformity of the sheath part will be somewhat low in comparison to the case where coating is performed directly after melt spinning, fibers can be produced without affecting the vibration damping performance. In FIG. 33, symbol 154 indicates a conveying device that moves the cut core part fiber 122, and core part fiber 122 is immersed in a continuous manner in adhesive agent 20 in coating tank 151 by conveying device 154 and dried by dryer 152 to be made into a core-sheath type composite fiber 104 of a predetermined length.

Figure 34:
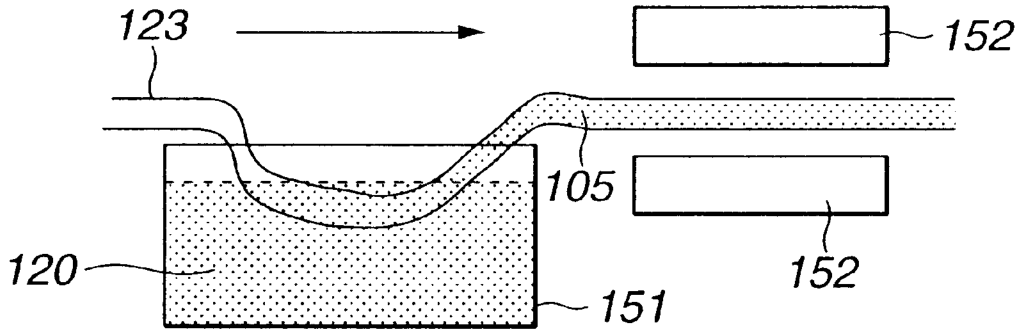
FIG. 34 is a process diagram, which shows an example of a method of producing a non-woven fabric comprised of core-sheath type composite fibers.

Furthermore as shown in FIG. 34, a core-sheath type vibration damping fiber may be produced by making a non-woven fabric from the core part fibers and thereafter coating, as the sheath component, the water-soluble adhesive agent, having polyester, containing only a piezoelectric material or containing both a piezoelectric material and a conductive material, as the main component. In FIG. 34, a non-woven fabric 123, comprised of core part fibers 121, is immersed continuously in the adhesive agent 120, containing a piezoelectric material or a piezoelectric material and a conductive material, in coating tank 151 and then dried by dryer 152 to be made into a sound absorbing material 105 comprised of a non-woven fabric of core-sheath type composite fibers 104.

With the method of coating fibers prior to making a non-woven fabric, some binder fibers may have to be incorporated in the process of making the non-woven fabric in some cases, and due to the resulting decrease of the mixing amount of the vibration damping fibers, the desired performance may not be attained. However, with the method of coating after making a non-woven fabric, since coating can be performed uniformly on all fibers by making the core component to be a non-woven fabric in advance, the vibration damping performance is improved.

With regard to the piezoelectric material in this invention, a piezoelectric material that contains a composite oxide having at least an alkali earth metal may be used as indicated in the twentieth claim. With this invention, a composite oxide refers to a compound with which at least two elements are bonded with oxygen, and in terms of a general structural formula, a composite oxide C is expressed as AnBmOl (where n, m, and l are natural numbers). With a compound with this composition, an electromotive force can be generated by a matrix resin that has become distorted by the energy of sound.

As has been mentioned above, at least one of the elements that comprise the composite oxide is preferably an alkali earth metal. Alkali earth metals refer to elements of group IIa of the long period type periodic table and specifically to Be (beryllium), Mg (magnesium), Ca (calcium), Sr (strontium), Ba (barium), and Ra (radium). A piezoelectric effect can be obtained by using these elements. Of these alkali earth metals, Ba, Sr, Ca, and Mg are especially high in contribution to the piezoelectric effect and are effective for increasing the piezoelectric effect. Among these, Ba is the highest in effect and is important for raising the piezoelectric effect further.

Furthermore, the composite oxide is preferably an oxide of an element selected from among group IVa transition elements or group IVb elements and an alkali earth metal. If the composite oxide is that of an element selected from among these group IV elements and an alkali earth metal, a higher piezoelectric performance can be obtained in comparison to an oxide of elements besides the above.

Here, group IVa transition elements refer to Ti (titanium), Zr (zirconium), and Hf (hafnium) and group IVb elements refer to C (carbon), Si (silicon), Ge (germanium), Sn (tin), and Pb (lead). Among the group IVa elements, Ti and Zr are especially high in contribution to the piezoelectric effect, and among the group IVb elements, Sn and Pb are especially high in contribution to the piezoelectric effect.

The molar ratio of the alkali earth metal and the at least one element selected from among groups IVa and IVb, in other words, from group IV, which comprise the composite oxide, is preferably set in the range, 1:0.98 to 1:1. This is because, when the molar ratio satisfies this relationship, the piezoelectric effect of the composite oxide will be high. Though the detailed mechanisms for this is not clear, it is presumed that when the amount of the group IV element is molar equivalent to or less than the amount of the alkali earth metal, the distortion in the forming of the element lattice becomes large and the electric excitation sensitivity with respect to external pressure becomes high.

Also, with the composite oxide, the piezoelectric effect is maximized by the combinations of Ti and Ba, Ti and Sr, Ti and Ca, and Ti and Mg, and the composite oxide is especially preferably selected from among these combinations, that is, from among $TiBa_mO_n$, $TiSr_mO_n$, $TiCa_mO_n$, and $TiMg_mO_n$ (where m=0.98 to 1 and n is a natural number (especially 4)).

Since these composite oxides differ in piezoelectric characteristics according to the combination of elements, they are extremely effective, as shall be described below, in tuning the sound absorbing and insulating characteristics to a specific frequency. Though the sound absorbing and insulating characteristics may also be set to a specific frequency by varying the blending amount of carbon, etc., since the L or the R component changes greatly in this case, fine tuning is difficult. Also, when too much carbon, etc. is mixed in, the pseudo-piezoelectric circuit itself becomes shorted and the resonance characteristics may become lost. In contrast, the selection of a composite oxide enables fine variation of the C component to be performed finely and the sound absorbing and insulating characteristics to be set to an arbitrary frequency.

Furthermore, the composite oxide that is to be the piezoelectric material is preferably selected from among barium titanate ($BaTiO_3$) and lead zirconate titanate (PZT). This is because these can be obtained readily in the market and are high in piezoelectric characteristics.

The average particle diameter of these composite oxides is preferably in the range of $0.3\times10^{-6}$ to $10.0\times10^{-6}$ m. When the average particle diameter of the composite oxide is in this range, the resin with which the composite oxide is mixed in a matrix resin can be formed into a fiber readily, and the targeted sound absorption characteristics in the frequency range of 500 Hz or less can be improved. When the average particle diameter is less than $0.3\times10^{-6}$ m, the dispersion property of the composite oxide will be poor and not only will the apparent average particle diameter become large but the sound absorption frequency will deviate from the range of 500 Hz or less, making the use of another fiber that is used normally to be better in terms of performance and cost. With an average particle diameter in the excess of $10.0\times10^{-6}$ m, since particles close to the targeted fiber diameter will become mixed in, the amount of matrix fiber will become low, causing the fiber to become cut readily during spinning and making the thinning of the diameter difficult.

Also by, making the average particle diameter be in the range of $0.3\times10^{-6}$ to $7.0\times10^{-6}$ m, the sound absorption characteristics at the low frequency side of the range of 500 Hz or less, at which sound absorption is especially required of, can be improved efficiently. Here, the average particle diameter refers to the median value of the particle diameter of all of the particles of the composite oxide that is mixed in.

The blending amount of the composite oxide is preferably 0.5 to 1000 vol % of the thermoplastic resin. By setting the blending amount in this range, the resin with which the composite oxide is mixed in the matrix resin can be formed into a fiber readily and the sound absorption performance at a specific frequency can be improved. If the blending amount is less than 0.5 vol %, the amount of composite oxide mixed in the matrix resin will be small and a large improvement of the performance at the targeted frequency cannot be achieved. Also, when the composite oxide is blended into the matrix resin at a blending amount that exceeds 1000 vol %, since the viscosity when the mixed resin is melted will be increased, the spinning properties are degraded significantly and the forming of a fiber will tend to be difficult. Also, by setting the blending amount of the composite oxide to within the range of 25 to 400 vol % of the thermoplastic resin, fibers can be formed without hardly degrading the spinning properties and the sound absorption performance at the targeted frequency range of 500 Hz or less can be improved efficiently in terms of cost as well.

With the above-described composite fiber bodies of the sea-island type, binder type, and core-sheath type arrangements, the piezoelectric material is preferably selected from among polyvinylidene fluorides (PVDF) and poly(vinylidene fluoride/trifluoroethylene) (P(VDF/TrFE) copolymers. These enable a high piezoelectric effect to be obtained and are advantageous in that since the proportion of inorganic matter, such as the composite oxide, is lessened, high-speed winding is enabled during spinning and stable operation is enabled even in low-speed winding.

Other examples of piezoelectric materials include inorganic piezoelectric materials such as quartz, lead titanate, lead lanthanium zirconate titanate (PLZT), lithium niobate, lithium tantalate, barium titanate, etc.

With a sea-island type composite fiber body, the resin of the sea component is preferably comprised of the non-piezoelectric portion of a polyvinylidene fluoride (PVDF) or a poly(vinylidene fluoride/trifluoroethylene) (P(VDF/TrFE) copolymer. This is because excellent piezoelectric effects can be obtained in combinations where the piezoelectric body of the island component is a polyvinylidene fluoride (PVDF) piezoelectric body or a poly(vinylidene fluoride/trifluoroethylene) (P(VDF/TrFE) copolymer and the sea component resin is the non-piezoelectric portion of the abovementioned PVDF or P(VDF/TrFE) copolymer.

By making the piezoelectric element to be a polyvinylidene fluoride (PVDF) piezoelectric body or a poly (vinylidene fluoride/trifluoroethylene) (P(VDF/TrFE)) copolymer and the thermoplastic resin to be the non-piezoelectric portion of the abovementioned PVDF or P(VDF/TrFE) copolymer, though the sound pressure and vibration absorption properties that are obtained will not be as high as in the above-described case of $TiBaO_3$ and PZT, an advantage is provided in that the proportion of inorganic matter is lessened as has been mentioned above to enable high-speed winding and stable operation.

With such composite fiber bodies of the sea-island type, binder type, and core-sheath type arrangements, carbon fibers and/or carbon powder are preferably mixed in as a conductive material along with the thermoplastic resin and the piezoelectric material that comprise the fiber body. By mixing these as a third component, the electrical resistance, for the process of converting the charges of the piezoelectric body that are generated by the input of sound pressure and/or vibration into heat by the electrical resistance of the surrounding thermoplastic resin, can be adjusted by the content of the carbon fibers or carbon powder to thereby vary the sound absorption characteristics and frequency characteristics. Rigidity can also be added to the fiber body by the mixing in of carbon fibers or carbon powder.

With core-sheath type vibration damping fibers, the conductive material is preferably comprised of carbon powder or carbon fibers. The conductive material, which is contained along with the piezoelectric material in the polyester that comprises the sheath part, is preferably at least one of either carbon fibers or carbon powder.

Though general examples of conductive materials include carbon powder, such as carbon black, ketchen black, etc., carbon fibers, metal microparticles of iron, aluminum, etc., and semiconductive microparticles of tin oxide ($SnO_2$), zinc oxide (ZnO), etc., the use of carbon fibers or carbon powder is desirable in terms of ease of acquisition in the market and specific gravity.

The average length in the longitudinal direction of the carbon fibers to be used as the conductive material is preferably $0.3\times10^{-6}$ to $100\times10^{-6}$ m. By making the length be within this range, the resin with which carbon fibers are mixed along with the piezoelectric material in the matrix resin can be formed into a fiber readily and the sound absorption performance at the targeted specific frequency of 500 Hz or less can be improved. With an average length of less than $0.3\times10^{-6}$ m, the dispersion property, required for mixing into the matrix resin, becomes poor, and at a length in the excess of $100\times10^{-6}$ m, it becomes difficult to make the diameter thin in the fiber forming process.

Furthermore, by making the average length be in the range of $0.3\times10^{-6}$ to $20\times10^{-6}$ m, the sound absorption performance at a specific frequency of 500 Hz or less, at which sound absorption is required in particular, can be improved efficiently. Here, the average length in the longitudinal direction refers to the median value of the fiber lengths of all fibers used in mixing, with the lengths of the carbon fibers being the lengths in the maximum direction of the respective carbon fibers.

If carbon powder is to be used as the conductive material, the average particle diameter thereof is preferably in the range of $10\times10^{-9}$ to $100\times10^{-9}$ m. By setting the particle diameter in this range, the resin, with which a piezoelectric material and the carbon powder are mixed in the matrix resin, can be formed readily into a fiber, and the sound absorption performance at the targeted specific frequency of 500 Hz or less can be improved. With an average particle diameter of less than $10\times10^{-9}$ m, the dispersion property, required for mixing into the matrix resin, becomes poor, and with an average particle diameter in the excess of $100\times10^{-6}$ m, it becomes difficult to make the diameter thin in the fiber forming process.

Furthermore, by making the average particle diameter be in the range of $10\times10^{-9}$ to $60\times10^{-9}$ m, the sound absorption performance at the lower frequency side of the range of 500 Hz or less, at which sound absorption is required in particular, can be improved efficiently. Here, the average particle diameter is the primary particle diameter of the carbon powder and refers to the median value of the particle diameters of all particles used in mixing. Though the secondary particle diameter will differ according to the degree of formation of structures, this is not restricted in particular here.

The blending amount of the carbon fiber and/or carbon powder to be used as the conductive material is preferably 0.5 to 500 vol % of the piezoelectric material component. By setting the blending amount of the conductive material within this range, the resin, with which a piezoelectric material and a conductive material, that is, the carbon fibers or carbon powder are mixed in the matrix resin, can be formed readily into a fiber, and the sound absorption performance at a specific frequency is improved. A blending amount of the carbon material of less than 0.5 vol % of the piezoelectric material component is unfavorable since, due to the low amount of the mixed conductive material, the performance will practically not differ from the case where the conductive material is not added and only the cost will rise. When the blending amount exceeds 500 vol %, since the viscosity when the mixed resin is melted increases, the spinning properties are degraded significantly and the forming of a fiber tends to be difficult.

Also, by setting the blending amount of the carbon fibers and/or carbon powder to 5 to 100 vol % of the piezoelectric material component, fibers can be formed without hardly degrading the spinning properties. The sound absorption performance at the targeted frequency range of 500 Hz or less can be improved efficiently in terms of cost as well.

Also with the composite fiber bodies of the sea-island type, binder type, and core-sheath type arrangements of this invention, by making the thermoplastic resin, which is the matrix resin that contains a composite oxide as the piezoelectric material, a resin with polarity, the interaction, which occurs between the piezoelectric material and the surrounding resin when charges are generated in the piezoelectric material by the sound pressure and vibration that are input into the fiber composite, becomes stronger than in the case where a non-polar resin is used and even higher sound pressure and vibration absorbing properties can be obtained. Here, a resin with polarity refers to a resin with a polar group, such as an amide group, ester group, or carbonate group.

The sea-island type, binder type, and core-sheath type composite fiber bodies that are to serve as energy conversion fiber bodies of this invention have an energy absorption characteristic at a resonance frequency of $f1=1/(2\pi\sqrt{(LC)})$ due to the LC resonance by the capacitance C of the piezoelectric material and the pseudo-inductance component L of the portions besides the piezoelectric material. With a sea-island type composite fiber body, only the island component has this characteristic.

Since it is inherently difficult to make accurate measurements of the capacitance C of a piezoelectric material that is dispersed in a matrix resin and the pseudo-inductance component that is formed across a conductive material or other third component, the resonance frequency cannot be set accurately by means of f1. However, by setting f1 using the approximation equation, $f1=1/(2\pi\sqrt{(LC)})$, a sound absorbing material with a sound absorption peak at a specific frequency can be prepared. Also, this f1 can be adjusted effectively by the third component, and in this case, 3 to 10 mass % of the resin components, including the piezoelectric material, is preferably the third component.

The same sea-island type, binder type, and core-sheath type composite fiber bodies also have an energy absorption characteristic at a resonance frequency of $f2=1/(2\pi\sqrt{(RC)})$, which is input as vibration, sound pressure, or a composite of these, due to the capacitance C of the piezoelectric material and the pseudo-resistance component R of the portions besides the piezoelectric material. With a sea-island type composite fiber body, only the island component has this characteristic. This is effective in cases where the measurement of the inductance component is difficult, and here, the piezoelectric resonance frequency f2 is determined using the pseudo-resistance R, which is relatively easy to measure, and though the above equation is an approximation formula as in the case of f1, it enables a sound absorbing material to be obtained that is made high in activity with respect to the frequency f2, which is input as vibration, sound pressure, or a composite of these, by the capacitance C of the piezoelectric material and the pseudo-resistance component R of the portions besides the piezoelectric material. As in the case of f1, the frequency can be adjusted by means of the blending amount of the third component.

With regard to the sea-island type composite fiber body among the energy conversion fiber bodies of this invention, different piezoelectric resonance frequencies can be set in at least two or more island components to add sound absorption characteristics at a plurality of frequency ranges. Though it is also possible to add a different frequency characteristic to each of a plurality of island components, since this will be equivalent to improving the performance uniformly across all wavelengths, it is more desirable to allocate only about three frequencies.

With regard to core-sheath type composite fibers, the material system formed by the polyester and the piezoelectric material in the water-soluble adhesive agent or by the polyester, piezoelectric material, and conductive material in the water-soluble adhesive agent has a sound absorbing characteristic at a resonance frequency of $f1=1/(2\pi\sqrt{(LC)})$ due to the LC resonance by the capacitance C of the piezoelectric material and the pseudo-inductance component L of the portions besides the piezoelectric material. Likewise, the material system may also have a sound absorbing characteristic due to the resonance expressed by the approximation formula $f2=1/(2\pi\sqrt{(RC)})$ for a frequency f2, which is input as vibration, sound pressure, or composite of these, as a result of the capacitance C of the piezoelectric material and the pseudo-resistance component R of the other portions.

10 to 100 mass % of an above-described energy conversion fiber body by this invention may be used to form a fiber composite and arrange a sound absorbing material, and a sound absorbing material can thereby be obtained with which, by the sound absorption effect based on the friction with air and the sound pressure reducing effect based on the piezoelectric effect and other forms of energy conversion, the sound pressure reducing effects are improved across all frequency ranges or a sound absorbing effect is provided at a specific frequency. The sound absorption performance will be improved more the greater the blending amount of the above-described fiber body, and with a blending amount of less than 10 mass %, the effects of blending such a composite fiber body will not be expressed in the performance. A natural fiber, such as felt, etc., or a synthetic fiber, such as polyester, etc., may be used as the portions besides the above-described composite fiber body.

With a sea-island type composite fiber body, the effects of a sound absorbing material can be provided by the composite fibers as they are or by just the island components obtained by elimination of the sea components. In this case, just the island components may be made into a non-woven fabric by a card type non-woven fabric process or be made into a non-woven fabric by an air blowing method. In general, the air blowing method is more efficient in the case of island components that are less than 10 μm in diameter and the card method is good for island components of larger diameter. It is also preferable for the diameter of the island components to be 10 to 30 μm and not to make the island components extremely minute as in general composite fibers. This is because the piezoelectric fiber body can then be produced in a more stable manner.

Any of the prior methods may be employed to prepare a woven type or knit type sound absorbing material. Woven type materials of all types of weave, such as plain weave, twill weave, satin weave, and double weaves and modified structures of these types of weave, etc. are possible. Knit type materials of all types of knitting, such as weft knitting, warp knitting, etc. are also possible. If a cloth is to be formed, a woven or knit material of as high a density as possible is preferably formed in advance.

Figure 35A:
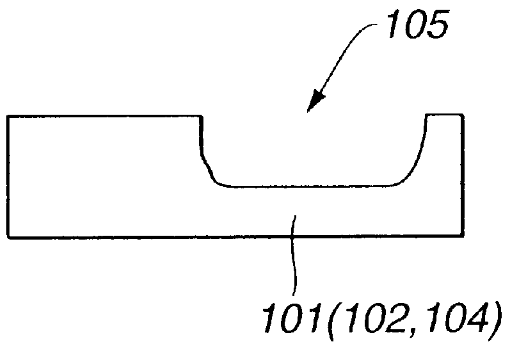
FIGS. 35A and 35B are schematic views for showing a sound absorbing material, with which an energy conversion fiber body by this invention has been formed to take on a shape that is in accordance with the installation location and an enlarged sectional view thereof.
Figure 35B:
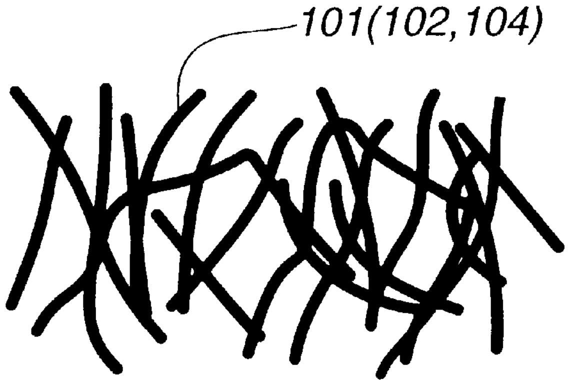

A sound absorbing material that uses an energy conversion fiber body by this invention may be thermoformed upon mixing binder fibers that has the function of heat fusing with another fiber at least on the surface. That is, by blending a binder component, thermoforming is enabled to enable use as various types of insulator materials, such as the interior trim material for a vehicle. Also, as illustrated FIGS. 35A and 35, the sound absorbing material can be formed into an arbitrary shape and adapted to an arbitrary space by thermoforming. If a binder type composite fiber by this invention is used in such cases, thermal adhesion with other fibers can be accomplished by the softening of the sheath component of the fiber to enable the making of a sound absorbing material of even higher vibration damping performance.

Here, besides the containing of binder type composite fibers by this invention or general binder fibers, there are no particular restrictions concerning the fibers that comprise the fiber composite that is to function as a sound absorbing material. However, it is economically advantageous to employ a method of mixing and thermoforming such binder fibers and fibers that can be obtained readily in the market in general, for example, fibers having polyethylene terephthalate (PET) as the main component.

A high-performance sound insulating structure can be made by adhering a sound absorbing material that uses an energy conversion fiber body by this invention to a plate material. This is because though a plate type sound insulating material has an inherent sound insulation frequency that is in accordance with the thickness, weight, and material quality of the plate, separate sound characteristics based on the sound absorbing material can be added.

The sea-island type composite fibers having island components and sea component differing in piezoelectric property and stretchability are advantageous in ease in production for example by the melt spinning method. When the geometrical moment of inertia of one island component is made no more than 10% of the geometrical moment of inertia of the entire composite fiber, the spring constant of the fiber body is decreased, the amount of deformation due to sound pressure is increased and the sound absorption effect is improved by the increase in the amount of charges that are generated in the piezoelectric material. When the cross-sectional area of one island component is made 30% or less of the cross-sectional area of the entire composite fiber, composite fibers can be formed readily and the piezoelectric effect is improved by the decreasing of the geometrical moment of inertia. When the non-circularity ratio of the cross sections of the island components is set in the range of 1.1 to 3.0, composite fibers can be formed readily and the piezoelectric effect is improved by the decreasing of the geometrical moment of inertia. When 80 to 100 mass % of the island component is a mixture of a thermoplastic resin and a piezoelectric material, the piezoelectric effect is improved. When the resin of the sea component is comprised of the non-piezoelectric portion of polyvinylidene fluoride (PVDF) or poly(vinylidene fluoride/trifluoroethylene) (P(VDF/TrFE)) copolymer, excellent piezoelectric effects can be obtained by making the piezoelectric body in the island components a PVDF piezoelectric body or a P(VDF/TrFE) copolymer.

When the energy conversion fiber body is comprised of core-sheath type binder fibers with which a strongly polar organic agent, having a solubility parameter within a specified range, is contained as the piezoelectric material in the resin of one of either the core component or the sheath component and the resin of the other of the core component and the sheath component does not contain practically any components besides the resin, the fiber body is excellent in vibration damping property and spinning property as well as in economy due to the ease of acquisition of the strongly polar organic agents. When the abovementioned resin of either the core component or the sheath component contains a piezoelectric material other than the abovementioned strongly polar organic agent, and when the abovementioned resin of one of the core component and the sheath component further contains a conductive material, the piezoelectric performance is improved further and the charges that are generated by the strongly polar organic agent and the piezoelectric material are consumed efficiently as heat due to the electrical resistance of the conductive material and the resin to enable sound pressure and vibration to be absorbed efficiently. When benzothiazoles, benzodiazoles, benzotriazoles, benzothiazyl sulfenamides, or mercaptobenzothiazyls is used as the strongly polar organic agent, the strongly polar organic agent can be obtained readily in the market and yet can satisfy the abovementioned range of solubility parameter. When the core component is comprised of a resin that contains a strongly polar organic agent and the sheath component does not contain practically any components besides the resin, the heat adhesion property can be improved. When the solubility parameter of the resin that contains the strongly polar organic agent is in the range of $1.60 \times 10^4$ to $2.78 \times 10^4 (J/m^3)^{0.5}$, the vibration damping performance can be improved by the resin that is high in electrical interaction with the strongly polar organic agent.

The core-sheath type composite fiber can improve the absorption of sound pressure and vibration while securing the molding properties, processability, and mechanical strength. The addition of conductive material is effective in improving the efficiency in conversion of the charges generated in the piezoelectric material into heat and enabling the adjustment of the sound absorption characteristics by adjustment of the conductive material. When the ratio of the weight of the piezoelectric material in the sheath component or the weight of the mixture of piezoelectric material and conductive material in the sheath component, to the dry weight of the layer containing polyester as the main component in the sheath component is in the range of 1:1 to 10:1, the sheath part can be formed satisfactorily without the falling off of the piezoelectric material and conductive material to thereby enable excellent vibration damping effects to be exhibited. When the core component occupies 40 to 98% of the cross-sectional area, the piezoelectric material and conductive material used in the sheath component are powder, and the lengths of the largest parts of the piezoelectric material and conductive material are 0.8 to 25% of the circle-equivalent diameter, flexibility and forming properties are secured to enable non-woven fabrics to be made readily.

A composite oxide having at least an alkali earth metal may be contained as the piezoelectric material. The composite oxide may be an oxide of at least one element selected among group IV and an alkali earth metal. The molar ratio of the alkali earth metal to the at least one element selected from among group IV may be set in the range of 1:0.98 to 1:1. The abovementioned alkali earth metal may be at least one element selected from among Ba, Sr, Ca, and Mg. The abovementioned group IV element may be at least one element selected from among Ti, Zr, Sn, and Pb. Thus, it is possible to achieve superior noise reducing performance with sufficient piezoelectric effect, and to tune or adjust a peak of the sound absorption to a desired frequency by selecting a desired combination of these components.

The average particle diameter of the composite oxide may be set in the range of $0.3 \times 10^{-6}$ to $10.0 \times 10^{-6}$ m and more preferably in the range of $0.3 \times 10^{-6}$ to $7.0 \times 10^{-6}$ m. Therefore, the diameter of the fiber can be made thin without lowering the property of dispersion in the process of mixing in the composite oxide and the sound absorption performance, in particular, the sound absorption performance in the low frequency range of 500 Hz or less can be improved. The blending amount of the composite oxide component may be set to 0.5 to 1000 vol % of the thermoplastic resin and more preferably to 25 to 400 vol %. In this case, the sound absorption performance at the low frequency range can be improved-along with the spinnability.

The use of at least one compound selected from among polyvinylidene fluorides (PVDF) and poly(vinylidene fluoride /trifluoroethylene) (P(VDF/TrFE)) copolymers as the piezoelectric material is effective in providing high piezoelectric effects and improving the spinnability by decreasing the content of inorganic substances.

The use of carbon material such as carbon fiber and/or carbon powder as the conductive material along with a piezoelectric material makes it possible to adjust the sound absorbing characteristics and frequency characteristics to a desired form by adjusting the electric resistance with the percentage of the carbon material.

The LC resonance due to the capacitance C of the piezoelectric material and the pseudo-inductance component L of the portions other than the piezoelectric material provides an energy absorption characteristic at a resonance frequency expressed as:

$$f1=1/(2\pi\sqrt{(LC)}) \quad \text{EQ1}$$

The sound absorption characteristics of the fiber body can be tuned to a desired frequency by adjustment of the capacitance C and pseudo-inductance component L and especially the pseudo-inductance component L.

The capacitance C of the piezoelectric material and the pseudo-resistance component R of the portions besides the piezoelectric material provide an energy absorption characteristic at a frequency expressed as:

$$f2=1/(2\pi\sqrt{(RC)}) \quad \text{EQ2}$$

Thus, it is possible to tune the sound absorption characteristic of the fiber body to a desired frequency by adjustment of the pseudo-resistance component R even in cases where measurement or estimation of the pseudo-inductance component is difficult.

The use of binder type energy consuming fiber in addition to non-binder type energy consuming fiber facilitates the process of forming a fiber body by heat into a desired shape and improve the vibration damping performance.

PRACTICAL EXAMPLE II

Practical examples II1~II92 are practical examples according to a second aspect of the present invention.

EXAMPLE II1 (IIPE1)

80 mass % of a composite oxide $TiBaO_n$ (where n is a natural number with n=3 in general and Ti:Ba=1:1), comprised of the alkali earth metal Ba and the group IVa element Ti, and 20 mass % of PA6 (nylon 6), which is to serve as the matrix resin, were mixed to produce a composite oxide mixed type composite fiber body (energy conversion fiber body) with a diameter of approximately 50 μm.

80 mass % of this fiber body was mixed with 20 mass % of a PET binder fiber, having a softening point of approximately 110° C. and a diameter of approximately 15 μm, and formed into a non-woven fabric by the card layering method to produce a sound absorbing material with an area density of 1.0 $kg/m^2$ and a thickness of 30 mm.

EXAMPLE II2 (IIPE2)

Besides using $TiBaO_n$ (where n is a natural number with n=3 in general and Ti:Ba=1:0.998) as the composite oxide, a composite oxide mixed type composite fiber body (energy conversion fiber body) was produced under exactly the same conditions as Example II1, and thereafter a sound absorbing material was produced under the same conditions.

PRACTICAL EXAMPLE II3 (IIPE3)

Besides using $TiBaO_n$ (where n is a natural number with n=3 in general and Ti:Ba=1:0.995) as the composite oxide, a composite oxide mixed type composite fiber body (energy conversion fiber body) was produced under exactly the same conditions as Example II1, and thereafter a sound absorbing material was produced under the same conditions.

PRACTICAL EXAMPLE II4 (IIPE4)

Besides using $TiBaO_n$ (where n is a natural number with n=3 in general and Ti:Ba=1:0.994) as the composite oxide, a composite oxide mixed type composite fiber body (energy conversion fiber body) was produced under exactly the same conditions as Example II1, and thereafter a sound absorbing material was produced under the same conditions.

PRACTICAL EXAMPLE II5 (IIPE5)

Besides using PET (polyester) as the matrix resin, a composite oxide mixed type composite fiber body (energy conversion fiber body) and a sound absorbing material were produced under exactly the same conditions as Example II1.

PRACTICAL EXAMPLE II6 (IIPE6)

With the exception of using PP (polypropylene) as the raw matrix resin, a composite oxide mixed type composite fiber body (energy conversion fiber body) and a sound absorbing material were produced under exactly the same conditions as Example II1.

PRACTICAL EXAMPLE II7(IIPE7)

Besides mixing 66 mass % of the composite oxide, $TiBaO_n$ (where n is a natural number with n=3 in general and Ti:Ba=1:1), with 34 mass % of PA6 (nylon 6) as the matrix resin, a composite oxide mixed type composite fiber body (energy conversion fiber body) and a sound absorbing material were produced under exactly the same conditions as Example II1.

EXAMPLE 8

79.7 mass % of the composite oxide,-$TiBaO_n$ (where n is a natural number with n=3 in general and Ti:Ba=1:1), were mixed with 19.7 mass % of PA6 (nylon 6) as the matrix resin and 0.6 mass % of carbon fibers, and a composite oxide mixed type composite fiber body (energy conversion fiber body) and a sound absorbing material were produced under exactly the same conditions as Example II1.

PRACTICAL EXAMPLE II9 (IIPE9)

Besides changing the carbon fibers to the same mass of carbon black, a composite oxide mixed type composite fiber body (energy conversion fiber body) and a sound absorbing material were produced under exactly the same conditions as Example II8.

PRACTICAL EXAMPLE II10 (IIPE10)

80 mass % of a composite oxide $TiSrO_n$ (where n is a natural number with n=3 in general and Ti:Sr=1:1), comprised of the alkali earth metal Sr and the group IVa element Ti, was mixed with 20 mass % of PA6 (nylon 6) as the matrix resin to produce a composite oxide mixed type composite fiber body (energy conversion fiber body) with a diameter of approximately 50 μm. A sound absorbing material was then produced under exactly the same conditions as Example II1.

PRACTICAL EXAMPLE II11 (IIPE11)

80 mass % of a composite oxide $TiCaO_n$ (where n is a natural number with n=3 in general and Ti:Ca=1:1), comprised of the alkali earth metal Ca and the group IVa element Ti, was mixed with 20 mass % of PA6 (nylon 6) as the matrix resin to produce a composite oxide mixed type composite fiber body (energy conversion fiber body) with a diameter of approximately 50 μm. A sound absorbing material was then produced under exactly the same conditions as Example II1.

PRACTICAL EXAMPLE II12 (IIPE12)

80 mass % of a composite oxide $TiMgO_n$ (where n is a natural number with n=3 in general and Ti:Mg=1:1), comprised of the alkali earth metal Mg and the group IVa element Ti, was mixed with 20 mass % of PA6 (nylon 6) as the matrix resin to produce a composite oxide mixed type composite fiber body (energy conversion fiber body) with a diameter of approximately 50 μm. A sound absorbing material was then produced under exactly the same conditions as Example II1.

PRACTICAL EXAMPLE II13 (IIPE13)

80 mass % of a composite oxide $ZrBaO_n$ (where n is a natural number with n=3 in general and Zr:Ba=1:1), comprised of the alkali earth metal Ba and the group IVa element Zr, was mixed with 20 mass % of PA6 (nylon 6) as the matrix resin to produce a composite oxide mixed type composite fiber body (energy conversion fiber body) with a diameter of approximately 50 μm. A sound absorbing material was then produced under exactly the same conditions as Example II1.

PRACTICAL EXAMPLE II14(IIPE14)

80 mass % of a composite oxide $ZrCaO_n$ (where n is a natural number with n=3 in general and Zr:Ca=1:1), comprised of the alkali earth metal Ca and the group IVa element Zr, was mixed with 20 mass % of PA6 (nylon 6) as the matrix resin to produce a composite oxide mixed type composite fiber body (energy conversion fiber body) with a diameter of approximately 50 μm. A sound absorbing material was then produced under exactly the same conditions as Example II1.

PRACTICAL EXAMPLE II15(IIPE15)

80 mass % of a composite oxide $SnBaO_n$ (where n is a natural number with n=3 in general and Sn:Ba=1:1), comprised of the alkali earth metal Ba and the group IVb element Sn, was mixed with 20 mass % of PA6 (nylon 6) as the matrix resin to produce a composite oxide mixed type composite fiber body (energy conversion fiber body) with a diameter of approximately 50 μm. A sound absorbing material was then produced under exactly the same conditions as Example II1.

PRACTICAL EXAMPLE II16(IIPE16)

80 mass % of a composite oxide $SnCaO_n$ (where n is a natural number with n=3 in general and Sn:Ca=1:1), comprised of the alkali earth metal Ca and the group IVb element Sn, was mixed with 20 mass % of PA6 (nylon 6) as the matrix resin to produce a composite oxide mixed type composite fiber body (energy conversion fiber body) with a diameter of approximately 50 μm. A sound absorbing material was then produced under exactly the same conditions as Example II1.

PRACTICAL EXAMPLE II17(IIPE17)

Besides using $TiBaO_n$ (where n is a natural number with n=3 in general and Ti:Ba=1:0.98) as the composite oxide, a composite oxide mixed type composite fiber body (energy conversion fiber body) was produced under exactly the same conditions as Example II1, and thereafter a sound absorbing material was produced under the same conditions.

PRACTICAL EXAMPLE II18(IIPE18)

Besides using $TiBaO_n$ (where n is a natural number with n=3 in general and Ti:Ba=1:0.97) as the composite oxide, a composite oxide mixed type composite fiber body (energy conversion fiber body) was produced under exactly the same conditions as Example II1, and thereafter a sound absorbing material was produced under the same conditions.

COMPARATIVE EXAMPLE II1 (IICE1)

Using 80 mass % of PET fibers with a diameter of 20 $\mu$m in place of the composite fiber body (energy conversion fiber body) and mixing 20 mass % of the same binder fibers as those used in Example 1, a sound absorbing material was produced under exactly the same conditions as Example II1.

Evaluation Test II1 (IIET1)

Figure 36:
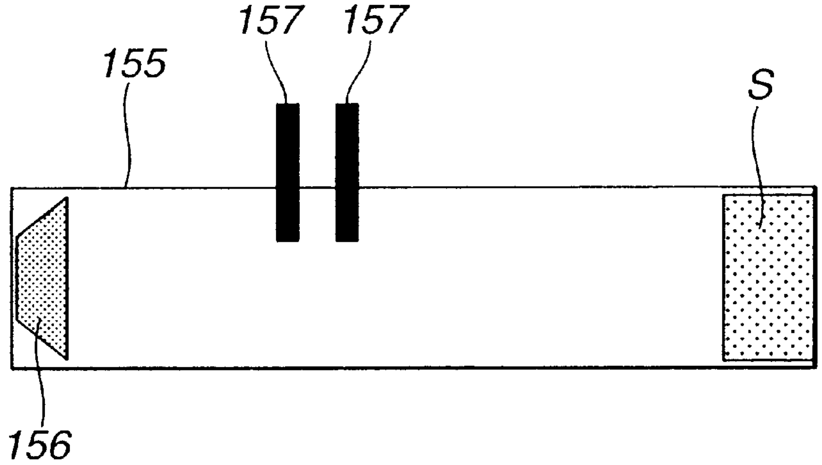
FIG. 36 is an outline view, which shows the structure of a device that is used for the measurement of the normal incidence absorption coefficient.

For the sound absorbing material samples obtained in the above-described Examples II1 to II18 and Comparative Example II1, the sound absorption coefficients in the frequency range of 100 to 1600 Hz were measured based on the method of measurement of the normal incidence absorption coefficients for building materials by the pipe method as defined in JIS A1405 and using the device of the structure shown in FIG. 36. With the normal incidence absorption coefficient measurement device shown in FIG. 36, a speaker 156 is equipped as the sound source at one end of a normal incidence absorption coefficient measurement pipe 155, measurement microphones 157 are installed at central positions, and sample S is set at the other end of the abovementioned measurement pipe 155. A non-woven cloth of 10 mm thickness and 100 mm diameter was cut out as sample S from each of the sound absorbing materials of the respective Examples and Comparative Example. The results are shown in Table IIT1.

TABLE IIT1

| Examples | Alkali earth metal A | Group IVa element B | Group IVb element B | Molar ratio A:B | Matrix resin | Weight ratio (resin:composite oxide) | Third component | Blending amount of piezoelectric fibers (mass %) | Sound absorbing material binder (mass %) |
|---|---|---|---|---|---|---|---|---|---|
| IIPE1 | Ba | Ti | — | 1:1 | PA6 | 1:4 | — | 80 | 20 |
| IIPE2 | Ba | Ti | — | 1:0.998 | PA6 | 1:4 | — | 80 | 20 |
| IIPE3 | Ba | Ti | — | 1:0.995 | PA6 | 1:4 | — | 80 | 20 |
| IIPE4 | Ba | Ti | — | 1:0.994 | PA6 | 1:4 | — | 80 | 20 |
| IIPE5 | Ba | Ti | — | 1:1 | PET | 1:4 | — | 80 | 20 |
| IIPE6 | Ba | Ti | — | 1:1 | PP | 1:4 | — | 80 | 20 |
| IIPE7 | Ba | Ti | — | 1:1 | PA6 | 1:2 | — | 80 | 20 |
| IIPE8 | Ba | Ti | — | 1:1 | PA6 | 1:4 | CF fibers | 80 | 20 |
| IIPE9 | Ba | Ti | — | 1:1 | PA6 | 1:4 | CF powder | 80 | 20 |
| IIPE10 | Sr | Ti | — | 1:1 | PA6 | 1:4 | — | 80 | 20 |
| IIPE11 | Ca | Ti | — | 1:1 | PA6 | 1:4 | — | 80 | 20 |
| IIPE12 | Mg | Ti | — | 1:1 | PA6 | 1:4 | — | 80 | 20 |
| IIPE13 | Ba | Zr | — | 1:1 | PA6 | 1:4 | — | 80 | 20 |
| IIPE14 | Ca | Zr | — | 1:1 | PA6 | 1:4 | — | 80 | 20 |
| IIPE15 | Ba | — | Sn | 1:1 | PA6 | 1:4 | — | 80 | 20 |
| IIPE16 | Ca | — | Sn | 1:1 | PA6 | 1:4 | — | 80 | 20 |
| IIPE17 | Ba | Ti | — | 1:0.98 | PA6 | 1:4 | — | 80 | 20 |
| IIPE18 | Ba | Ti | — | 1:0.97 | PA6 | 1:4 | — | 80 | 20 |
| IICE1 | — | — | — | — | PET | — | — | 80 | 20 |

| Examples | Set frequency Hz (equation) | Sound absorption coefficient 50 Hz | 100 Hz | 200 Hz | 300 Hz | 500 Hz | Sound absorption coeff. at set frequency |
|---|---|---|---|---|---|---|---|
| IIPE1 | 200 (Equation 1) | 0.05 | 0.23 | 0.45 | 0.30 | 0.30 | 0.45 |
| IIPE2 | 180 (Equation 1) | 0.04 | 0.21 | 0.40 | 0.29 | 0.30 | 0.43 |
| IIPE3 | 150 (Equation 1) | 0.06 | 0.25 | 0.30 | 0.38 | 0.42 | 0.42 |
| IIPE4 | 100 (Equation 1) | 0.27 | 0.35 | 0.30 | 0.30 | 0.40 | 0.35 |
| IIPE5 | 220 (Equation 1) | 0.10 | 0.20 | 0.45 | 0.40 | 0.40 | 0.46 |
| IIPE6 | 200 (Equation 1) | 0.10 | 0.25 | 0.41 | 0.35 | 0.40 | 0.41 |
| IIPE7 | 230 (Equation 1) | 0.12 | 0.22 | 0.40 | 0.37 | 0.44 | 0.45 |
| IIPE8 | 300 (Equation 2) | 0.10 | 0.20 | 0.40 | 0.50 | 0.45 | 0.50 |
| IIPE9 | 500 (Equation 2) | 0.10 | 0.18 | 0.30 | 0.35 | 0.60 | 0.60 |
| IIPE10 | 100 (Equation 1) | 0.25 | 0.35 | 0.30 | 0.30 | 0.40 | 0.35 |
| IIPE11 | 80 (Equation 1) | 0.30 | 0.25 | 0.25 | 0.30 | 0.45 | 0.30 |
| IIPE12 | 50 (Equation 2) | 0.25 | 0.20 | 0.20 | 0.30 | 0.45 | 0.25 |
| IIPE13 | 400 (Equation 1) | 0.15 | 0.20 | 0.30 | 0.40 | 0.45 | 0.50 |
| IIPE14 | 300 (Equation 1) | 0.10 | 0.20 | 0.45 | 0.50 | 0.40 | 0.50 |
| IIPE15 | 500 (Equation 2) | 0.10 | 0.20 | 0.25 | 0.35 | 0.60 | 0.60 |
| IIPE16 | 400 (Equation 2) | 0.11 | 0.21 | 0.30 | 0.42 | 0.45 | 0.55 |
| IIPE17 | 50 (Equation 1) | 0.31 | 0.2 | 0.2 | 0.3 | 0.45 | 0.31 |
| IIPE18 | 50 (Equation 1) | 0.03 | 0.04 | 0.10 | 0.19 | 0.35 | 0.35 |
| IICE1 | — | 0.00 | 0.02 | 0.10 | 0.18 | 0.40 | — |

PRACTICAL EXAMPLE II19 (IIPE19)

95 mass % of polyester resin and a $TiBaO_3$ piezoelectric body was used and 5 mass % of carbon powder was mixed as a conductive material in the island components, copolymerized polystyrene was used in the sea component, the area ratio of a total of 6 islands to the sea component was set to 7:3, and spinning and drawing were performed to prepare a sea-island type composite fiber body (energy conversion fiber body) 1 with a single fiber diameter of 60 $\mu$m, such as shown in FIGS. 25A and 25B. The island components 101*a* of this composite fiber 101 had an average diameter of 20 $\mu$m, an oblong cross section of a non-circularity ratio of 1.2, a cross-sectional area ratio with respect to the entire composite fiber of 5%, and a ratio of the geometrical moment of inertia with respect to the entire composite fiber of 2%, and the piezoelectric resonance frequency thereof was set to 200 Hz by means of the pseudo-inductance component L across the matrix resin and the carbon powder and using Approximation Equation 1, in other words, $f1=1/(2\pi\sqrt{(LC)})$. The piezoelectricity ratio of the island components and the sea component was such that the island components were approximately 100 times higher in piezoelectricity and the sea component extraction ratio indicated a difference of approximately 50 times in extractability.

This composite fiber 101 was immersed for approximately 1 hour in a weakly basic aqueous solution of sodium hydroxide at approximately 100° C. to eliminate the sea component by dissolution and thereafter dried and made into short fibers to produce piezoelectric fibers of 20 $\mu$m average diameter and approximately 50 mm fiber length. 80 mass % of these fibers was mixed with 20 mass % of 2 dernier polyester binder fibers, with a softening point of approximately 110° C., and a sound absorbing material of 1.0 $kg/m^2$ thickness area density and 30 mm thickness was prepared by the card layering method.

PRACTICAL EXAMPLE II20(IIPE20)

Polypropylene resin was used in the island components, the area ratio of a total of 8 islands to the sea component was set to 7:3, and spinning and drawing were performed with the other conditions being the same as the conditions of Example 19 described above to prepare a sea-island type composite fiber body (energy conversion fiber body) 1 with a single fiber diameter of 100 $\mu$m. The island components 1*a* of this composite fiber 1 had an average diameter of 30 $\mu$m, an oblate cross section of a non-circularity ratio of 1.2, a cross-sectional area ratio with respect to the entire composite fiber of 10%, and a ratio of the geometrical moment of inertia with respect to the entire composite fiber of 1%, and the piezoelectric resonance frequency thereof was set to 200 Hz by means of the pseudo-inductance component L across the matrix resin and the carbon powder and using Approximation Equation 1, in other words, $f1=1/(2\pi\sqrt{(LC)})$. The piezoelectricity ratio of the island components and the sea component was such that the island components were approximately 90 times higher in piezoelectricity and the sea component extraction ratio indicated a difference of approximately 45 times in extractability.

Piezoelectric fibers of 30 $\mu$m average diameter were produced from this composite fiber 103 and a sound absorbing material of the same conditions as those of Example 19 was prepared by exactly the same method as that of Example II19.

PRACTICAL EXAMPLE II21(IIPE21)

Nylon 6 resin was used in the island components, polyacetal resin was used in the sea component, the area ratio of a total of 18 islands to the sea component was set to 7:3, and spinning and drawing were performed with the other conditions being the same as the conditions of Example 19 described above to prepare a sea-island type composite fiber body (energy conversion fiber body) 1 with a single fiber diameter of 10 $\mu$m. The island components 1*a* of this composite fiber 1 had an average diameter of 2 $\mu$m, an oblate cross section of a non-circularity ratio of 1.2, a cross-sectional area ratio with respect to the entire composite fiber of 4%, and a ratio of the geometrical moment of inertia with respect to the entire composite fiber of 0.2%, and the piezoelectric resonance frequency thereof was set to 200 Hz by means of the pseudo-inductance component L across the matrix resin and the carbon powder and using Approximation Equation 1, in other words, $f1=1/(2\pi\sqrt{(LC)})$. The piezoelectricity ratio of the island components and the sea component was such that the island components were approximately 150 times higher in piezoelectricity and the sea component extraction ratio indicated a difference of approximately 48 times in extractability.

Piezoelectric fibers of 2 $\mu$m average diameter were produced from this composite fiber 101 and a sound absorbing material of the same conditions was prepared by the air blow method.

PRACTICAL EXAMPLE II22(IIPE22)

98 mass % of nylon 6,6 resin and a $TiBaO_3$ piezoelectric body was used and 2 mass % of carbon powder was mixed as a conductive material in the island components, methacrylic resin was used in the sea component, the area ratio of a total of 32 islands to the sea component was set to 9:1, and spinning and drawing were performed to prepare a sea-island type composite fiber body (energy conversion fiber body) 101 with a single fiber diameter of 60 $\mu$m. The island components 101*a* of this composite fiber 101 had an average diameter of 10 $\mu$m, an oblong cross section of a non-circularity ratio of 1.2, a cross-sectional area ratio with respect to the entire composite fiber of 3%, and a ratio of the geometrical moment of inertia with respect to the entire composite fiber of 0.1% or less, and the piezoelectric resonance frequency thereof was set to 100 Hz by means of the pseudo-resistance component R across the matrix resin and the carbon powder and using Approximation Equation 2, in other words, $f2=1/(2\pi\sqrt{(RC)})$. The piezoelectricity ratio of the island components and the sea component was such that the island components were approximately 120 times higher in piezoelectricity and the sea component extraction ratio indicated a difference of approximately 80 times in extractability.

Piezoelectric fibers of 10 $\mu$m average diameter were produced from this composite fiber 101 and a sound absorbing material of the same conditions as those of Example II19 was prepared by exactly the same method as that of Example II19.

PRACTICAL EXAMPLE II23(IIPE23)

Besides using cellulose ester, impregnated with a polyol ester plasticizer and mixing 2 mass % of carbon fibers as the conductive material in the sea component, a sea-island type composite fiber body (energy conversion fiber body) 1 with a single fiber diameter of 60 $\mu$m was prepared with the area ratio of a total of 4 islands to the sea component being set to 1:9 and by spinning and drawing under the same conditions as Example II19 described above. The island components 1*a* of this composite fiber 1 had an average diameter of 10 $\mu$m, an oblate cross section of a non-circularity ratio of 1.2, a cross-sectional area ratio with respect to the entire composite fiber of 3%, and a ratio of the geometrical moment of inertia with respect to the entire composite fiber of 0.1% or less, and the piezoelectric resonance frequency thereof was set to 100 Hz by means of the pseudo-resistance component R across the matrix resin and the carbon powder and using Approximation Equation 2, in other words, $f2=1/(2\pi\sqrt{(RC)})$. The piezoelectricity ratio of the island components and the sea component was such that the island components were approximately 120 times higher in piezoelectricity and the sea component extraction ratio indicated a difference of approximately 40 times in extractability.

Piezoelectric fibers of 10 $\mu$m average diameter were produced from this composite fiber 101 and a sound absorbing material of the same conditions as those of Example II19 was prepared by exactly the same method as that of Example II19.

PRACTICAL EXAMPLE II24(IIPE24)

93 mass % of nylon 6 resin and a $TiBaO_3$ piezoelectric body were used and 7 mass % of carbon powder were mixed as a conductive material in the island components, a polyester copolymer, comprised of sulfoisophthalic acid sodium salt and terephthalic acid, was used in the sea component, the area ratio of a total of 3 islands to the sea component was set to 6:4, and spinning and drawing were performed to prepare a sea-island type composite fiber body (energy conversion fiber body) 101 with a single fiber diameter of 100 $\mu$m. The island components 101*a* of this composite fiber 1 had an average diameter of 50 $\mu$m, an oblate cross section of a non-circularity ratio of 1.8, a cross-sectional area ratio with respect to the entire composite fiber of 25%, and a ratio of the geometrical moment of inertia with respect to the entire composite fiber of 7%, and the piezoelectric resonance frequency thereof was set to 300 Hz by means of the pseudo-inductance component L across the matrix resin and the carbon powder and using Approximation Equation 1, in other words, $f1=1/(2\pi\sqrt{(LC)})$. The piezoelectricity ratio of the island components and the sea component was such that the island components were approximately 50 times higher in piezoelectricity and the sea component extraction ratio indicated a difference of approximately 45 times in extractability.

Piezoelectric fibers of 50 $\mu$m average diameter were produced from this composite fiber 101 and a sound absorbing material of the same conditions as those of Example II19 was prepared by exactly the same method as that of Example II19.

PRACTICAL EXAMPLE II25(IIPE25)

Besides using 93 mass % of the resin and the piezoelectric body and mixing 7 mass % of carbon powder as the conductive material in the island components, a sea-island type composite fiber body (energy conversion fiber body) 1 with a single fiber diameter of 20 $\mu$m was prepared with the area ratio of a total of 300 islands to the sea component being set to 8:2 and by spinning and drawing under the same conditions as Example 19 described above. The island components 101*a* of this composite fiber 101 had an average diameter of 1 $\mu$m, an oblate cross section of a non-circularity ratio of 1.2, a cross-sectional area ratio with respect to the entire composite fiber of 0.3%, and a ratio of the geometrical moment of inertia with respect to the entire composite fiber of 0.1% or less, and the piezoelectric resonance frequency thereof was set to 300 Hz by means of the pseudo-inductance component L across the matrix resin and the carbon powder and using Approximation Equation 1, in other words, $f1=1/(2\pi\sqrt{(LC)})$. The piezoelectricity ratio of the island components and the sea component was such that the island components were approximately 200 times higher in piezoelectricity and the sea component extraction ratio indicated a difference of approximately 60 times in extractability.

Piezoelectric fibers of 1 $\mu$m average diameter were produced from this composite fiber 101 and a sound absorbing material of the same conditions was prepared by the air blowing method.

PRACTICAL EXAMPLE II26(IIPE26)

Besides using 90 mass % of the resin and the piezoelectric body and mixing 10 mass % of carbon powder as the conductive material in the island components, a sea-island type composite fiber body (energy conversion fiber body) 1 with a single fiber diameter of 20 $\mu$m was prepared with the area ratio of a total of 2 islands to the sea component being set to 4:6 and by spinning and drawing under the same conditions as Example 19 described above. The island components 1*a* of this composite fiber 1 had an average diameter of 10 $\mu$m, an oblate cross section of a non-circularity ratio of 1.5, a cross-sectional area ratio with respect to the entire composite fiber of 25%, and a ratio of the geometrical moment of inertia with respect to the entire composite fiber of 10%, and the piezoelectric resonance frequency thereof was set to 500 Hz by means of the pseudo-inductance component L across the matrix resin and the carbon powder and using Approximation Equation 1, in other words, $f1=1/(2\pi\sqrt{(LC)})$. The piezoelectricity ratio of the island components and the sea component was such that the island components were approximately 120 times higher in piezoelectricity and the sea component extraction ratio indicated a difference of approximately 44 times in extractability.

Piezoelectric fibers of 10 $\mu$m average diameter were produced from this composite fiber 101 and a sound absorbing material of the same conditions as those of Example II19 was prepared by exactly the same method as that of Example II19.

PRACTICAL EXAMPLE II27(IIPE27)

Besides using 90 mass % of the resin and the piezoelectric body and mixing 7 mass % of carbon powder as the conductive material in the island components, a sea-island type composite fiber body (energy conversion fiber body) 101 with a single fiber diameter of 60 $\mu$m was prepared with the area ratio of a total of 2 islands to the sea component being set to 5:5 and by spinning and drawing under the same conditions as Example 19 described above. The island components la of this composite fiber 1 had an average diameter of 30 $\mu$m, an oblate cross section of a non-circularity ratio of 1.2, a cross-sectional area ratio with respect to the entire composite fiber of 30%, and a ratio of the geometrical moment of inertia with respect to the entire composite fiber of 9%, and the piezoelectric resonance frequency thereof was set to 500 Hz by means of the pseudo-inductance component L across the matrix resin and the carbon powder and using Approximation Equation 1, in other words, $f1=1/(2\pi\sqrt{(LC)})$. The piezoelectricity ratio of the island components and the sea component was such that the island components were approximately 85 times higher in piezoelectricity and the sea component extraction ratio indicated a difference of approximately 44 times in extractability.

Piezoelectric fibers of 30 μm average diameter were produced from this composite fiber 1 and a sound absorbing material of the same conditions as those of Example II19 was prepared by exactly the same method as that of Example II19.

PRACTICAL EXAMPLE II28(IIPE28)

Under the same conditions as Example II19 described above, a sea-island type composite fiber body (energy conversion fiber body) 1 with a single fiber diameter of 60 μm was prepared with the area ratio of a total of 2 islands to the sea component being set to 2:8 and by spinning and drawing. The island components 1*a* of this composite fiber 1 had an average diameter of 20 μm, an oblate cross section of a non-circularity ratio of 3.0, a cross-sectional area ratio with respect to the entire composite fiber of 15%, and a ratio of the geometrical moment of inertia with respect to the entire composite fiber of 2%, and the piezoelectric resonance frequency thereof was set to 500 Hz by means of the pseudo-inductance component L across the matrix resin and the carbon powder and using Approximation Equation 1, in other words, f1=1/(2π√(LC)). The piezoelectricity ratio of the island components and the sea component was such that the island components were approximately 120 times higher in piezoelectricity and the sea component extraction ratio indicated a difference of approximately 50 times in extractability.

Piezoelectric fibers of 20 μm average diameter were produced from this composite fiber 101 and a sound absorbing material of the same conditions as those of Example 19 was prepared by exactly the same method as that of Example II19.

PRACTICAL EXAMPLE II29(IIPE29)

Besides not blending in a conductive material, the same conditions as those of the above-described Example 19 were used to prepare a sea-island type composite fiber body (energy conversion fiber body) 101 with a single fiber diameter of 60 μm with the area ratio of a total of 7 islands to the sea component being set to 7:3 and by spinning and drawing. The island components la of this composite fiber 1 had an average diameter of 20 μm, an oblate cross section of a non-circularity ratio of 1.2, a cross-sectional area ratio with respect to the entire composite fiber of 15%, and a ratio of the geometrical moment of inertia with respect to the entire composite fiber of 2%, and the piezoelectric resonance frequency thereof was set to 50 Hz by means of the pseudo-resistance component R across the matrix resin and the carbon powder and using Approximation Equation 2, in other words, f2=1/(2π√(RC)). The piezoelectricity ratio of the island components and the sea component was such that the island components were approximately 125 times higher in piezoelectricity and the sea component extraction ratio indicated a difference of approximately 50 times in extractability.

Piezoelectric fibers of 20 μm average diameter were produced from this composite fiber 101 and a sound absorbing material of the same conditions as those of Example 19 was prepared by exactly the same method as that of Example II19.

PRACTICAL EXAMPLE II30(IIPE30)

98 mass % of polyester resin and a $TiBaO_3$ piezoelectric body were used and 2 mass % of carbon fibers were mixed as a conductive material in first island components, 93 mass % of polyester resin and a $TiBaO_3$ piezoelectric body were used and 7 mass % of carbon fibers were mixed as a conductive material in second island components, and using these first and second island components and copolymerized polystyrene as the sea component, a sea-island type composite fiber body (energy conversion fiber body) 1 with a single fiber diameter of 60 μm was prepared with the area ratio of a total of 6 islands (3 each of the first and second island components) to the sea component being set to 7:3 and by spinning and drawing. The first island components of this composite fiber 1 had an average diameter of 20 μm, an oblate cross section of a non-circularity ratio of 1.2, a cross-sectional area ratio with respect to the entire composite fiber of 15%, and a ratio of the geometrical moment of inertia with respect to the entire composite fiber of 2%, and the piezoelectric resonance frequency thereof was set to 100 Hz by means of the pseudo-resistance component R across the matrix resin and the carbon powder and using Approximation Equation 2, in other words, f2=1/(2π√(RC)). The piezoelectric resonance frequency of the second island components was set to 300 Hz (the second island components are otherwise the same as the first island components). The piezoelectricity ratio of the island components and the sea component was such that the island components were approximately 100 times higher in piezoelectricity and the sea component extraction ratio indicated a difference of approximately 50 times in extractability.

Piezoelectric fibers of 20 μm average diameter were produced from this composite fiber 101 and a sound absorbing material of the same conditions as those of Example II19 was prepared by exactly the same method as that of Example II19.

PRACTICAL EXAMPLE II31(IIPE31)

98 mass % of polyester resin and a $TiBaO_3$ piezoelectric body were used and 2 mass % of carbon fibers were mixed as a conductive material in first island components, 93 mass % of polyester resin and a $TiBaO_3$ piezoelectric body were used and 7 mass % of carbon fibers were mixed as a conductive material in second island components, 90 mass % of polyester resin and a $TiBaO_3$ piezoelectric body were used and 10 mass % of carbon fibers were mixed as a conductive material in third island components, and using these first, second, and third island components and copolymerized polystyrene as the sea component, a sea-island type composite fiber body (energy conversion fiber body) 2 with a single fiber diameter of 60 μm was prepared with the area ratio of a total of 6 islands (2 each of the first, second, and third island components) to the sea component being set to 7:3 and by spinning and drawing. The first island components of this composite fiber 101 had an average diameter of 20 μm, an oblate cross section of a non-circularity ratio of 1.2, a cross-sectional area ratio with respect to the entire composite fiber of 15%, and a ratio of the geometrical moment of inertia with respect to the entire composite fiber of 2%, and the piezoelectric resonance frequency thereof was set to 100 Hz by means of the pseudo-resistance component R across the matrix resin and the carbon powder and using Approximation Equation 2, in other words, f2=1/(2π√(RC)). The piezoelectric resonance frequency of the second island components was set to 300 Hz and the piezoelectric resonance frequency of the third island components was set to 500 Hz (the second and third island components are otherwise the same as the first island components). The piezoelectricity ratio of the island components and the sea component was such that the island components were approximately 100 times higher in piezoelectricity and the sea component extraction ratio indicated a difference of approximately 50 times in extractability.

Piezoelectric fibers of 20 μm average diameter were produced from this composite fiber 1 and a sound absorbing material of the same conditions as those of Example II19 was prepared by exactly the same method as that of Example II19.

PRACTICAL EXAMPLE II32(IIPE32)

10 mass % of piezoelectric fibers obtained from the composite fiber produced in the above-described Example 19, 70 mass % of 14 μm (2 dernier) solid polyester fibers, and 20 mass % of 14 μm (2 dernier) polyester binder fibers with a softening point of approximately 110° C. were mixed, and a sound absorbing material, with a thickness area density of 1.0 $kg/m^2$ and a thickness of 30 mm, was prepared by the card layering method.

PRACTICAL EXAMPLE II33(IIPE33)

From 100 mass % of piezoelectric fibers obtained from the composite fiber produced in the above-described Example 19, a sound absorbing material, with a thickness area density of 1.0 $kg/m^2$ and a thickness of 30 mm, was prepared by the card layering method and the needle punching method.

PRACTICAL EXAMPLE II34(IIPE34)

Besides setting the non-circularity ratio of the island components of the composite fiber produced in the above-described Example II19 to 1.0, a sound absorbing material was prepared in the exact same manner as in Example 1119.

PRACTICAL EXAMPLE II35

Besides making the island components from polyvinylidene fluoride (PVDF) resin, a sea-island type composite fiber body (energy conversion fiber body) 101 with a single fiber diameter of 60 μm was prepared under the same conditions as Example II19 described above. The island components 1*a* of this composite fiber 101 had an average diameter of 20 μm, a circular cross section of a non-circularity ratio of 1.0, a cross-sectional area ratio with respect to the entire composite fiber of 15%, and a ratio of the geometrical moment of inertia with respect to the entire composite fiber of 2%, and the piezoelectric resonance frequency thereof was set to 300 Hz by means of the pseudo-resistance component R across the matrix resin and the carbon powder and using Approximation Equation 2, in other words, $f2=1/(2\pi\sqrt{(RC)})$. The piezoelectricity ratio of the island components and the sea component was such that the island components were approximately 60 times higher in piezoelectricity and the sea component extraction ratio indicated a difference of approximately 60 times in extractability.

Fibers of 20 μm average diameter were produced from this composite fiber 101 by the same method as that of Example II19 and fibers were prepared with which the proportion of the β crystallites in the PVDF crystal was 20%. The proportion of the β crystallites was calculated from the respective wide-angle X-ray scattering intensities of the a crystallites and β crystallites in accordance with the equation shown below. Using these fibers, a sound absorbing material was prepared under the same conditions and by the same method as those of Example II19.

Proportion of β crystallites=Scattering intensity of β crystallites/(Scattering intensity of α crystallites+Scattering intensity of β crystallites)

COMPARATIVE EXAMPLE II2 (IICE2)

80 mass % of 14 μm (2 dernier) polyester fibers and 20 mass % of 14 μm (2 dernier) polyester binder fibers with a softening point of approximately 110° C. were mixed, and a sound absorbing material, with a thickness area density of 1.0 $kg/m^2$ and a thickness of 30 mm, was prepared by the card layering method.

Evaluation Test II2 (IIET2)

Figure 37:
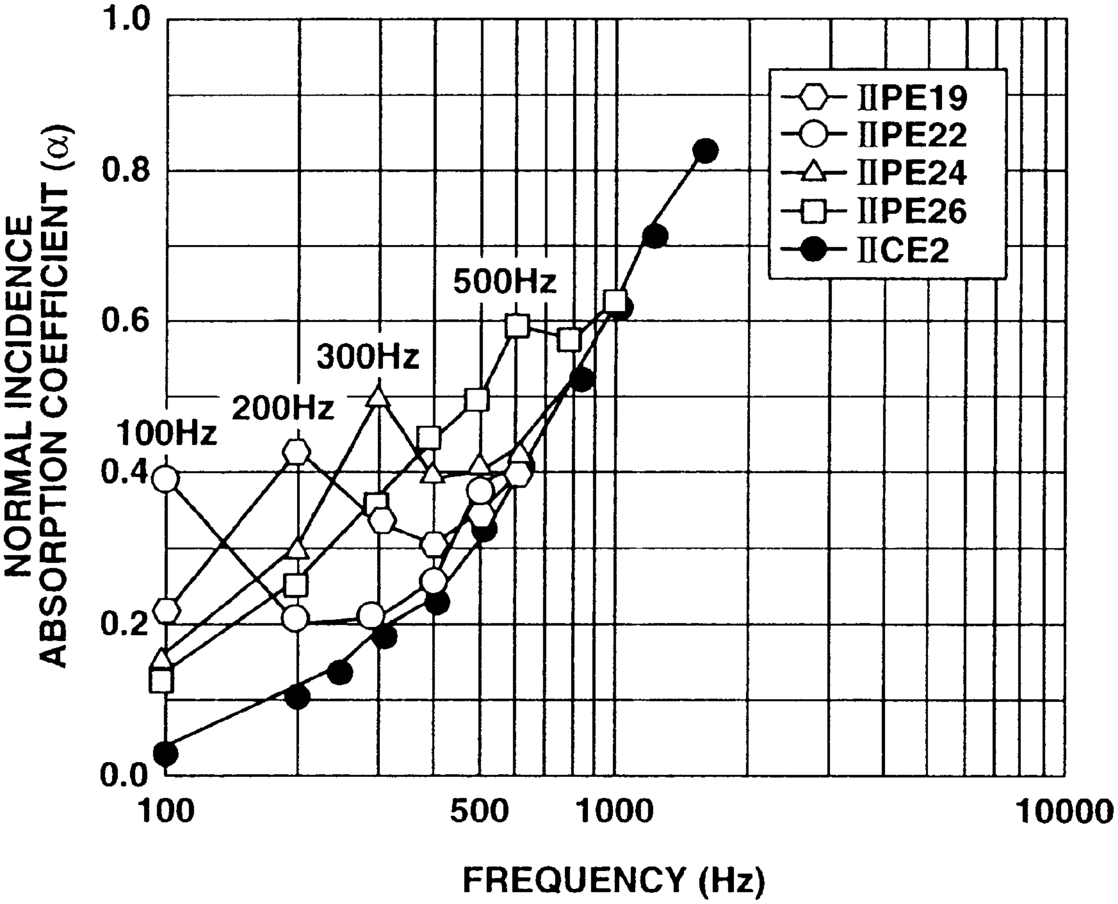
FIG. 37 is a graph, which shows the normal incidence absorption coefficients according to frequency of sound absorbing materials comprised of composite-oxide-mixed type composite fiber bodies by this invention.

For the sound absorbing materials obtained in the above-described Examples II19 to II35 and Comparative Example II2, normal incidence absorption coefficient measurements were made in the same manner as described above and experiments concerning the piezoelectric property and sea component elimination property were conducted. The results are shown in Table IIT2. The relationships between frequency and normal incidence absorption coefficient are shown for representative sound absorbing materials in FIG. 37.

With regard to the piezoelectric property, the quantity of static electricity that is generated in a test sample surface when the sample is drawn by 1% was compared, and the piezoelectricity ratios shown in Table IIT2 are simply comparison ratios of these static electricity quantities. With regard to the sea component elimination property, the elution rates for cases where test samples were immersed in a weakly basic solution of 3% concentration (100° C.) are simply compared.

TABLE IIT2

| Examples | Diameter of composite fiber (μm) | Cross-sectional area ratio of islands to sea Island:Sea | Number of islands | Average diameter of island components (μm) | Geometrical moment of inertia ratio (%) | Cross-sectional area ratio of island components (%) | Non-circularity ratio of island components | Island components Resin - Piezoelectric body (mass %) |
|---|---|---|---|---|---|---|---|---|
| IIPE19 | 60 | 7:3 | 6 | 20 | 2 | 15 | 1.2 | 95 |
| IIPE20 | 100 | 7:3 | 8 | 30 | 1 | 10 | 1.2 | 95 |
| IIPE21 | 10 | 7:3 | 18 | 2 | 0.2 | 4 | 1.2 | 95 |
| IIPE22 | 60 | 9:1 | 32 | 10 | 0.1 or less | 3 | 1.2 | 98 |
| IIPE23 | 60 | 1:9 | 4 | 10 | 0.1 or less | 3 | 1.2 | 98 |
| IIPE24 | 100 | 6:4 | 3 | 50 | 7 | 25 | 1.8 | 93 |
| IIPE25 | 20 | 8:2 | 300 | 1 | 0.1 or less | 0.3 | 1.8 | 93 |
| IIPE26 | 20 | 4:6 | 2 | 10 | 10 | 25 | 1.5 | 90 |
| IIPE27 | 60 | 5:5 | 2 | 33 | 9 | 30 | 1.2 | 90 |
| IIPE28 | 60 | 2:8 | 2 | 20 | 2 | 15 | 3.0 | 95 |
| IIPE29 | 60 | 7:3 | 7 | 20 | 2 | 15 | 1.2 | 100 |
| IIPE30 | 60 | 7:3 | 3 + 3 | 20 | 2 | 15 | 1.2 | 93, 98 |
| IIPE31 | 60 | 7:3 | 2 + 2 + 2 | 20 | 2 | 15 | 1.2 | 90, 93, 98 |
| IIPE32 | 60 | 7:3 | 6 | 20 | 2 | 15 | 1.2 | 95 |
| IIPE33 | 60 | 7:3 | 6 | 20 | 2 | 15 | 1.2 | 95 |
| IIPE34 | 60 | 7:3 | 6 | 20 | 2 | 15 | 1.0 | 95 |
| IIPE35 | 60 | 7:3 | 6 | 20 | 2 | 15 | 1.0 | 100 |
| IICE2 | — | — | — | — | — | — | — | — |

TABLE IIT2-continued

| Examples | Third component of the island components | Blending amount of piezoelectric fibers (mass %) | Piezoelectricity ratio (times) | Sea component elimination ratio (times) | Sound absorbing material binder (%) | Set frequency Hz (equation) | Sound absorbtion coefficient 50 Hz | 100 Hz | 200 Hz | 300 Hz | 500 Hz |
|---|---|---|---|---|---|---|---|---|---|---|---|
| IIPE19 | CF powder | 80 | 100 | 50 | 20 | 200 (EQ1) | 0.05 | 0.23 | 0.45 | 0.35 | 0.40 |
| IIPE20 | CF powder | 80 | 90 | 50 | 20 | 200 (EQ1) | 0.04 | 0.21 | 0.40 | 0.32 | 0.38 |
| IIPE21 | CF powder | 80 | 150 | 50 | 20 | 200 (EQ1) | 0.06 | 0.25 | 0.48 | 0.38 | 0.42 |
| IIPE22 | CF fiber | 80 | 120 | 80 | 20 | 100 (EQ2) | 0.18 | 0.40 | 0.22 | 0.22 | 0.38 |
| IIPE23 | CF fiber | 80 | 120 | 40 | 20 | 100 (EQ2) | 0.10 | 0.25 | 0.15 | 0.20 | 0.38 |
| IIPE24 | CF powder | 80 | 50 | 45 | 20 | 300 (EQ1) | 0.08 | 0.15 | 0.30 | 0.50 | 0.42 |
| IIPE25 | CF powder | 80 | 200 | 60 | 20 | 300 (EQ1) | 0.08 | 0.16 | 0.32 | 0.55 | 0.43 |
| IIPE26 | CF powder | 80 | 120 | 44 | 20 | 500 (EQ1) | 0.05 | 0.15 | 0.25 | 0.35 | 0.60 |
| IIPE27 | CF powder | 80 | 85 | 44 | 20 | 500 (EQ1) | 0.05 | 0.15 | 0.24 | 0.34 | 0.57 |
| IIPE28 | CF powder | 80 | 120 | 50 | 20 | 200 (EQ1) | 0.05 | 0.24 | 0.46 | 0.37 | 0.41 |
| IIPE29 | — | 80 | 125 | 50 | 20 | 50 (EQ2) | 0.30 | 0.20 | 0.15 | 0.20 | 0.40 |
| IIPE30 | CF fiber | 80 | Average 100 | 50 | 20 | 100, 300 (EQ2) | 0.10 | 0.35 | 0.30 | 0.45 | 0.42 |
| IIPE31 | CF fiber | 80 | Average 100 | 50 | 20 | 50, 100, 300 (EQ2) | 0.10 | 0.35 | 0.32 | 0.46 | 0.55 |
| IIPE32 | CF powder | 10 | 100 | 50 | 20 | 200 (EQ1) | 0.05 | 0.07 | 0.20 | 0.35 | 0.40 |
| IIPE33 | CF powder | 100 | 100 | 50 | — | 200 (EQ1) | 0.07 | 0.25 | 0.50 | 0.38 | 0.42 |
| IIPE34 | CF powder | 80 | 100 | 50 | 20 | 200 (EQ1) | 0.05 | 0.22 | 0.43 | 0.34 | 0.38 |
| IIPE35 | — | 100 | 60 | 60 | — | 300 (EQ2) | 0.08 | 0.14 | 0.29 | 0.48 | 0.41 |
| IICE2 | — | — | — | — | — | — | 0.03 | 0.04 | 0.10 | 0.19 | 0.35 |

PRACTICAL EXAMPLE II36(IIPE36)

Figure 38A:
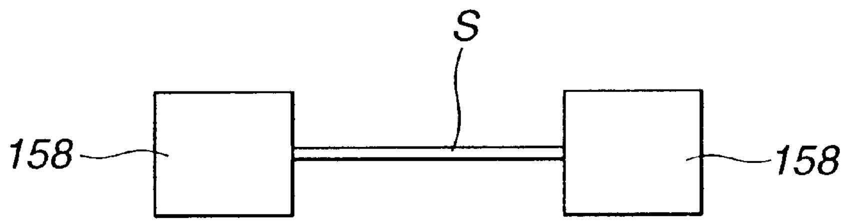
FIGS. 38A and 38B are plan view and side view, respectively, which show the method of fixing the sample in a dynamic viscoelasticity test.
Figure 38B:
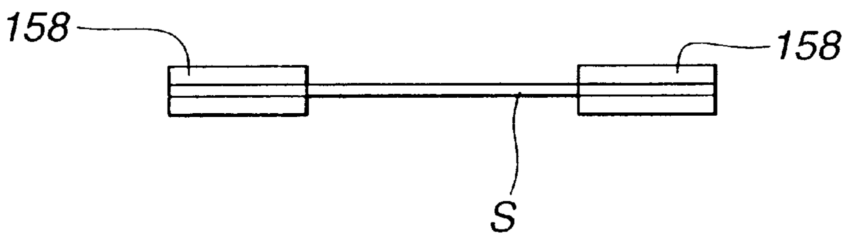

A resin was prepared by mixing 100 volume parts of polypropylene (PP:SP=$1.64\times10^4(J/m^3)^{0.5}$) with 100 volume parts of dioctyl sebacate (DOS:SP=$1.78\times10^4(J/m^3)^{0.5}$), and using this resin as core part 102_a_ as shown in FIG. 26B, a core-sheath type binder fiber (energy conversion fiber body) 102, with an outer diameter of 40 μm and having a P(ET/EI) copolymer (copolymerization ratio=67/33) as the sheath part 102_b_, was prepared and the tanδ was measured by the dynamic viscoelasticity test. The result is shown in Table IIT3. For the dynamic viscoelasticity test, DMS 6100, made by SII Co. (Seiko Instruments Co., Ltd.) was used as the device and the dissipation factor (tanδ) of a fiber sample S of 40 mm length, which was fixed at 10 mm portions at both ends by fixing devices 58 as shown in FIGS. 38A and 38B, were measured for a distortion of 10 μm at 25° C. at frequencies of 10, 50, and 100 Hz in compliance with JIS K7198.

As a result, as shown in Table IIT3, it was found that the tanδ was low in comparison to those of the fibers of Examples 38 to 49 described below, and this is considered to have been caused by the low SP value of DOS.

PRACTICAL EXAMPLE II37(IIPE37)

Besides using a benzothiazyl sulfenamide (SP=$2.74\times10^4(J/m^3)^{0.5}$) in place of the dioctyl sebacate of the above-described Example II36, a core-sheath type binder fiber (energy conversion fiber body) 102 with an outer diameter of 40 μm was prepared under exactly the same conditions as those of Example II36 and the tanδ was measured by the dynamic viscoelasticity test.

As a result and as shown likewise in Table IIT3, the fiber was not necessarily found to be excellent over the fibers of Examples II38 to II49.

PRACTICAL EXAMPLE II38(IIPE38)

A resin was prepared by mixing 100 volume parts of polypropylene (PP:SP=$1.64\times10^4(J/m^3)^{0.5}$) with 100 volume parts of a benzothiazole (SP=$2.05\times10^4(J/m^3)^{0.5}$), and using this resin as core part 102_a_, a core-sheath type binder fiber (energy conversion fiber body) 102, with an outer diameter of 40 μm and having a P(ET/EI) copolymer (copolymerization ratio=67/33) as the sheath part 102_b_, was prepared and the tanδ was measured by the dynamic viscoelasticity test.

As a result and as shown likewise in Table IIT3, a higher tanδ was measured in comparison to the fiber of Example II36. This is considered to be due to the high SP value of the benzothiazole.

PRACTICAL EXAMPLE II39(IIPE39)

Besides using the resin, which was used in the core component in Example II38, as the sheath part 102_b_ as shown in FIG. 26A and using polyethylene terephthalate (PET) in the core part to form the core part 102_a_, a core-sheath type binder fiber (energy conversion fiber body) 105, with an outer diameter of 40 μm, was prepared under exactly the same conditions as those of Example II38 and the tanδ was measured by the dynamic viscoelasticity test.

As a result and as shown in Table IIT3, a high tanδ was measured as with the fiber of Example II38.

PRACTICAL EXAMPLE II40(IIPE40)

Besides using a resin, prepared by mixing a barium titanate piezoelectric body ($TiBaO_3$) of an amount equivalent to 50 volume parts per 100 volume parts of resin in the resin used in the core component of the above-described Example II38, as core part 102_a_, a core-sheath type binder fiber (energy conversion fiber body) 102, with an outer diameter of 40 μm, was prepared under exactly the same conditions as those of Example II38 and the tanδ was measured by the dynamic viscoelasticity test.

As a result and as shown in Table IIT3, a higher tan δ was measured not only in comparison to the fiber of Example II36 but to the fiber of Example II38 as well. This is considered to have been due to the mixing in of $TiBaO_3$ in core part 102_a_.

PRACTICAL EXAMPLE II41(IIPE41)

Besides using a resin, prepared by mixing a barium titanate piezoelectric body ($TiBaO_3$) of an amount equivalent to 50 volume parts per 100 volume parts of resin and carbon fibers of an amount equivalent to 20 volume parts per 100 volume parts of resin in the resin used in the core component of the above-described Example II38, as core part 102*a*, a core-sheath type binder fiber (energy conversion fiber body) 102, with an outer diameter of 40 $\mu$m, was prepared under exactly the same conditions as those of Example II38 and the tanδ was measured by the dynamic viscoelasticity test.

As a result and as shown in Table IIT3, a higher tanδ was measured not only in comparison to the fiber of Example II36 but to the fiber of Example II40 as well. This is considered to have been due to the increasing of the efficiency by the further mixing in of carbon fibers in core part 102*a*.

PRACTICAL EXAMPLE II42(IIPE42)

Besides using a resin, prepared by mixing a barium titanate piezoelectric body ($TiBaO_3$) of an amount equivalent to 50 volume parts per 100 volume parts of resin and carbon fibers of an amount equivalent to 10 volume parts per 100 volume parts of resin in the resin used in the core component of the above-described Example II38, as core part 102*a*, a core-sheath type binder fiber (energy conversion fiber body) 102, with an outer diameter of 40 $\mu$m, was prepared under exactly the same conditions as those of Example II38 and the tanδ was measured by the dynamic viscoelasticity test.

As a result and as shown in Table IIT3, a higher tan δ was measured not only in comparison to the fiber of Example II36 but to the fiber of Example II40 as well. Also a comparison with the result of Example II41 shows that the frequency at which the tanδ peak appears can be varied.

PRACTICAL EXAMPLE II43(IIPE43)

Besides changing the benzothiazole used in the above-described Example 38 to a benzothiazyl sulfenamide (SP=$2.30\times10^4(J/m^3)^{0.5}$), a core-sheath type binder fiber (energy conversion fiber body) 102 with an outer diameter of 40 $\mu$m was prepared under exactly the same conditions as those of Example II38 and the tanδ was measured by the dynamic viscoelasticity test. As a result, a higher tanδ was measured in comparison to the above-described Example II36 as shown in Table IIT3.

PRACTICAL EXAMPLE II44(IIPE44)

Besides changing the PP used in the above-described Example II38 to PET (SP=$2.19\times10^4(J/m^3)^{0.5}$) and the benzothiazole to a benzothiazyl sulfenamide (SP=$2.30\times10^4(J/m^3)^{0.5}$), a core-sheath type binder fiber (energy conversion fiber body) 102 with an outer diameter of 40 $\mu$m was prepared under exactly the same conditions as those of Example II38 and the tanδ was measured by the dynamic viscoelasticity test. As a result, a higher tanδ was measured in comparison to the above-described Example II36 as shown in Table IIT3.

PRACTICAL EXAMPLE II45(IIPE45)

Besides changing the PP used in the above-described Example II38 to polyamide 6 (PA6:SP=$2.78\times10^4(J/m^3)^{0.5}$) and the benzothiazole to a benzothiazyl sulfenamide (SP=$2.30\times10^4(J/m^3)^{0.5}$), a core-sheath type binder fiber (energy conversion fiber body) 102 with an outer diameter of 40 $\mu$m was prepared under exactly the same conditions as those of Example II38 and the tanδ was measured by the dynamic viscoelasticity test. As a result, a higher tanδ was measured in comparison to the above-described Example II36 as shown in Table IIT3.

PRACTICAL EXAMPLE II46(IIPE46)

Besides changing the PP used in the above-described Example II38 to polyamide 6 (PA6:SP=$2.78\times10^4(J/m^3)^{0.5}$) and the benzothiazole to a benzodiazole (SP=$2.14\times10^4(J/m^3)^{0.5}$), a core-sheath type binder fiber (energy conversion fiber body) 102 with an outer diameter of 40 $\mu$m was prepared under exactly the same conditions as those of Example II38 and the tanδ was measured by the dynamic viscoelasticity test. As a result, a higher tanδ was measured in comparison to the above-described Example II36 as shown in Table IIT3.

PRACTICAL EXAMPLE II47(IIPE47)

Besides changing the PP used in the above-described Example II38 to polyamide 6 (PA6:SP=$2.78\times10^4(J/m^3)^{0.5}$) and the benzothiazole to a benzotriazole (SP=$2.65\times10^4(J/m^3)^{0.5}$), a core-sheath type binder fiber (energy conversion fiber body) 102 with an outer diameter of 40 $\mu$m was prepared under exactly the same conditions as those of Example II38 and the tanδ was measured by the dynamic viscoelasticity test. As a result, a higher tanδ was measured in comparison to the above-described Example II36 as shown in Table IIT3.

PRACTICAL EXAMPLE II48(IIPE48)

Besides changing the PP used in the above-described Example II38 to polyamide 6 (PA6:SP=$2.78\times10^4(J/m^3)^{0.5}$) and the benzothiazole to a benzothiazyl sulfenamide (SP=$2.30\times10^4(J/m^3)^{0.5}$), a core-sheath type binder fiber (energy conversion fiber body) 102 with an outer diameter of 40 $\mu$m was prepared under exactly the same conditions as those of Example II38 and the tanδ was measured by the dynamic viscoelasticity test. As a result, a higher tanδ was measured in comparison to the above-described Example II36 as shown in Table IIT3.

PRACTICAL EXAMPLE II49(IIPE49)

Besides changing the PP used in the above-described Example II38 to polyamide 6 (PA6:SP=$2.78\times10^4(J/m^3)^{0.5}$) and the benzothiazole to a mercaptobenzothiazyl (SP=$2.59\times10^4(J/m^3)^{0.5}$), a core-sheath type binder fiber (energy conversion fiber body) 102 with an outer diameter of 40 $\mu$m was prepared under exactly the same conditions as those of Example II38 and the tanδ was measured by the dynamic viscoelasticity test. As a result, a higher tanδ was measured in comparison to the above-described Example II36 as shown in Table IIT3.

PRACTICAL EXAMPLE II50(IIPE50)

Besides changing the PP used in the above-described Example II38 to high-density polyethylene (HDPE:SP=$1.58\times10^4(J/m^3)^{0.5}$) and the benzothiazole to a benzothiazyl sulfenamide (SP=$2.30\times10^4(J/m^3)^{0.5}$), a core-sheath type binder fiber (energy conversion fiber body) 102 with an outer diameter of 40 $\mu$m was prepared under exactly the same conditions as those of Example II38 and the tanδ was measured by the dynamic viscoelasticity test. As a result, a lower property was measured in comparison to the above-described Examples II38 to II49 as shown in Table IIT3.

TABLE IIT3

| Classification | | Organic-material-mixed resin: Resin: Resin type | Resin: Solubility parameter SP $(J/m^3)^{0.5}$ | Polar organic agent: Organic material type | Polar organic agent: Solubility parameter SP $(J/m^3)^{0.5}$ | Polar organic agent: Volume mixing ratio (per 100 volume parts of resin) | Piezoelectric material: Piezo-electric material type | Piezoelectric material: Volume mixing ratio (per 100 volume parts of resin) | Conductive material: Con-ductive material type | Conductive material: Volume mixing ratio (per 100 volume parts of resin) | Results of dynamic viscoelasticity test tan δ (25° C.): 10 Hz | 50 Hz | 100 Hz |
|---|---|---|---|---|---|---|---|---|---|---|---|---|---|
| Example II | 36 | PP | $1.60 \times 10^4$ | DOS | $1.78 \times 10^4$ | 100 | | | | | 0.040 | 0.052 | 0.048 |
| | 37 | PP | $1.60 \times 10^4$ | Benzothiazyl sulfenamide | $2.74 \times 10^4$ | 100 | | | | | 0.082 | 0.086 | 0.090 |
| | 38 | PP (core) | $1.60 \times 10^4$ | Benzothiazole | $2.05 \times 10^4$ | 100 | | | | | 0.082 | 0.078 | 0.094 |
| | 39 | PP (sheath) | $1.60 \times 10^4$ | Benzothiazole | $2.05 \times 10^4$ | 100 | | | | | 0.090 | 0.088 | 0.088 |
| | 40 | PP | $1.60 \times 10^4$ | Benzothiazole | $2.05 \times 10^4$ | 100 | $TiBaO_3$ | 50 | | | 0.102 | 0.106 | 0.110 |
| | 41 | PP | $1.60 \times 10^4$ | Benzothiazole | $2.05 \times 10^4$ | 100 | $TiBaO_3$ | 50 | CF | 20 | 0.108 | 0.126 | 0.124 |
| | 42 | PP | $1.60 \times 10^4$ | Benzothiazole | $2.05 \times 10^4$ | 100 | $TiBaO_3$ | 50 | CF | 10 | 0.100 | 0.126 | 0.136 |
| | 43 | PP | $1.60 \times 10^4$ | Benzothiazyl sulfenamide | $2.30 \times 10^4$ | 100 | | | | | 0.096 | 0.098 | 0.098 |
| | 44 | PET | $2.19 \times 10^4$ | Benzothiazyl sulfenamide | $2.30 \times 10^4$ | 100 | | | | | 0.080 | 0.090 | 0.090 |
| | 45 | PA6 | $2.78 \times 10^4$ | Benzothiazyl sulfenamide | $2.30 \times 10^4$ | 100 | | | | | 0.076 | 0.090 | 0.088 |
| | 46 | PA6 | $2.78 \times 10^4$ | Benzodiazole | $2.14 \times 10^4$ | 100 | | | | | 0.084 | 0.084 | 0.078 |
| | 47 | PA6 | $2.78 \times 10^4$ | Benzotriazole | $2.65 \times 10^4$ | 100 | | | | | 0.092 | 0.096 | 0.094 |
| | 48 | PA6 | $2.78 \times 10^4$ | Benzothiazyl sulfenamide | $2.30 \times 10^4$ | 100 | | | | | 0.086 | 0.088 | 0.092 |
| | 49 | PA6 | $2.78 \times 10^4$ | Mercapto-benzothiazyl | $2.59 \times 10^4$ | 100 | | | | | 0.094 | 0.090 | 0.088 |
| | 50 | HDPE | $1.58 \times 10^4$ | Benzothiazyl sulfenamide | $2.30 \times 10^4$ | 100 | | | | | 0.076 | 0.076 | 0.078 |

PRACTICAL EXAMPLE II51(IIPE51)

Figure 39:
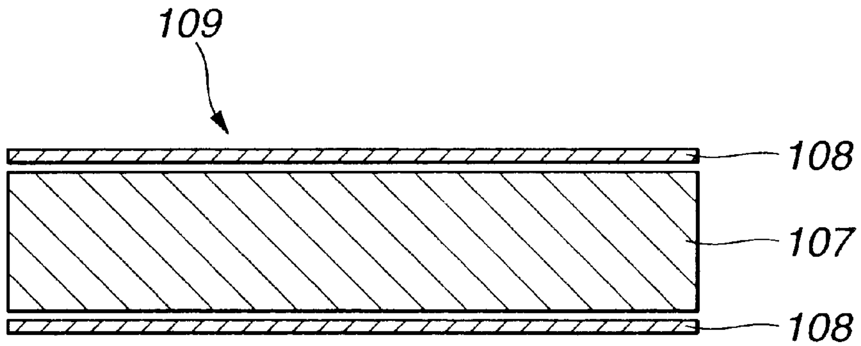
FIG. 39 is sectional view, which shows the form of a sound insulating structure by this invention.

Short polyethylene terephthalate (PET) fibers (H38F made by Unitika Ltd.; fiber diameter=36 μm) were mixed with the binder fibers (energy conversion fiber body) 102, prepared in the above-described Example II44, at a mass ratio of 70/30 and heat-formed to prepare an non-woven fabric (sound absorbing material) 107, which was then sandwiched between metal plates (plate materials) as shown in FIG. 39 to form a sound insulating structure 109, and the acoustic transmission loss of this structure was measured by the method described below.

COMPARATIVE EXAMPLE II3 (IICE3)

The short polyethylene terephthalate (PET) fibers used in the above-described Example II51 were mixed with polyester binder fibers (4080 made by Unitika Ltd.; fiber diameter=39 μm) at a mass ratio of 70/30 and heat-formed to prepare an non-woven fabric, which was then sandwiched likewise between metal plates 108 to form a sound insulating structure, and the acoustic transmission loss of this structure was measured by the same method.

Evaluation Test II3

The sound transmission loss of the sound insulating structures obtained by the practical example II51 and the comparative example II3 were measured by using apparatus as shown in FIG. 7 for measuring acoustic transmission loss, to evaluate the sound insulating performance of the practical example. The transmission loss TL (dB) is given by the following equation as the difference between the sound pressure values measured by the measurement devices 12*a* and 12*b*, that is, the difference between the sound pressure value I (dB) on the sound source (speaker) side (12*a*) and the sound pressure O (dB) on the other side with no sound source.

$$TL(dB)=I(dB)-O(dB)$$

Figure 40:
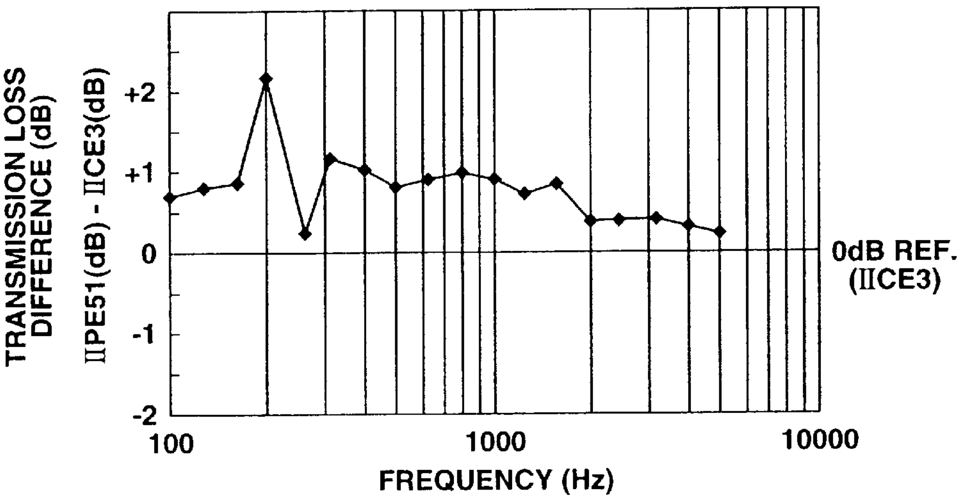
FIG. 40 is a graph, which shows the transmission loss according to frequency of sound insulating structures obtained in Example II51 and Comparative Example II3.

In FIG. 40, the measurement results of the transmission loss TL of the sound insulating structure 108 of Example II51, as based on the results of Comparative Example II3, in other words, the values, obtained by subtracting the transmission loss TL of the insulating structure of Comparative Example II3 from the transmission loss TL of the sound insulating structure 109 of Example II51, are plotted for the respective frequencies, and this Figure shows that the transmission loss by the insulating structure 109 of Example II51 surpasses the performance of Comparative Example II3, which does not contain a piezoelectric material, at all frequencies.

PRACTICAL EXAMPLE II52(IIPE52)

Figure 30A:
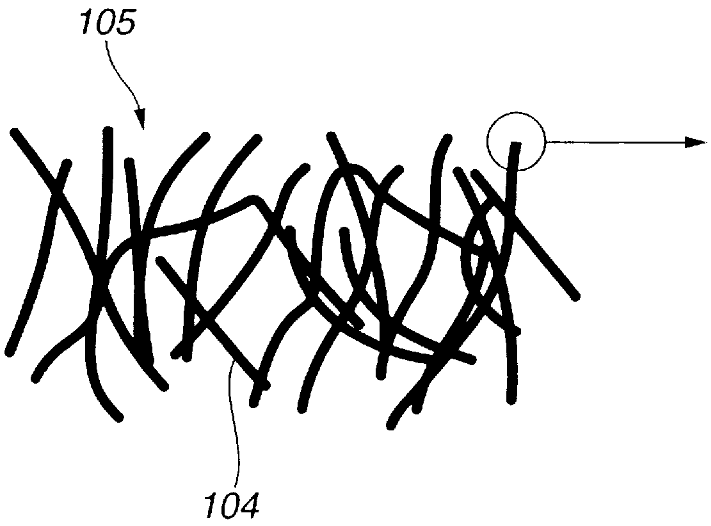
FIGS. 30A and 30B are schematic views, which shows yet another example of the form of a core-sheath type composite fiber body and a sound absorbing material that is comprised of a non-woven fabric of this core-sheath type composite fiber body.
Figure 30B:
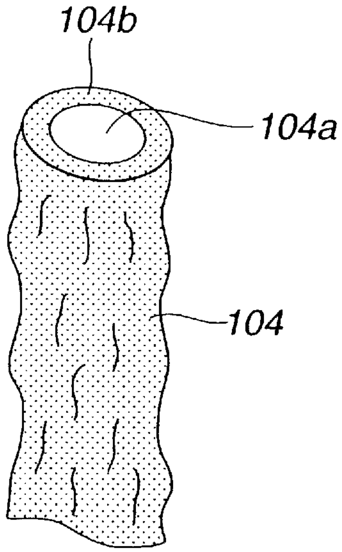

$TiBaO_3$ was used as the piezoelectric material and a water-soluble adhesive agent, with which the length of the largest part of the piezoelectric material with respect to the core component will be 2.5% and with which the piezoelectric material and the polyester, which is the main component, were mixed at a mass ratio of 4:1, was coated onto a non-woven fabric of PET fibers of circular cross-sectional shape that served as the core fibers to thereby prepare a sound absorbing material 105, such as that shown in FIGS. 30A and 30B, which was comprised of a core-sheath type composite fiber body 104 with a core-sheath percentage of 50%.

PRACTICAL EXAMPLE II53(IIPE53)

Besides adding carbon fibers with a ratio of the length of the largest part of 10% as a conductive material in sheath part 104*b*, a sound absorbing material 105 comprised of a core-sheath type composite fiber body 104 was prepared in the same manner as in the above-described Example II52.

PRACTICAL EXAMPLE II54(IIPE54)

Besides adding carbon powder with a ratio of the length of the largest part of 2.5% as a conductive material in sheath part 104*b*, a sound absorbing material 105 comprised of a core-sheath type composite fiber body 104 was prepared in the same manner as in the above-described Example II52.

PRACTICAL EXAMPLE II55(IIPE55)

Besides setting the ratio of the length of the largest part of the piezoelectric material of sheath part 104*b* to 25%, a sound absorbing material 105 comprised of a core-sheath type composite fiber body 104 was prepared in the same manner as in the above-described Example II53.

PRACTICAL EXAMPLE II56(IIPE56)

Besides setting the ratio of the length of the largest part of the piezoelectric material of sheath part 104*b* to 0.8%, a sound absorbing material 105 comprised of a core-sheath type composite fiber body 104 was prepared in the same manner as in the above-described Example II53.

PRACTICAL EXAMPLE II57(IIPE57)

Besides setting the ratio of the length of the largest part of the carbon fibers of sheath part 104*b* to 25%, a sound absorbing material 105 comprised of a core-sheath type composite fiber body 104 was prepared in the same manner as in the above-described Example II53.

PRACTICAL EXAMPLE II58(IIPE58)

Besides the setting ratio of the length of the largest part of the carbon fibers of sheath part 104*b* to 0.8%, a sound absorbing material 105 comprised of a core-sheath type composite fiber body 104 was prepared in the same manner as in the above-described Example II53.

PRACTICAL EXAMPLE II59(IIPE59)

Besides coating, as sheath part 104*b*, a water-soluble adhesive agent, with which mixing was performed so that the mass ratio of the total mass of the piezoelectric material and conductive material to the mass of polyester, which is the main component, will be 10:1, a sound absorbing material 105 comprised of a core-sheath type composite fiber body 104 was prepared in the same manner as in the above-described Example II53.

PRACTICAL EXAMPLE II60(IIPE60)

Besides coating, as sheath part 104*b*, a water-soluble adhesive agent, with which mixing was performed so that the mass ratio of the total mass of the piezoelectric material and conductive material to the mass of polyester, which is the main component, will be 1:1, a sound absorbing material 105 comprised of a core-sheath type composite fiber body 104 was prepared in the same manner as in the above-described Example II53.

PRACTICAL EXAMPLE II61(IIPE61)

Besides using PET fibers of circular cross section that were cut to 51 mm as the core fibers and thereafter coating the adhesive agent to prepare a core-sheath type composite fiber body 104 with a core-sheath percentage of 50% and making the fiber body into a non-woven fabric, a sound absorbing material 105 was prepared in the same manner as in the above-described Example II53.

PRACTICAL EXAMPLE II62(IIPE62)

Besides melt spinning PET fibers of circular cross section as the core fibers and thereafter coating the adhesive agent continuously to prepare a core-sheath type composite fiber body 104 with a core-sheath percentage of 50% and making the fiber body into a non-woven fabric, a sound absorbing material 105 was prepared in the same manner as in the above-described Example II53.

PRACTICAL EXAMPLE II63(IIPE63)

Besides coating the adhesive agent continuously onto a non-woven fabric of PET fibers of Y-shaped cross section, which were used as the core fibers, a sound absorbing material 105 comprised of a core-sheath type composite fiber body 104 was prepared in the same manner as in the above-described Example II53.

PRACTICAL EXAMPLE II64(IIPE64)

Besides setting the core-sheath percentage to 40%, a sound absorbing material 105 comprised of a core-sheath type composite fiber body 104 was prepared in the same manner as in the above-described Example II53.

PRACTICAL EXAMPLE II65(IIPE65)

Besides setting the core-sheath percentage to 98%, a sound absorbing material 105 comprised of a core-sheath type composite fiber body 104 was prepared in the same manner as in the above-described Example II53.

PRACTICAL EXAMPLE II66(IIPE66)

Besides using PZT as the piezoelectric material in sheath part 4*b*, a sound absorbing material 105 comprised of a core-sheath type composite fiber body 104 was prepared in the same manner as in the above-described Example II53.

PRACTICAL EXAMPLE II67(IIPE67)

Besides using PVDT as the piezoelectric material in sheath part 4*b*, a sound absorbing material 105 comprised of a core-sheath type composite fiber body 104 was prepared in the same manner as in the above-described Example II53.

PRACTICAL EXAMPLE II68(IIPE68)

Besides using P(VDF/TrFE) as the piezoelectric material in sheath part 104*b*, a sound absorbing material 5 comprised of a core-sheath type composite fiber body 104 was prepared in the same manner as in the above-described Example II53.

PRACTICAL EXAMPLE II69(IIPE69)

Besides setting the core-sheath percentage to 30%, a sound absorbing material 105 comprised of a core-sheath type composite fiber body 104 was prepared in the same manner as in the above-described Example II53.

PRACTICAL EXAMPLE II70(IIPE70)

Besides coating a water-soluble adhesive agent, with which mixing was performed so that the mass ratio of the mass of the piezoelectric material to the mass of the polyester, which is the main component, will be 0.5:1, onto a non-woven fabric of PET fibers of circular cross-sectional shape that served as the core fibers, a sound absorbing material 105 comprised of a core-sheath type composite fiber body 104 was prepared in the same manner as in the above-described Example II53.

COMPARATIVE EXAMPLE II4(IICE4)

A non-woven fabric of PET fibers of circular cross-sectional shape was prepared as the core fibers and a single-component sound absorbing material of a core-sheath percentage of 100% was prepared.

COMPARATIVE EXAMPLE II5(IICE5)

A water-soluble adhesive agent, having polyester as the main component and not containing any piezoelectric material or conductive material, was prepared as the sheath part, this adhesive agent was coated onto a non-woven fabric of PET fibers of circular cross-sectional shape that was prepared as the core fibers to prepare a non-woven fabric with a core-sheath percentage of 50%, and a sound absorbing material comprised of core-sheath type fibers with a core-sheath percentage of 100% was prepared.

COMPARATIVE EXAMPLE II6(IICE6)

Besides using $ZrO_2$, which is a material that does not exhibit a piezoelectric effect, in place of the piezoelectric material, a sound absorbing material comprised of a core-sheath type composite fiber body was prepared in the same manner as in the above-described Example II53.

COMPARATIVE EXAMPLE II7(IICE7)

Besides coating a water-soluble adhesive agent, having polyester as the main component and not containing the piezoelectric material, as the sheath part onto a non-woven fabric of PET fibers of circular cross-sectional shape that was prepared as the core fibers, a sound absorbing material comprised of a core-sheath type composite fiber body was prepared in the same manner as in the above-described Example II53.

Evaluation Test II4

Figure 41:
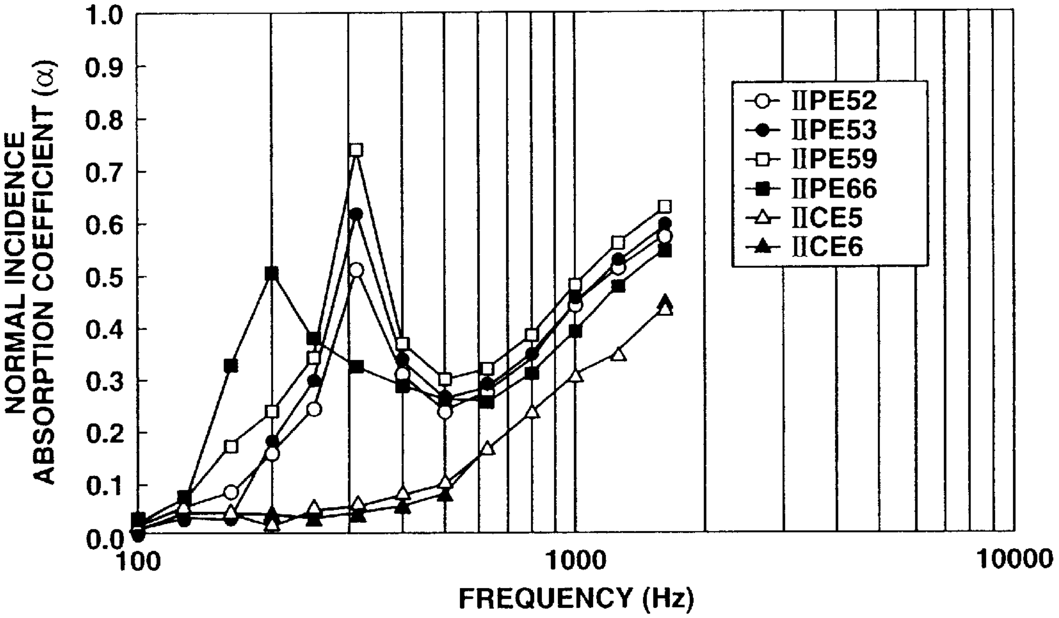
FIG. 41 is a graph, which shows the normal incidence absorption coefficients according to frequency of a sound absorbing material comprised of a core-sheath type composite fiber body by this invention and a comparative example.
Figure 42:
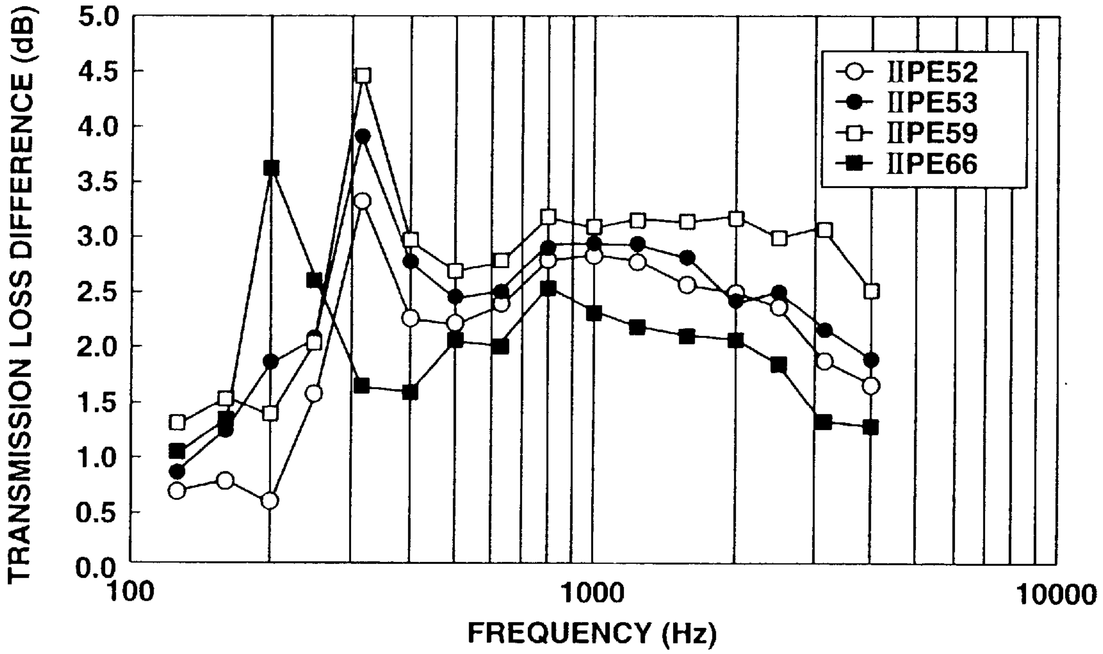
FIG. 42 is a graph, which shows the transmission loss according to frequency of sound absorbing materials comprised of core-sheath type composite fiber bodies by this invention.

For the sound absorbing material samples obtained in the above-described Examples II52 to II70 and Comparative Examples II4 to II7, measurements of the normal incidence absorption coefficients and acoustic transmission loss were made under the same conditions as described above. The measurement results of the normal incidence absorption coefficients are shown in Table IIT4 and FIG. 41 (only representative examples) and representative examples of the acoustic transmission loss measurement results are shown in FIG. 42.

With Example II69, since the cross-sectional area of the deep portion was set to 30%, the rigidity of the sheath part became large and the improvement of performance was therefore made small. However this Example can be said to be a favorable example for locations at which rigidity is required. Also though the improvement of performance was low with Example II70 since the ratio of the piezoelectric material to polyester of the sheath part was set to 0.5:1, this Example is favorable for cases where flexibility of the fiber itself is required and cases where it is desired that the amount of piezoelectric material be small.

TABLE IIT4

| | Sheath Part | | | | | |
|---|---|---|---|---|---|---|
| | Piezoelectric material | | Conductive material | | Composition ratio Piezoelectric | |
| Classification | Material | Particle diameter Ratio of length of largest part (%) | Carbon Material | Particle diameter Ratio of length of largest part (%) | material + Dielectric material:Polyester | Coating Coating method |
| IIPE52 | $TiBaO_3$ | 1.5 | — | — | 4:1 | After non-woven fabric |
| IIPE53 | $TiBaO_3$ | 1.5 | Fiber | 10 | 4:1 | After non-woven fabric |
| IIPE54 | $TiBaO_3$ | 1.5 | Powder | 2.5 | 4:1 | After non-woven fabric |
| IIPE55 | $TiBaO_3$ | 25 | Fiber | 10 | 4:1 | After non-woven fabric |
| IIPE56 | $TiBaO_3$ | 0.8 | Fiber | 10 | 4:1 | After non-woven fabric |
| IIPE57 | $TiBaO_3$ | 1.5 | Fiber | 25 | 4:1 | After non-woven fabric |
| IIPE58 | $TiBaO_3$ | 1.5 | Fiber | 0.8 | 4:1 | After non-woven fabric |
| IIPE59 | $TiBaO_3$ | 1.5 | Fiber | 10 | 10:1 | After non-woven fabric |
| IIPE60 | $TiBaO_3$ | 1.5 | Fiber | 10 | 1:1 | After non-woven fabric |
| IIPE61 | $TiBaO_3$ | 1.5 | Fiber | 10 | 4:1 | After cutting |
| IIPE62 | $TiBaO_3$ | 1.5 | Fiber | 10 | 4:1 | Continuous |
| IIPE63 | $TiBaO_3$ | 1.5 | Fiber | 10 | 4:1 | After non-woven fabric |
| IIPE64 | $TiBaO_3$ | 1.5 | Fiber | 10 | 4:1 | After non-woven fabric |
| IIPE65 | $TiBaO_3$ | 1.5 | Fiber | 10 | 4:1 | After non-woven fabric |
| IIPE66 | PZT | 1.5 | Fiber | 10 | 4:1 | After non-woven fabric |
| IIPE67 | PVDF | 1.5 | Fiber | 10 | 4:1 | After non-woven fabric |
| IIPE68 | P(VDF/TrFE) | 1.5 | Fiber | 10 | 4:1 | After non-woven fabric |
| IIPE69 | $TiBaO_3$ | 1.5 | Fiber | 10 | 4:1 | After non-woven fabric |
| IIPE70 | $TiBaO_3$ | 1.5 | Fiber | 10 | 0.5:1 | After non-woven fabric |
| IICE4 | — | — | — | — | — | — |
| IICE5 | — | — | — | — | 0.1 | After non-woven fabric |
| IICE6 | $ZrO_2$ | 1.5 | Fiber | 10 | 4.1 | After non-woven fabric |
| IICE7 | — | — | Fiber | 10 | 4.1 | After non-woven fabric |

TABLE IIT4-continued

| Classification | Core Part Cross Sectional Shape | Core Part Cross-sectional area Core-sheath Ratio (%) | Frequency obtained from approximation equation [Hz] | Measurement Results Absorption coefficient 200 Hz | 315 Hz | 500 Hz |
|---|---|---|---|---|---|---|
| IIPE52 | Circular | 50 | 300 | 0.160 | 0.584 | 0.237 |
| IIPE53 | Circular | 50 | 300 | 0.175 | 0.624 | 0.259 |
| IIPE54 | Circular | 50 | 300 | 0.169 | 0.613 | 0.245 |
| IIPE55 | Circular | 50 | 300 | 0.160 | 0.595 | 0.244 |
| IIPE56 | Circular | 50 | 300 | 0.159 | 0.593 | 0.243 |
| IIPE57 | Circular | 50 | 300 | 0.163 | 0.607 | 0.244 |
| IIPE58 | Circular | 50 | 300 | 0.166 | 0.615 | 0.233 |
| IIPE59 | Circular | 50 | 300 | 0.234 | 0.698 | 0.302 |
| IIPE60 | Circular | 50 | 300 | 0.149 | 0.557 | 0.219 |
| IIPE61 | Circular | 50 | 300 | 0.174 | 0.623 | 0.257 |
| IIPE62 | Circular | 50 | 300 | 0.176 | 0.626 | 0.258 |
| IIPE63 | Y-shaped | 50 | 300 | 0.181 | 0.642 | 0.271 |
| IIPE64 | Circular | 40 | 300 | 0.181 | 0.642 | 0.271 |
| IIPE65 | Circular | 98 | 300 | 0.138 | 0.533 | 0.221 |
| IIPE66 | Circular | 50 | 200 | 0.423 | 0.351 | 0.259 |
| IIPE67 | Circular | 50 | 500 | 0.154 | 0.370 | 0.800 |
| IIPE68 | Circular | 50 | 500 | 0.157 | 0.364 | 0.811 |
| IIPE69 | Circular | 30 | 300 | 0.112 | 0.401 | 0.189 |
| IIPE70 | Circular | 50 | 300 | 0.098 | 0.123 | 0.145 |
| IICE4 | Circular | 100 | — | 0.016 | 0.047 | 0.085 |
| IICE5 | Circular | 50 | — | 0.016 | 0.049 | 0.089 |
| IICE6 | Circular | 50 | — | 0.015 | 0.039 | 0.075 |
| IICE7 | Circular | 50 | — | 0.015 | 0.046 | 0.088 |

PRACTICAL EXAMPLE II71(IIPE71)

A composite-oxide-mixed type composite fiber body (energy conversion fiber body) with a diameter of approximately 50 μm was prepared using PA6 (nylon 6) as the matrix resin and a composite oxide $TiBaO_n$ (where n is a natural number with n=3 in general and Ti:Ba=1:1), comprised of the alkali earth metal Ba and the group IVa element Ti, as the piezoelectric material and with the average particle diameter of the composite oxide being 0.6 μm and the blending amount of the composite oxide being set to 100 vol %.

80 mass % of this fiber body and 20 mass % of PET binder fibers, with a softening point of approximately 110° C. and a diameter of approximately 15 μm were mixed and made into a non-woven fabric by the card layering method to produce a sound absorbing material with an area density of 1.0 $kg/m^2$ and a thickness of 30 mm.

PRACTICAL EXAMPLE II72(IIPE72)

Besides the average particle diameter of the composite oxide being 0.3 μm, a composite-oxide-mixed type composite fiber body was prepared in the same manner as in the above-described Example II71 and a sound absorbing material was prepared in the same manner as well.

PRACTICAL EXAMPLE II73(IIPE73)

Besides the average particle diameter of the composite oxide being 10.0 μm, a composite-oxide-mixed type composite fiber body was prepared in the same manner as in the above-described Example II71 and a sound absorbing material was prepared in the same manner as well.

PRACTICAL EXAMPLE II74(IIPE74)

Besides setting the blending amount of the composite oxide to 0.5 vol %, a composite-oxide-mixed type composite fiber body was prepared in the same manner as in the above-described Example II71 and a sound absorbing material was prepared in the same manner as well.

PRACTICAL EXAMPLE II75(IIPE75)

Besides setting the blending amount of the composite oxide to 1000 vol %, a composite-oxide-mixed type composite fiber body was prepared in the same manner as in the above-described Example II71 and a sound absorbing material was prepared in the same manner as well.

PRACTICAL EXAMPLE II76(IIPE76)

Besides additionally mixing in carbon fibers of 10 μm average length as the conductive material at a blending amount of 50 vol %, a composite-oxide-mixed type composite fiber body was prepared in the same manner as in the above-described Example II71 and a sound absorbing material was prepared in the same manner as well.

PRACTICAL EXAMPLE II77(IIPE77)

Besides mixing in carbon fibers of 0.3 μm average length as the conductive material, a composite-oxide-mixed type composite fiber body was prepared in the same manner as in the above-described Example II76 and a sound absorbing material was prepared in the same manner as well.

PRACTICAL EXAMPLE II78(IIPE78)

Besides mixing in carbon fibers of 100 μm average length as the conductive material, a composite-oxide-mixed type composite fiber body was prepared in the same manner as in the above-described Example II76 and a sound absorbing material was prepared in the same manner as well.

PRACTICAL EXAMPLE II79(IIPE79)

Besides mixing in carbon powder of 50 nm average particle size as the conductive material at a blending amount of 50 vol %, a composite-oxide-mixed type composite fiber body was prepared in the same manner as in the above-described Example II71 and a sound absorbing material was prepared in the same manner as well.

PRACTICAL EXAMPLE II80(IIPE80)

Besides mixing in carbon powder of 10 nm average particle size as the conductive material at a blending amount of 50 vol %, a composite-oxide-mixed type composite fiber body was prepared in the same manner as in the above-described Example II79 and a sound absorbing material was prepared in the same manner as well.

PRACTICAL EXAMPLE II81 (IIPE82)

Besides mixing in carbon powder of 100 nm average particle size as the conductive material at a blending amount of 50 vol %, a composite-oxide-mixed type composite fiber body was prepared in the same manner as in the above-described Example II79 and a sound absorbing material was prepared in the same manner as well.

COMPARATIVE EXAMPLE II9 (IICE9)

Besides mixing in carbon fibers of 10 μm average diameter as the conductive material at a blending amount of 50 vol % and not using a composite oxide, a composite-oxide-mixed type composite fiber body was prepared in the same manner as in the above-described Example II71 and a sound absorbing material was prepared in the same manner as well.

Evaluation Test II5

Figure 43:
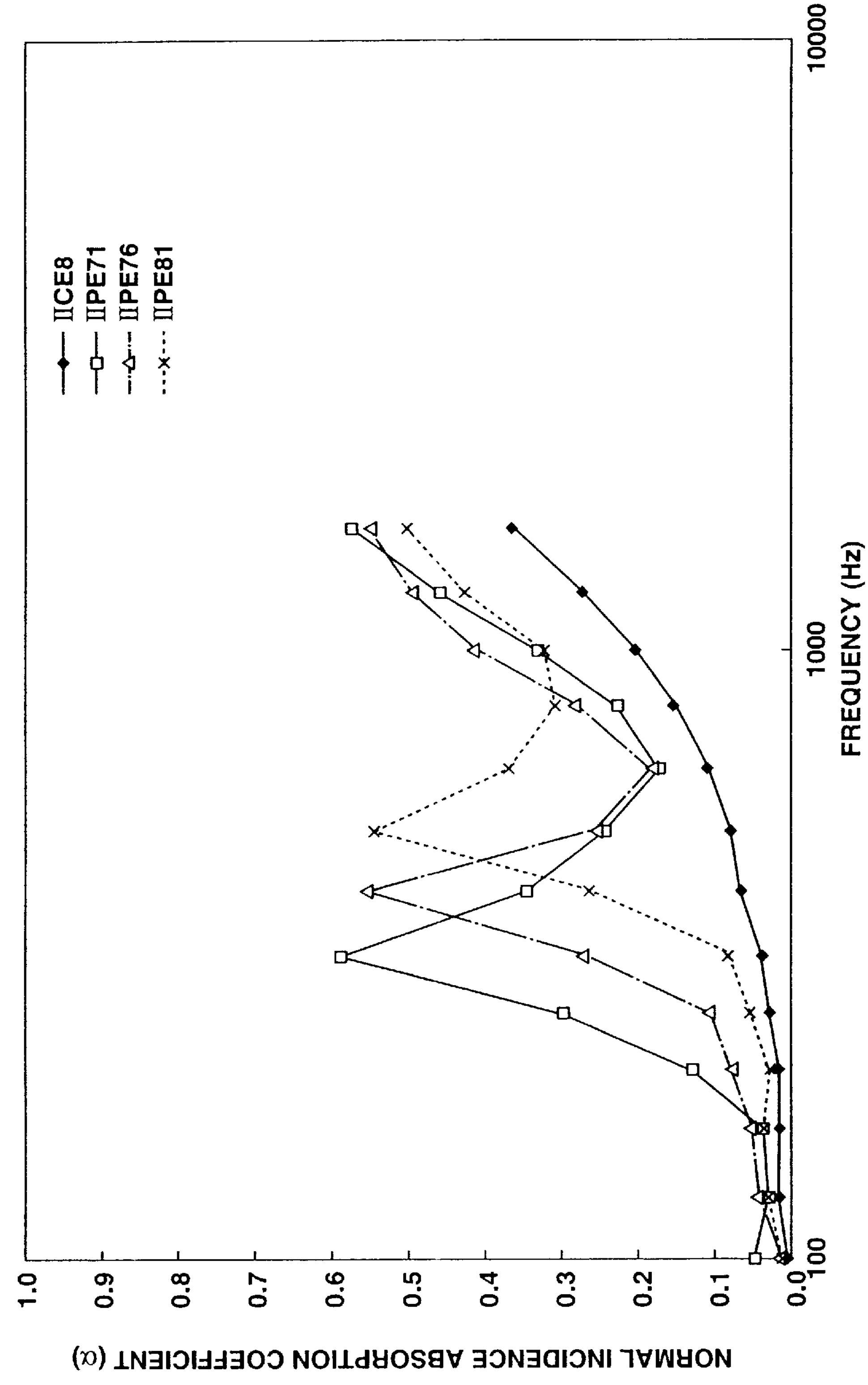
FIG. 43 is a graph, which shows the normal incidence absorption coefficients according to frequency of sound absorbing materials comprised of oxide-mixed type composite fiber bodies by this invention

For the sound absorbing material samples obtained in the above-described Examples II71 to II83 and Comparative Examples II8 and II9, measurements of the normal incidence absorption coefficients were made under the same conditions as described above. The measurement results of the normal incidence absorption coefficients are shown in Table IIT5 and the sound absorption performance of representative examples are shown in FIG. 43.

TABLE IIT5

| Classification | Composite oxide: Particle diameter [μm] | Composite oxide: Blending amount [vol %] | Conductive component: Carbon Type | Conductive component: Average length (or average particle diameter) | Conductive component: Blending amount [vol. %] | Frequency obtained from approximation equation [Hz] | Absorption coefficient 125 Hz | 160 Hz | 200 Hz | 250 Hz | 315 Hz | 400 Hz | 500 Hz |
|---|---|---|---|---|---|---|---|---|---|---|---|---|---|
| IIPE71 | 0.6 | 100 | — | — | — | 315 | 0.032 | 0.036 | 0.129 | 0.297 | 0.591 | 0.344 | 0.244 |
| IIPE72 | 0.3 | 100 | — | — | — | 400 | 0.025 | 0.043 | 0.111 | 0.176 | 0.290 | 0.566 | 0.269 |
| IIPE73 | 10.0 | 100 | — | — | — | 160 | 0.140 | 0.523 | 0.237 | 0.111 | 0.151 | 0.158 | 0.176 |
| IIPE74 | 0.6 | 0.5 | — | — | — | 315 | 0.036 | 0.043 | 0.072 | 0.208 | 0.462 | 0.204 | 0.129 |
| IIPE75 | 0.6 | 1000 | — | — | — | 315 | 0.040 | 0.060 | 0.136 | 0.300 | 0.600 | 0.320 | 0.269 |
| IIPE76 | 0.6 | 100 | Fiber | 10 μm | 50 | 400 | 0.043 | 0.054 | 0.082 | 0.111 | 0.276 | 0.560 | 0.260 |
| IIPE77 | 0.6 | 100 | Fiber | 0.3 μm | 50 | 315 | 0.065 | 0.068 | 0.097 | 0.176 | 0.527 | 0.287 | 0.168 |
| IIPE78 | 0.6 | 100 | Fiber | 100 μm | 50 | 500 | 0.036 | 0.032 | 0.032 | 0.065 | 0.140 | 0.287 | 0.588 |
| IIPE79 | 0.6 | 100 | Powder | 50 nm | 50 | 400 | 0.043 | 0.043 | 0.047 | 0.082 | 0.208 | 0.509 | 0.305 |
| IIPE80 | 0.6 | 100 | Powder | 10 nm | 50 | 315 | 0.054 | 0.054 | 0.075 | 0.215 | 0.577 | 0.312 | 0.172 |
| IIPE81 | 0.6 | 100 | Powder | 100 nm | 50 | 500 | 0.032 | 0.036 | 0.029 | 0.054 | 0.086 | 0.269 | 0.548 |
| IIPE82 | 0.6 | 100 | Fiber | 10 μm | 0.5 | 250 | 0.050 | 0.057 | 0.147 | 0.455 | 0.168 | 0.097 | 0.115 |
| IIPE83 | 0.6 | 100 | Fiber | 10 μm | 500 | 500 | 0.032 | 0.032 | 0.029 | 0.043 | 0.097 | 0.237 | 0.480 |
| IICE8 | — | — | — | — | — | — | 0.016 | 0.016 | 0.016 | 0.032 | 0.047 | 0.066 | 0.085 |
| IICE9 | — | — | Fiber | 10 μm | 50 | — | 0.018 | 0.018 | 0.018 | 0.032 | 0.040 | 0.068 | 0.080 |

PRACTICAL EXAMPLE II82 (IIPE82)

Besides mixing in carbon fibers as the conductive material at a blending amount of 0.5 vol %, a composite-oxide-mixed type composite fiber body was prepared in the same manner as in the above-described Example II76 and a sound absorbing material was prepared in the same manner as well.

PRACTICAL EXAMPLE II83 (IIPE83)

Besides mixing in carbon fibers as the conductive material at a blending amount of 500 vol %, a composite-oxide-mixed type composite fiber body was prepared in the same manner as in the above-described Example II76 and a sound absorbing material was prepared in the same manner as well.

COMPARATIVE EXAMPLE II8 (IICE8)

Besides using 80 mass % of PET fibers with a diameter of approximately 50 μm in place of the abovementioned composite fiber body, a composite-oxide-mixed type composite fiber body was prepared in the same manner as in the above-described Example II71 and a sound absorbing material was prepared in the same manner as well.

PRACTICAL EXAMPLE II84 (IIPE84)

Figure 21:
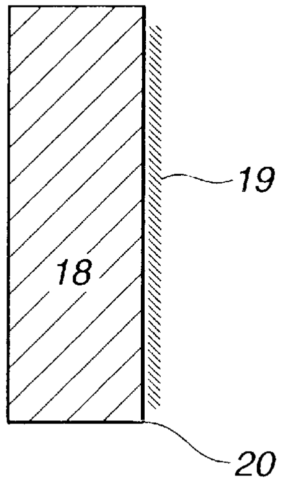
FIG. 21 is a schematic view showing a piezoelectric non-woven fabric sound absorbing member having a covering layer according to the present invention.

When the sound absorbing material 10 comprised of piezoelectric non-woven fabric, which was obtained in Example II19, was installed on the wall surface and roof surface of the interior of a room as shown in FIG. 21, the discomforting noise of the low frequency range was more reduced in comparison to a conventional felt sound absorbing material. Also, the sound absorbing effect did not change even when a surface layer 20 and adhesive material layer 19 were provided on sound absorbing material 18 to protect the sound absorbing material.

PRACTICAL EXAMPLE II85 (IIPE85)

When the sound absorbing material 110, which was obtained in Example II19, was installed on the rear surface of the head lining of a vehicle roof panel part with the low frequency side being set to the inner side of the cabin, the level of the sound pressure of 500 Hz or less in the cabin was reduced by 1 to 2 dB on the average for all frequencies and a reduction effect of approximately 4 dB was seen for 200 Hz.

PRACTICAL EXAMPLE II86 (IIPE86)

When the sound absorbing material 110, which was obtained in Example II19, was installed on the rear surfaces of the respective pillars of a vehicle with the low frequency side being set to the inner side of the cabin, the level of the sound pressure of 500 Hz or less in the cabin was reduced by 0.5 to 1 dB on the average for all frequencies and a reduction effect of approximately 2 dB was seen for 200 Hz.

PRACTICAL EXAMPLE II87 (IIPE87)

When the sound absorbing material 110, which was obtained in Example II19, was installed on the rear parcel panel of a vehicle with the low frequency side being set to the inner side of the cabin, the level of the sound pressure of 500 Hz or less in the cabin was reduced by 0.5 to 1 dB on the average for all frequencies and a reduction effect of approximately 2 dB was seen for 200 Hz.

PRACTICAL EXAMPLE II88 (IIPE88)

When the sound absorbing material 10, which was obtained in Example II19, was installed on the engine room hood insulator of a vehicle with the low frequency side being set to the engine side, the level of the sound pressure of 500 Hz or less in the cabin was reduced by 1 to 2 dB on the average for all frequencies and a reduction effect of approximately 3 dB was seen for 200 Hz.

PRACTICAL EXAMPLE II89 (IIPE89)

When the sound absorbing material 110, which was obtained in Example II19, was installed in the interior of the air intake duct of a vehicle with the low frequency side being set to the inner side as shown in FIG. 22 in place of the material 21, the level of the sound pressure of 500 Hz or less in the cabin was reduced by 1 to 2 dB on the average for all frequencies and a reduction effect of approximately 3 dB was seen for 200 Hz.

PRACTICAL EXAMPLE II90 (IIPE90)

When the sound absorbing material 110, which was obtained in Example II19, was installed in the interior of the engine cover of a vehicle with the low frequency side being set to the inner side, the level of the sound pressure of 500 Hz or less in the cabin was reduced by 101 to 2 dB on the average for all frequencies and a reduction effect of approximately 3 dB was seen for 200 Hz.

PRACTICAL EXAMPLE II91 (IIPE91)

When the sound absorbing material 110 (in place of 22), which was obtained in Example II19, was installed on a part of the sound absorbing material for the dashboard insulator 24 of a vehicle with the low frequency side being set to the rubber facing 23 side as shown in FIG. 23, the level of the sound pressure of 500 Hz or less in the cabin was reduced by 0.5 to 1 dB on the average for all frequencies and a reduction effect of approximately 2 dB was seen for 200 Hz.

PRACTICAL EXAMPLE II92 (IIPE92)

When the sound absorbing material 110 (in place of 27), which was obtained in Example II19, was installed on a part of the sound absorbing material for the floor carpet 26 of a vehicle with the low frequency side being set to the facing 25 side as shown in FIG. 24, the level of the sound pressure of 500 Hz or less in the cabin was reduced by 0.5 to 1 dB on the average for all frequencies and a reduction effect of approximately 2 dB was seen for 200 Hz.

This application is based on a first prior Japanese Patent Application No. 2000-121475 filed on Apr. 21, 2000 in Japan, and a second prior Japanese Patent Application No. 2000-358679, filed on Nov. 11, 2000 in Japan. The entire contents of these Japanese Patent Applications Nos. 2000-121475 and 2000-358679 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A product comprising:

a fiber body which comprises a collection of fibers including energy converting fibers, each of which comprises a thermoplastic component including a thermoplastic resin, and an energy consuming component to consume energy of at least one of vibration and sound by energy conversion, the energy consuming component including a piezoelectric component having piezoelectric property, wherein the collection of fibers contains the thermoplastic resin as a main component.

2. The product as claimed in claim 1, wherein the fiber body comprises fibers each of which comprises the piezoelectric component and a strongly polar organic component.

3. The product as claimed in claim 1, wherein the fiber body comprises composite fibers each of which comprises a first thermoplastic resin comprising the piezoelectric material and a second thermoplastic resin containing no piezoelectric material; and wherein each of the composite fibers comprises a first resin portion of the first thermoplastic resin and extending in a fiber longitudinal direction and a second resin portion of the second thermoplastic resin extending alongside the first resin portion.

4. The product as claimed in claim 3, wherein the composite fibers are side-by-side fibers or core-sheath fibers.

5. The product as claimed in claim 3, wherein the first thermoplastic resin further comprises a strongly polar organic component.

6. The product as claimed in claim 1, wherein piezoelectric material comprises barium titanate ($BaTiO_3$) or lead zirconate titanate (PZT).

7. The product as claimed in claim 3, wherein the first thermoplastic resin is a resin having polarity.

8. The product as claimed in claim 1, wherein the piezoelectric material comprises a compound selected from the group consisting of polyvinylidene fluorides (PVDF) and poly(vinylidene fluoride/trifluoroethylene) (P(VDF/TrFE) copolymers, and the thermoplastic resin is non-piezoelectric portion of the compound of the piezoelectric material.

9. The product as claimed in claim 1, wherein the fiber body comprises fibers comprising a thermoplastic resin comprising a strongly polar organic component.

10. The product as claimed in claim 9, wherein the strongly polar organic component has an SP value (δs) of $2.0\times10^4$~$2.7\times10^4 (J/m^3)^{0.5}$.

11. The product as claimed in claim 9, wherein the strongly polar organic component is one selected from the group consisting of benzothiazoles, benzothiazyl sulfenamides and thiurams.

12. The product as claimed in claim 9, wherein the strongly polar organic component comprises one of benzothiazoles represented by a chemical formula C6H4SNC-S—X where X is one of hydrogen, metal and organic group.

13. The product as claimed in claim 12, wherein the benzothiazoles comprises mercaptobenzothiazole (MBT), and dibenzothiazyl disulfide (MBTS).

14. The product as claimed in claim 9, wherein the strongly polar organic component comprises one of benzothiazyl sulfenamides represented by a chemical formula C6H4SNC-S-NR1—R2 where R is one of hydrogen, and organic group.

15. The product as claimed in claim 14, wherein the strongly polar organic component comprises, as benzothiazyl sulfenamide, N,N-dicyclohexyl-2-benzothiazyl sulfenamide (DCHBSA).

16. The product as claimed in claim 9, wherein the strongly polar organic component comprises one of thiurams represented by a chemical formula R1-NR2-CS-Sx-CS-NR2-R1 where R1 and R2 are alkyl group, and x=1, 2, or 4.

17. The product as claimed in claim 16, wherein the strongly polar organic component comprises, as thiuram, tetramethylthiuram disulfide (TMTM).

18. The product as claimed in claim 1, wherein the thermoplastic resin of the main component has an SP value (δs) of $1.6\times10^4$~$2.8\times10^4(J/m^3)^{0.5}$.

19. The product as claimed in claim 1, wherein the fiber body comprises composite fibers each of which comprises the main component, the piezoelectric component and a third additive component which comprises carbon material which is one of carbon fiber and carbon powder.

20. The product as claimed in claim 1, wherein the fiber body comprises fibers for consuming sound pressure energy over an entire frequency range by conversion of sound pressure energy into electric energy with the thermoplastic resin, the piezoelectric region and a strongly polar organic component.

21. The product as claimed in claim 1, wherein the fiber body comprises fibers each of which comprises the piezoelectric component and a remaining component which comprises the thermoplastic resin, and a sound absorbing characteristic is adjusted at a predetermined frequency determined by electric properties of the piezoelectric component and the remaining component.

22. The product as claimed in claim 21, wherein the predetermined frequency is a resonance frequency f1 determined by LC resonance of a capacitance C of the piezoelectric component and a pseudo inductance L of the remaining component and given by;

$$f1=\frac{1}{2}\pi\sqrt{(LC)}.$$

23. The product as claimed in claim 22, wherein the remaining component comprises the thermoplastic resin and a strongly polar organic component.

24. The product as claimed in claim 21, wherein the predetermined frequency is a frequency f2 determined by a capacitance C of the piezoelectric component and an electric resistance R of the remaining component and given by;

$$f2=1/(2\pi\sqrt{(RC)}).$$

25. The product as claimed in claim 24, wherein the remaining component comprises the thermoplastic resin and a strongly polar organic component.

26. The product as claimed in claim 1, wherein the fiber body comprises sea-island composite fibers each of which comprises an island component and a sea component which are different in piezoelectricity and flexibility.

27. The product as claimed in claim 26, wherein the sea-island composite fibers have an average fiber diameter of 10 to 100 μm (micrometer), the island component comprises island fibers having an average fiber diameter of 1 to 50 μm (micrometer), and is surrounded by the sea component, and wherein the island component occupies 10 to 90% of a fiber cross-sectional area of each sea-island composite fiber.

28. The product as claimed in claim 27, wherein each of the sea-island composite fiber has a first geometrical moment of inertia, and the island component comprise a plurality of island subcomponents each of which is surrounded by the sea component, and each of which has a second geometrical moment of inertia that is less than or equal to 10% of the first geometrical moment of inertia.

29. The product as claimed in claim 28, wherein each sea-island composite fiber has a first cross sectional area, and the island component comprises a plurality of island subcomponents each having a second cross-sectional area which is equal to or less than 30% of the first cross-sectional area.

30. The product as claimed in claim 29, wherein a non-circularity ratio F of each island subcomponent is in the range of 1.1 to 3.0, the non-circularity ratio F being defined as F=G/R where $R=(S/\pi)^{0.5}$, and $G=L/(2\pi)$, S is the cross-sectional are of one island subcomponent, L is a perimeter of one island subcomponent, R is a circle-equivalent radius of one island subcomponent and G is a perimeter-based radius of one island subcomponent.

31. The product as claimed in claim 29, wherein the island component comprises a mixture of a thermoplastic resin and a piezoelectric material, and a proportion of the mixture is 80 to 100 mass % of the island component.

32. The product as claimed in claim 26, wherein the resin of the sea component comprises a non-piezoelectric portion of polyvinylidene fluoride (PVDF) or poly(vinylidene fluoride/trifluoroethylene) (P(VDF/TrFE) copolymer.

33. The product as claimed in claim 1, wherein the fiber body comprises core-sheath binder fibers each comprising a core component and a sheath component having a softening point lower than that of the core component.

34. The product as claimed in claim 33, wherein a first one of the core component and the sheath component comprises a first resin comprising a strongly polar organic agent with a solubility parameter (SP) of $2.05\times10^4$ to $2.66\times10^4(J/m^3)^{0.5}$ which is mixed as piezoelectric material in the first resin, and a second one of the core component and the sheath component is made of a second resin containing no strong polar organic agent.

35. The product as claimed in claim 34, wherein the first resin further comprises a piezoelectric material other than the strongly polar organic agent.

36. The product as claimed in claim 35, wherein the first resin further comprises a conductive material.

37. The product as claimed in claim 34, wherein said strongly polar organic agent is a strongly polar organic agent that belongs to benzothiazoles, benzodiazoles, benzotriazoles, benzothiazyl sulfenamides, or mercaptobenzothiazyls.

38. The product as claimed in claim 34, wherein the core component is made of the first resin, and the sheath component is made of the second resin.

39. The product as claimed in claim 34, wherein a solubility parameter (SP) of the first resin that contains the strongly polar organic agent is in the range of $1.60\times10^4$ to $2.78\times10^4(J/m^3)^{0.5}$.

40. The product as claimed in claim 1, wherein the fiber body comprises core-sheath composite fibers each comprising a core component which comprises a fiber of a thermoplastic resin, and a sheath component which comprises a layer containing a piezoelectric material and polyester as main component.

41. The product as claimed in claim 40, wherein the layer extends longitudinally along the core component.

42. The product as claimed in claim 41, wherein the core component is surrounded by the layer of the sheath component.

43. The product as claimed in claim 40, wherein a ratio of the weight of the piezoelectric material in the sheath component to the dry weight of the layer containing polyester as the main component in the sheath component is in the range of 1:1 to 10:1.

44. The product as claimed in claim 40, wherein the layer of the sheath component further comprises a conductive material.

45. The product as claimed in claim 44, wherein a ratio of the weight of the piezoelectric material and the conductive material in the sheath component to the dry weight of the layer containing polyester as the main component in the sheath component is in the range of 1:1 to 10:1.

46. The product as claimed in claim 44, wherein the core component occupies 40 to 98% of the cross-sectional area that is perpendicular to the fiber longitudinal direction, the piezoelectric material and conductive material in the sheath component are powder, and the lengths of the largest parts of the piezoelectric material and conductive material are 0.8 to 25% of a circle-equivalent diameter $2R(2(S/\pi)^{0.5})$, where S is the cross-sectional area of the core component.

47. The product as claimed in claim 1, wherein the piezoelectric component comprises a composite oxide having at least an alkali earth metal as piezoelectric material.

48. The product as claimed in claim 47, wherein, wherein the composite oxide is an oxide of at least one group IV element selected among group IV and an alkali earth metal.

49. The product as claimed in claim 48, wherein, wherein the molar ratio of the alkali earth metal and the at least one group IV element selected from among the group IV is in the range of 1:0.98 to 1:1.

50. The product as claimed in claim 47, wherein the alkali earth metal of the composite oxide comprises at least one element selected from the group consisting of Ba, Sr, Ca, and Mg.

51. The product as claimed in claim 48, wherein the group IV element of the composite oxide comprises at least one element selected from the group consisting of Ti, Zr, Sn, and Pb.

52. The product as claimed in claim 50, wherein the composite oxide comprises at least one composite oxide selected from the group consisting of composite oxide of a combinations of Ti and Ba, composite oxide of a combinations of Ti and Sr, composite oxide of a combinations of Ti and Ca, and composite oxide of a combinations of Ti and Mg.

53. The product as claimed in claim 1, wherein the piezoelectric component comprises a composite oxide, and an average particle diameter of the composite oxide is equal to or greater than $0.3\times10^{-6}$ m, and equal to or smaller than $10.0\times10^{-6}$ m.

54. The product as claimed in claim 53, wherein the average particle diameter of the composite oxide is equal to or smaller than $7.0\times10^{-6}$ m.

55. The product as claimed in claim 1, wherein the piezoelectric component comprises a composite oxide, and a blending amount of the composite oxide is 0.5 to 1000% by volume, of the thermoplastic resin.

56. The product as claimed in claim 55, wherein the blending amount of the composite oxide is 25 to 400% by volume, of the thermoplastic resin.

57. The product as claimed in claim 1, wherein the piezoelectric component comprises at least one compound selected from the group consisting of polyvinylidene fluorides (PVDF) and poly(vinylidene fluoride/trifluoroethylene) (P(VDF/TrFE) copolymers.

58. The product as claimed in claim 1, wherein the piezoelectric component comprises a thermoplastic resin, a piezoelectric material and a conductive material which comprises a carbon material.

59. The product as claimed in claim 58, wherein the carbon material is carbon fiber having an average length in a fiber longitudinal direction which is equal to or greater than $0.3\times10^{-6}$ m, and equal to or smaller than $100\times10^{-6}$ m.

60. The product as claimed n claim 59, wherein the average length in a fiber longitudinal direction of the carbon fiber is equal to or greater than $0.3\times10^{-6}$ m, and equal to or smaller than $20\times10^{-6}$ m.

61. The product as claimed in claim 58, wherein the carbon material is carbon powder having an average particle diameter which is equal to or greater than $10\times10^{-9}$ m, and which is equal to or smaller than $100\times10^{-9}$ m.

62. The product as claimed in claim 61, wherein the average particle diameter of the carbon powder is equal to or greater than $10\times10^{-9}$ m, and equal to or smaller than $60\times10^{-9}$ m.

63. The product as claimed in claim 58, wherein a blending amount of the carbon material is 0.5 to 500% as volume percentage, of the piezoelectric material.

64. The product as claimed in claim 63, wherein the blending amount of the carbon material is 5 to 100% as volume percentage, of the piezoelectric material component.

65. The product as claimed in claim 1, wherein the product comprises a sound absorbing material which is the fiber body comprising energy converting fibers amounting to 10 to 100 mass % of the fiber body.

66. The product as claimed in claim 65, wherein the fiber body further comprises binder fibers, and the product is a thermoformed product.

67. The product as claimed in claim 66, wherein the binder fibers comprises a binding component for joining fibers by melting at an elevated temperature.

68. The product as claimed in claim 65, wherein the product comprises a base member and the sound absorbing material attached to the base member.

69. The product as claimed in claim 68, wherein the base member is a structural member of a vehicle and the base member is in the form of a plate.

70. The product as claimed in claim 69, wherein the sound absorbing material is an interior material for a vehicle.

71. The product as claimed in claim 69, wherein the base member is a metallic panel for a vehicle.

72. The product as claimed in claim 69, wherein the base member is a part of an air cleaner system for a vehicle.

73. The product as claimed in claim 69, wherein the base member is a part for forming an engine cover for a vehicle.

74. The product as claimed in claim 69, wherein the base member is a part for forming a dash insulator for a vehicle.

75. The product as claimed in claim 69, wherein the base member is a vehicle body panel for a vehicle.

76. The product as claimed in claim 25, wherein the base member is a part for forming a vehicle body portion which is one of a tunnel of a floor panel, a rear parcel shelf, an instrument panel, a pillar panel, a roof panel, a dash lower member.

77. The product as claimed in claim 1, wherein each of the energy converting fibers is a single continuous fiber in the form of a filament, and includes therein the piezoelectric component.

78. A fiber body comprising:

energy converting fibers each of which is a single continuous fiber in the form of a filament, each of the energy converting fibers including therein a piezoelectric component having piezoelectric property.

79. The fiber body as claimed in claim 78, wherein each of the energy converting fibers further includes a thermoplastic component of a thermoplastic resin.

* * * * *